(12) United States Patent
Hall

(10) Patent No.: US 12,152,927 B2
(45) Date of Patent: Nov. 26, 2024

(54) TESTING AND CALIBRATION OF FIXED ORIFICE PLATE FLOW MEASUREMENT EQUIPMENT

(71) Applicant: Jason Bradly Hall, San Angelo, TX (US)

(72) Inventor: Jason Bradly Hall, San Angelo, TX (US)

( * ) Notice: Subject to any disclaimer, the term of this patent is extended or adjusted under 35 U.S.C. 154(b) by 131 days.

(21) Appl. No.: 17/745,684

(22) Filed: May 16, 2022

(65) Prior Publication Data

US 2022/0373382 A1    Nov. 24, 2022

Related U.S. Application Data

(60) Provisional application No. 63/190,173, filed on May 18, 2021.

(51) Int. Cl.
*G01F 25/10*   (2022.01)
*G01F 1/42*    (2006.01)
*G01F 15/061*  (2022.01)

(52) U.S. Cl.
CPC ............... *G01F 25/15* (2022.01); *G01F 1/42* (2013.01); *G01F 15/061* (2013.01)

(58) Field of Classification Search
CPC .......... G01F 25/15; G01F 1/42; G01F 15/061
See application file for complete search history.

(56) References Cited

U.S. PATENT DOCUMENTS

| | | | |
|---|---|---|---|
| 2007/0233412 A1* | 10/2007 | Gotoh | G01F 1/6847 |
| | | | 702/50 |
| 2020/0042021 A1* | 2/2020 | Somani | G01F 1/363 |
| 2020/0133313 A1* | 4/2020 | Sipka | G05B 23/027 |
| 2022/0333972 A1* | 10/2022 | Spyropoulos | G01F 15/043 |

* cited by examiner

*Primary Examiner* — Daniel J Colilla
(74) *Attorney, Agent, or Firm* — Eversheds Sutherland (US) LLP

(57) ABSTRACT

This disclosure describes systems, methods, and devices related to a remote calibration controller. The remote calibration controller may be capable of performing the procedure to remotely test and calibrate differential pressure, static pressure, and temperature on a remotely located fixed orifice plate flow measurement device through the use electromechanical and electro pneumatic hardware located at the site of the flow measurement device that are controlled by on-site controller/logic circuitry remotely accessed via bi-directional communications.

19 Claims, 47 Drawing Sheets

| | | \| RCC Solenoid States | | | | | | | |
|---|---|---|---|---|---|---|---|---|---|
| 2-way universal solenoid valve --> | | (closed) pneumatic pathway is blocked between ports | | | | (open) pneumatic pathway unrestricted between ports | | | |
| 3-way universal solenoid valve --> | | (A) Pneumatic pathway un-restricted between ports 1 and 2 exclusively | | | | (B) Pneumatic pathway un-restricted between ports 2 and 3 exclusively | | | |
| | Solenoid --> | 605 | 604 | 606 | 503 | 504 | 505 | 506 | 507 |
| Operation | Figure | RCC equalization 2-way universal solenoid valve | RCC reference pressure device low pressure port exposure 2-way universal solenoid valve | RCC vent/exhaust to atmosphere 2-way universal solenoid valve | FMD solenoid manifold upstream test 3-way universal solenoid valve | FMD solenoid manifold downstream test 3-way universal solenoid valve | FMD solenoid manifold upstream equalization / isolation 3-way universal solenoid valve | FMD solenoid manifold downstream equalization / isolation 3-way universal solenoid valve | FMD solenoid manifold vent/exhaust to atmosphere 2-way universal solenoid valve |
| Normal operation (not in test) | 10B | open | closed | closed | A | A | A | A | closed |
| Take out of service | | | | | | | | | |
| Equalize FMD pressure sensor | 10C | open | closed | closed | A | A | B | B | closed |
| Vent trapped natural gas | 10D | open | closed | closed | A | A | B | B | open |
| Pre-fill with inert gas | 10E | open | closed | closed | A | A | B | B | open |
| Fill with inert gas | 10F | open | closed | closed | B | B | B | B | open |
| Purge/vent gas mixture | 10G | open | closed | closed | A | A | B | B | open |
| Ready for test procedure | 10H | open | closed | open | B | B | B | B | open |
| Test/calibrate static pressure | | | | | | | | | |
| Static pressure = Atmospheric | 10H | open | closed | open | B | B | B | B | open |
| Static pressure > atmospheric | 10I | open | closed | closed | B | B | B | B | open |
| Test/calibrate differential pressure | | | | | | | | | |
| Differential pressure = 0 | 10J | open | open | open | B | B | B | B | open |
| Differential pressure > 0 | 10K | closed | open | open | B | B | B | B | open |
| Put back in service | | | | | | | | | |
| Disconnect RCC | 10D | open | closed | closed | A | A | B | B | open |
| Expose pressure sensor to gas stream | 10B | open | closed | closed | A | A | A | A | closed |
| Vent trapped natural gas | 10L | open | closed | closed | A | A | A | A | closed |

FIG. 10M

TESTING AND CALIBRATION OF FIXED ORIFICE PLATE FLOW MEASUREMENT EQUIPMENT

CROSS-REFERENCE TO RELATED APPLICATION(S)

This application claims the benefit of U.S. Provisional Application No. 63/190,173, filed May 18, 2021, the disclosure of which is incorporated herein by reference as if set forth in full.

TECHNICAL FIELD

This disclosure generally relates to systems and methods for remote testing and calibration and, more particularly, to testing and calibration of fixed orifice plate flow measurement equipment.

BACKGROUND

The oil and gas industry utilizes various types of equipment and technology to record production and use of natural gas. Government agencies stipulate reporting of this data. In order to maintain accuracy of natural gas production/use, periodic verification of the accuracy of the device used to measure the flowrate that determines production/use is essential. A very common type of flow measurement device (FMD) is the orifice meter. A FMD must be periodically tested for accuracy. Checking the accuracy of a FMD requires an individual (measurement technician) physically visit the site of the FMD in order to perform the testing. In addition, the technician must test multiple FMDs. Therefore, it is not economical or sensible to have the FMDs tested more often than is required/necessary.

BRIEF DESCRIPTION OF THE DRAWINGS

FIGS. 10A-10M depict illustrative schematic diagrams for RCC, in accordance with one or more example embodiments of the present disclosure.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Figure 1A:
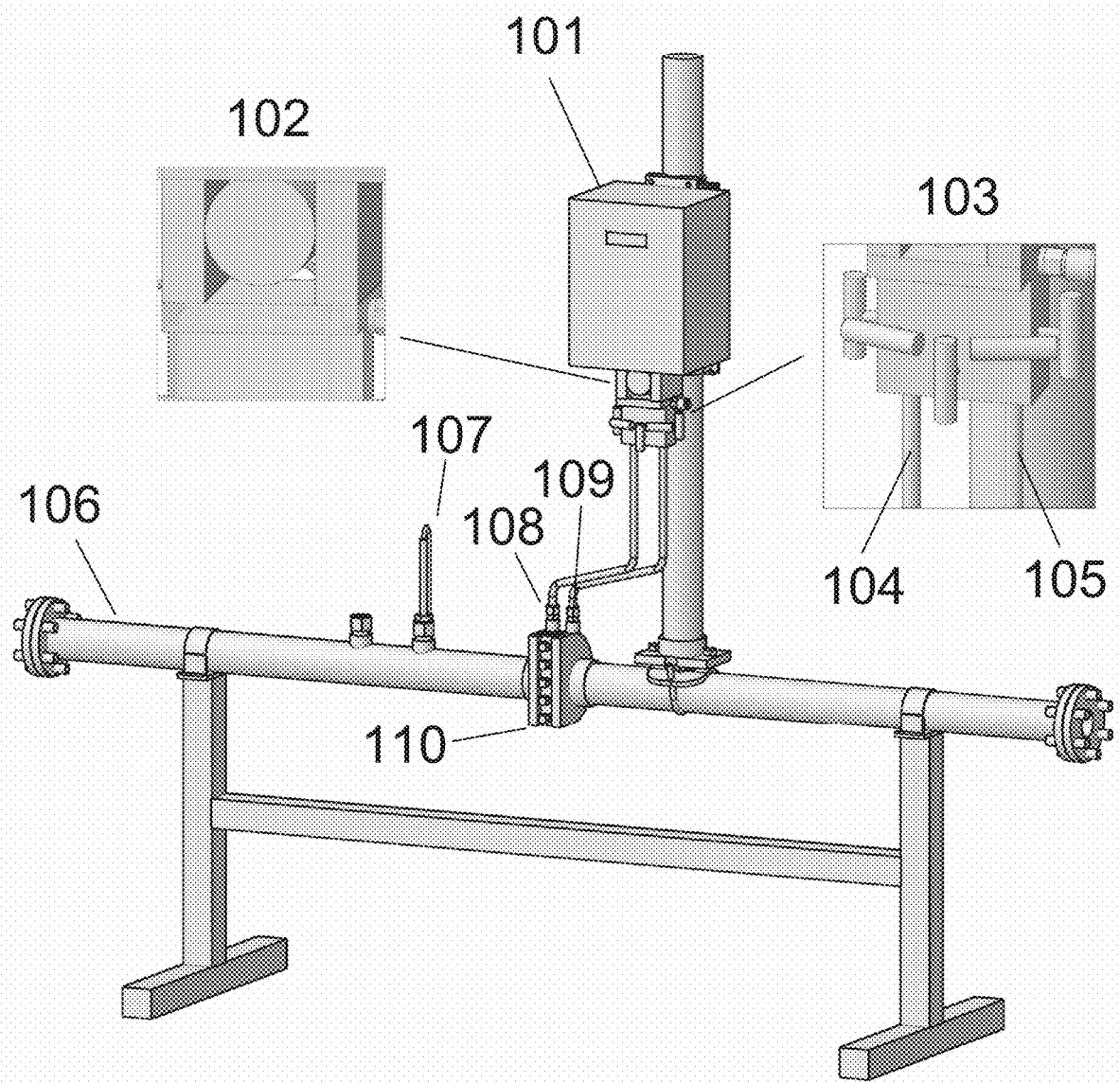
FIG. 1A depicts an overall view of a typical fixed orifice plate measurement tube, flow measurement device, and associated components.

The oil and gas industry utilizes various types of equipment and technology to record production and use of natural gas. Government agencies stipulate reporting of this data. In order to maintain accuracy of natural gas production/use, periodic verification of the accuracy of the device used to measure the flowrate that determines production/use is essential. A very common type of FMD is the orifice meter (hereafter referred to as FMD—Flow Measurement Device). In some scenarios, the FMD may be a computer comprising one or more processors. A drawing depicting this type of flow meter is shown in FIG. 1A. This type of FMD works off of the principle that when fluid/gas flow is introduced across an orifice 111 of FIG. 1B, there is a pressure drop created. The pressure on the upstream side of the orifice plate is compared to that of the pressure on the downstream side of the orifice plate. This pressure drop along with other relevant data is used to calculate an instantaneous flow rate by the use of electronic circuitry/logic. This data is then utilized to determine the total volume of the gas produced/used over a period of time which is recorded in the FMD. The FMD uses three external physical measurements: static pressure on the orifice plate, differential pressure between the two sides of the orifice plate, and temperature of the gas flow. In order to verify the accuracy of these devices, the measurement technician utilizes devices that have a higher/equivalent accuracy than that of the devices providing data to the FMD. The measurement technician compares data from the FMD and reference devices at multiple data points. If the data provided by the measurement device differs from the data provided by the reference device by a pre-determined tolerance, the measurement device is then calibrated to bring the FMD measurements back into tolerance.

Example embodiments of the present disclosure relate to systems, methods, and devices for remote testing and calibration of fixed orifice plate flow measurement equipment.

In one or more embodiments, a remote calibration controller (RCC) system may provide the operator(s) responsible for the FMD the ability to perform the previously described test/calibration procedure from a remote location. Having equipment that can perform the test and calibration procedure remotely enables the operator responsible for the FMD the ability to verify accurate measurement as often as desired for a fixed cost, as opposed to only having accurate measurement guaranteed at the time of the periodic check by a measurement technician.

In one or more embodiments, the RCC system facilitates the reduction of long-term costs since fewer technicians are required to maintain calibration of the operator's well field FMDs.

In one or more embodiments, the RCC system may perform testing/calibration that is normally performed by a measurement technician by having the remote calibration controller equipment located at the site of the flow measurement device but accessed remotely. Through this remote access, a user can control the test/calibration procedure without being physically present at the site of the flow measurement device.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 2A:
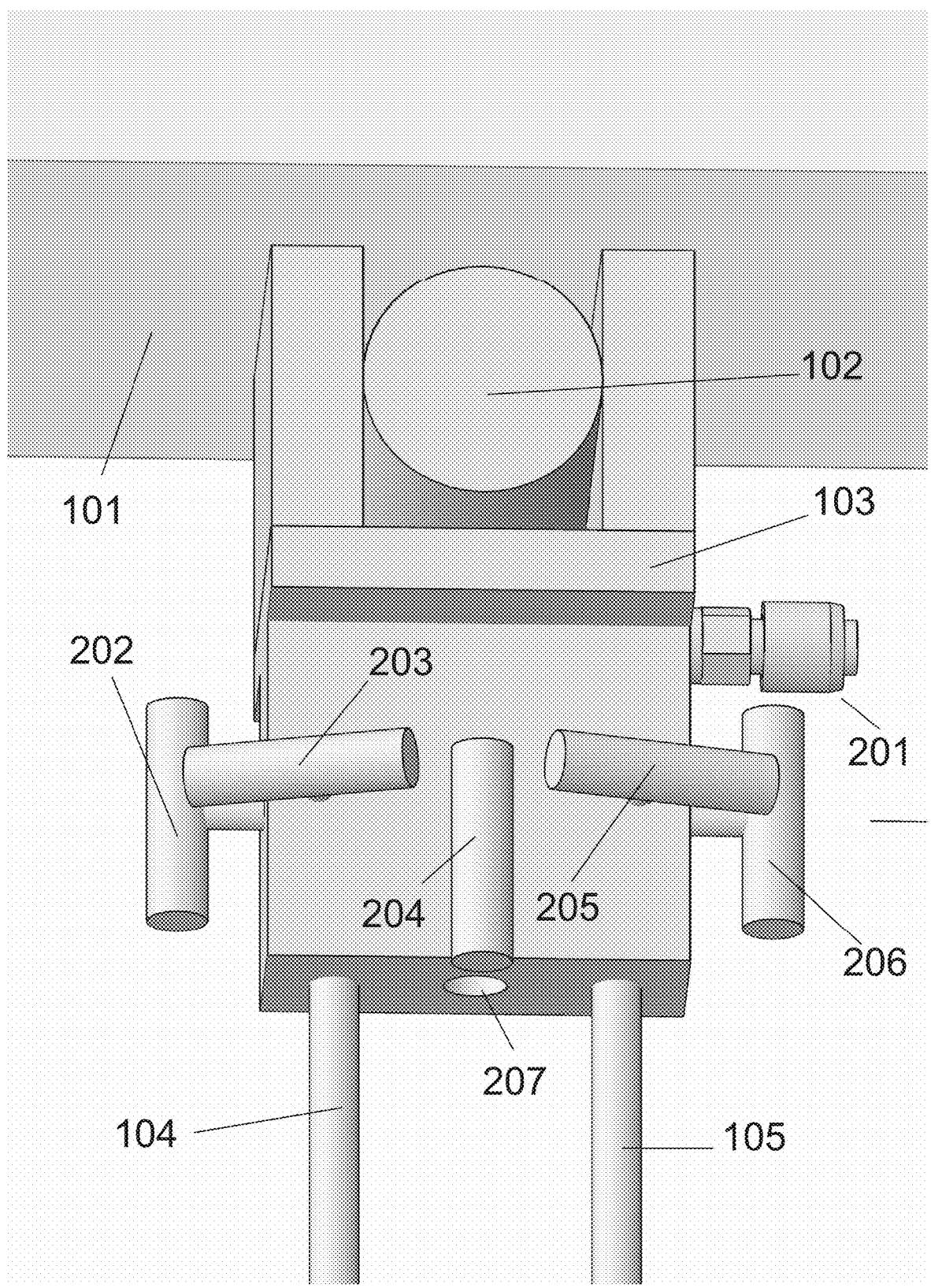
FIG. 2A depicts a view of an FMD pressure sensor and FMD service manifold.
Figure 2B:
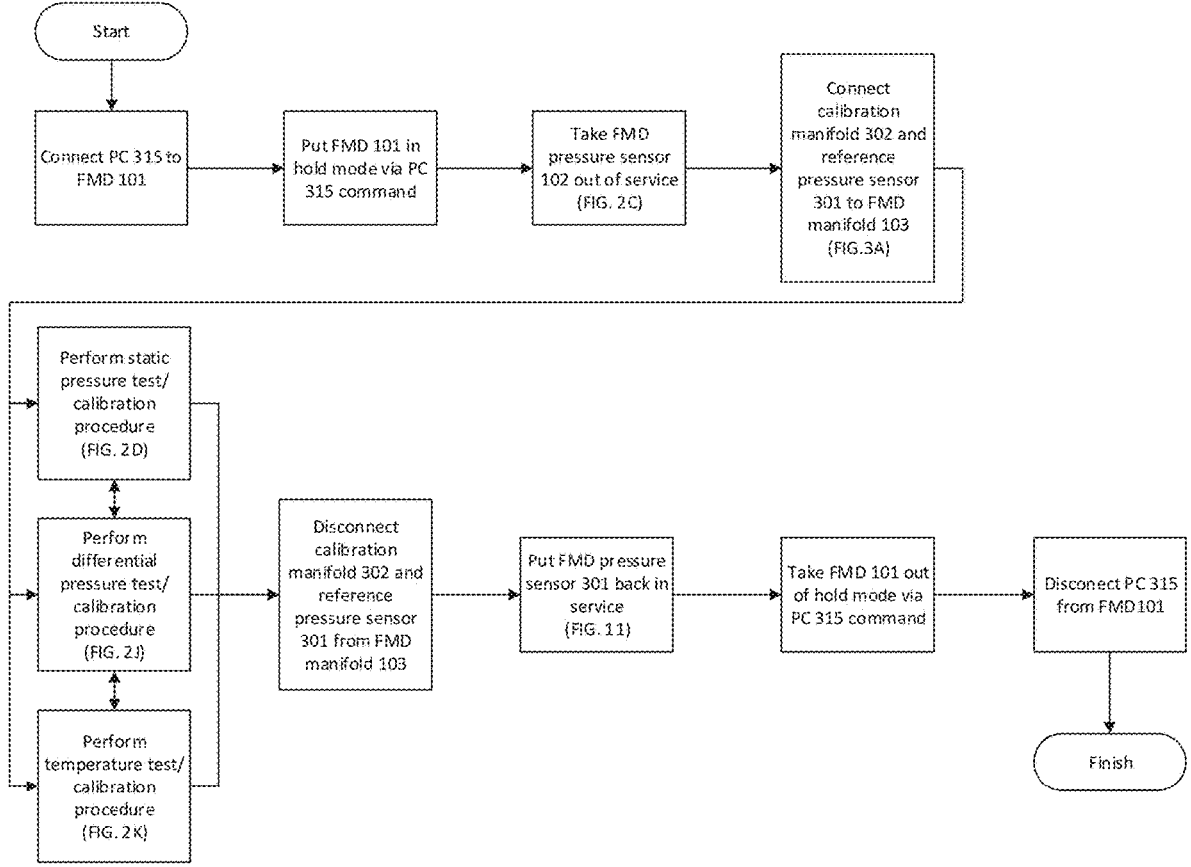
FIGS. 2B-2K depict illustrative flow diagrams for various procedures.
Figure 2C:
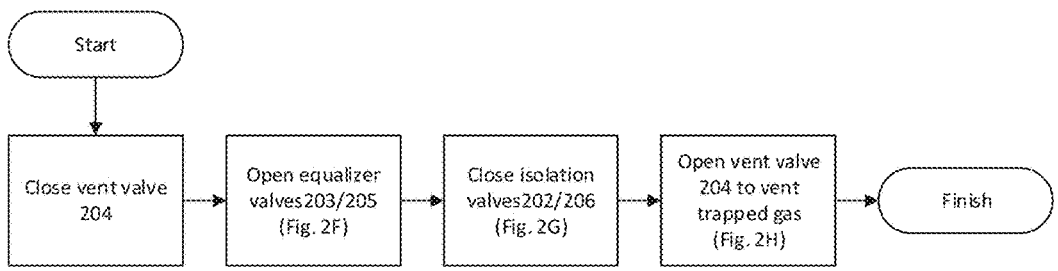
Figure 2F:
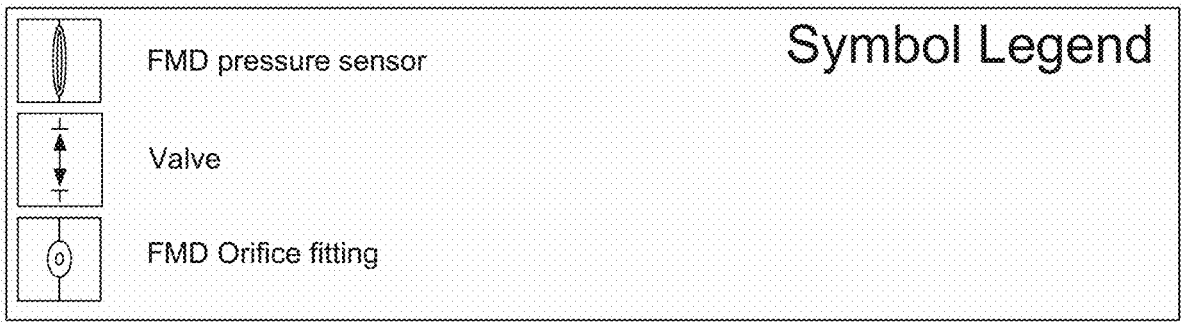
Figure 2F:
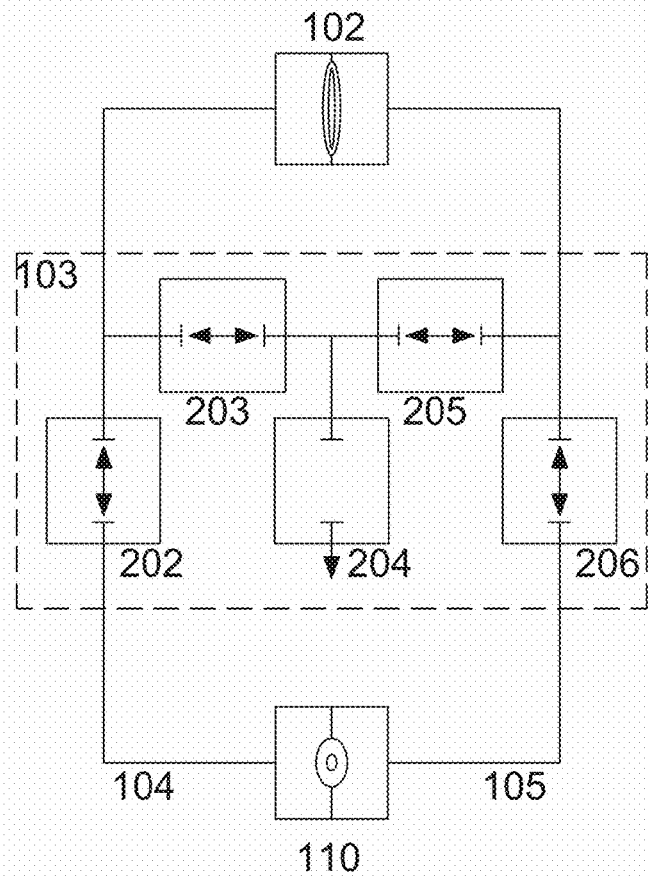
Figure 2G:
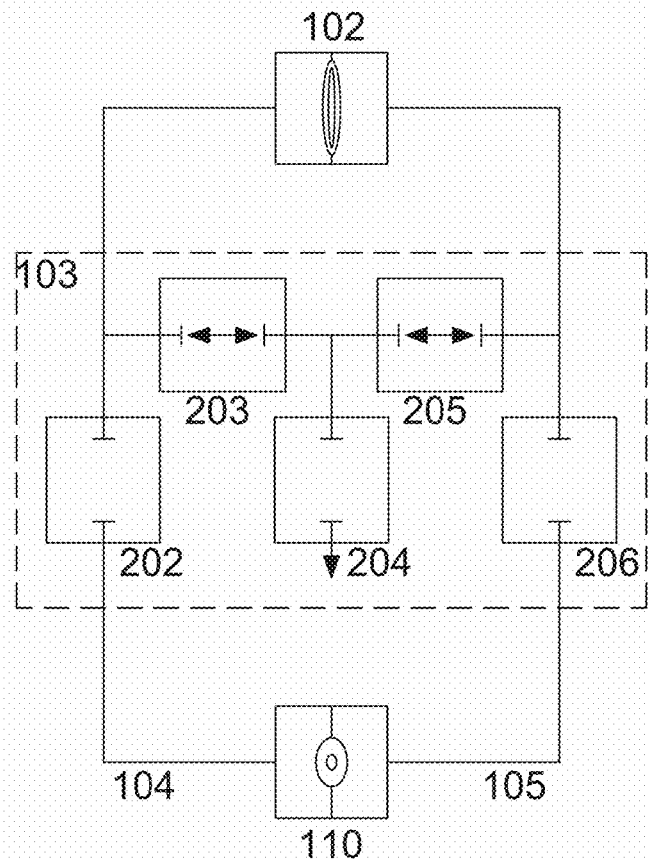
Figure 2H:
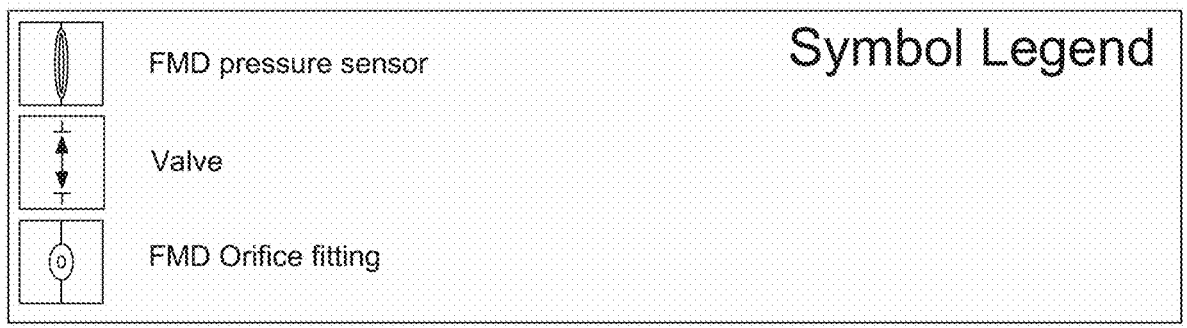
Figure 2H:
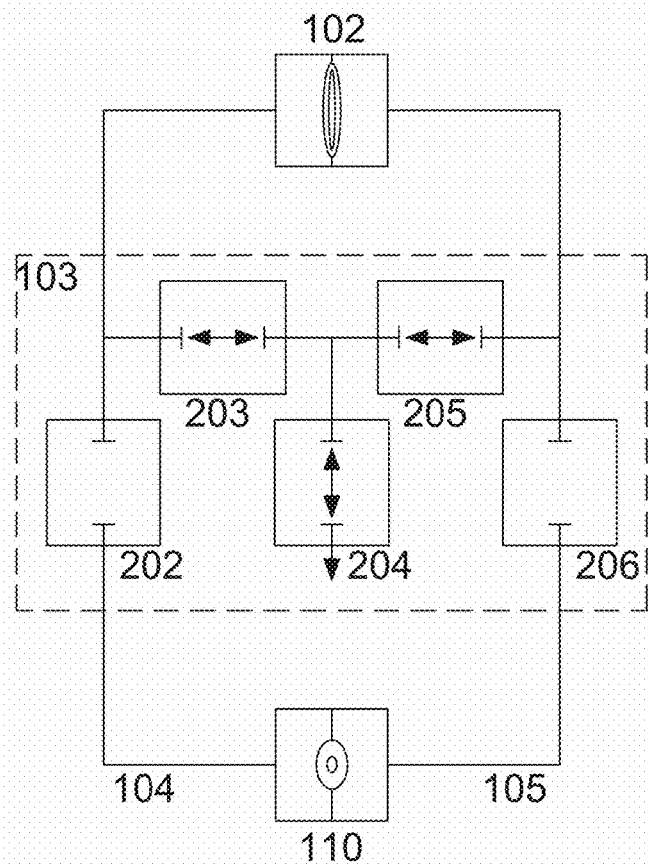
Figure 3A:
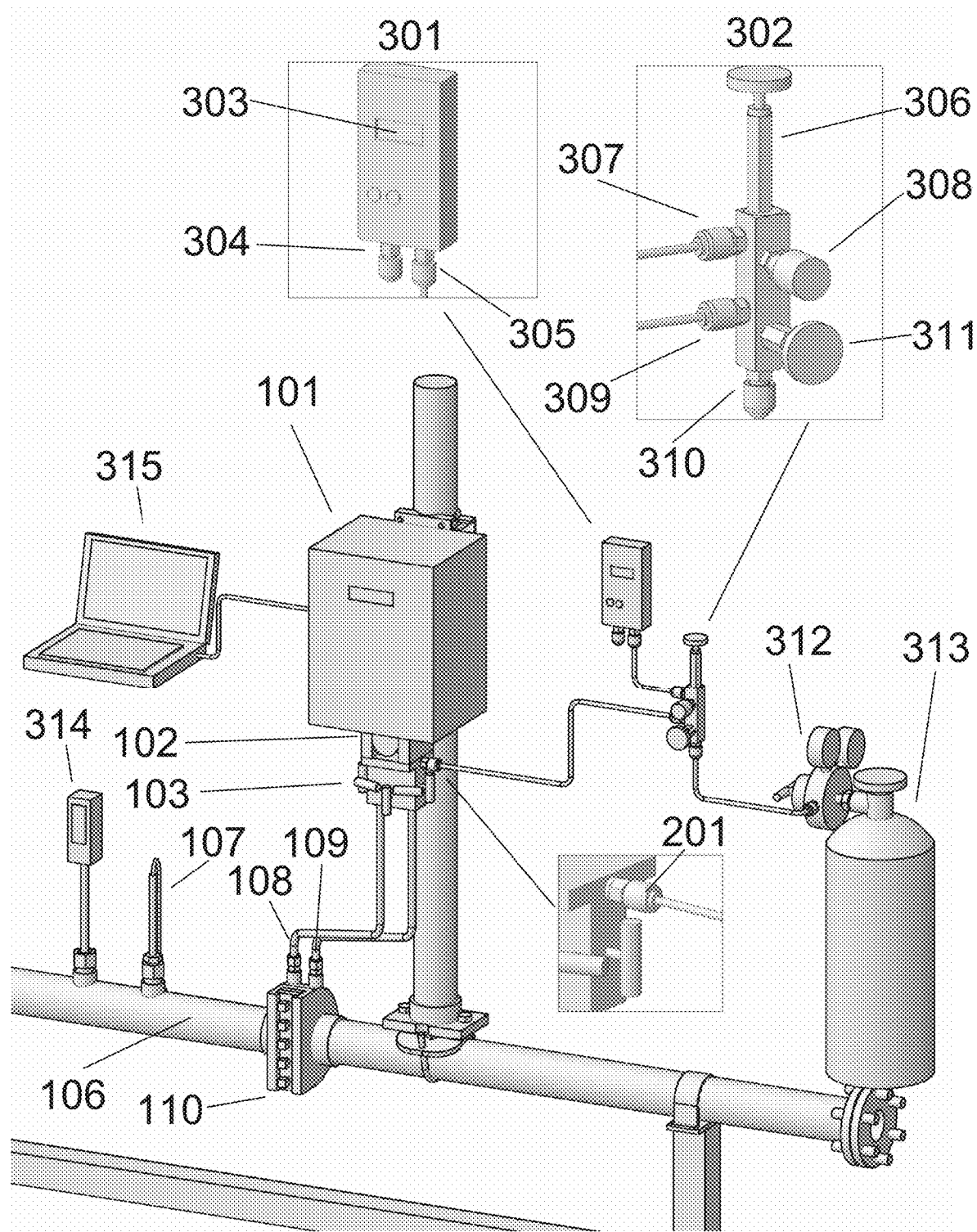
FIG. 3A depicts a drawing showing the overall components used during an on-site FMD test.

Before discussing the operation of the RCC it is convenient to explain the procedure typically performed by a measurement technician when doing onsite testing of an FMD. First, a communication connection is made between a personal computer/laptop (PC) and the FMD via a data cable or other means. The operator then commands the PC to force the FMD to enter "hold "mode, which forces the FMD to maintain the displayed pressures and temperatures that were present before conducting any manipulating of pressures or temperatures by the measurement technician throughout the test procedure. Once the FMD is locked into "hold" mode the FMD pressure sensor is then taken "out of service." This isolates the natural gas from entering the pneumatic pathways used for testing and must be done in a particular order to avoid damage to the FMD pressure sensor. FIG. 2C is an overview of the "out of service procedure." FIGS. 2F, 2G, and 2H assist in understanding the out of service procedure. FIG. 2A details a typical manifold containing the necessary valves used to take the FMD pressure sensor out of service. FIG. 3A shows the typical setup used to test an FMD. Once the FMD pressure sensor is taken out of service, the measurement technician then connects a reference pressure device 301 and calibration manifold 302 to the FMD pressure sensor via a flexible hose or any other means necessary to connect the pneumatic pathways.

Two types of pressure tests are performed on the FMD pressure sensor: static pressure tests and differential pressure tests. Another test is done for the FMD temperature sensor. For each type of test there are three procedures typically involved: 1) Record found values 2) Calibrate the FMD sensor (if desired) 3) Record left values. FIG. 2B details the basic steps involved in testing/calibrating the FMD. Record found values: Equal pressure or temperature is applied to the FMD sensor and reference device. The difference is then recorded. Calibrate the FMD sensor (if desired): Equal pressure or temperature is applied to the FMD sensor and reference device. FMD is forced to read the correct pressure or temperature. Record left values: Equal pressure or temperature is applied to the FMD sensor and reference device. The difference is recorded.

Figure 2D:
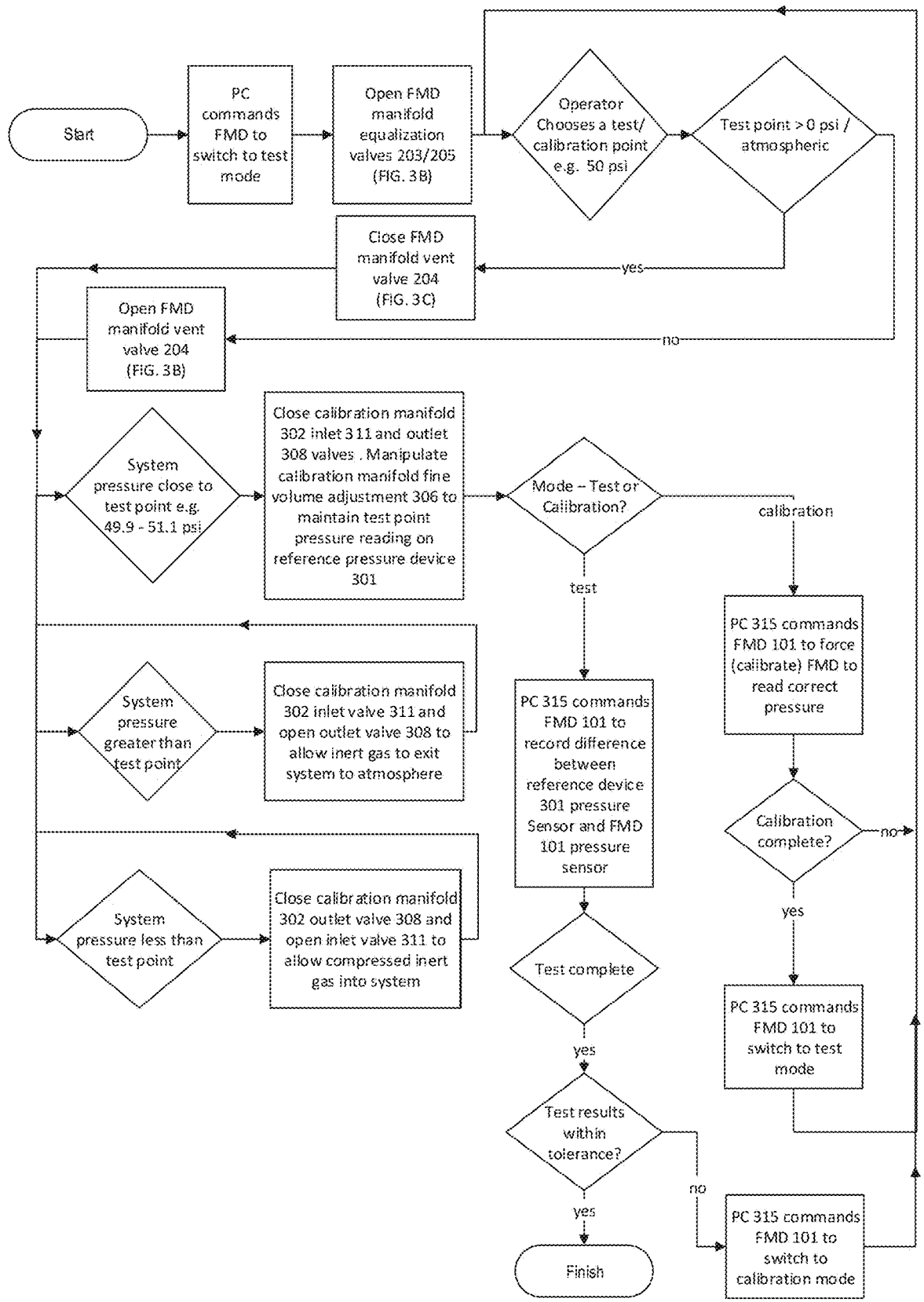
Figure 2E:
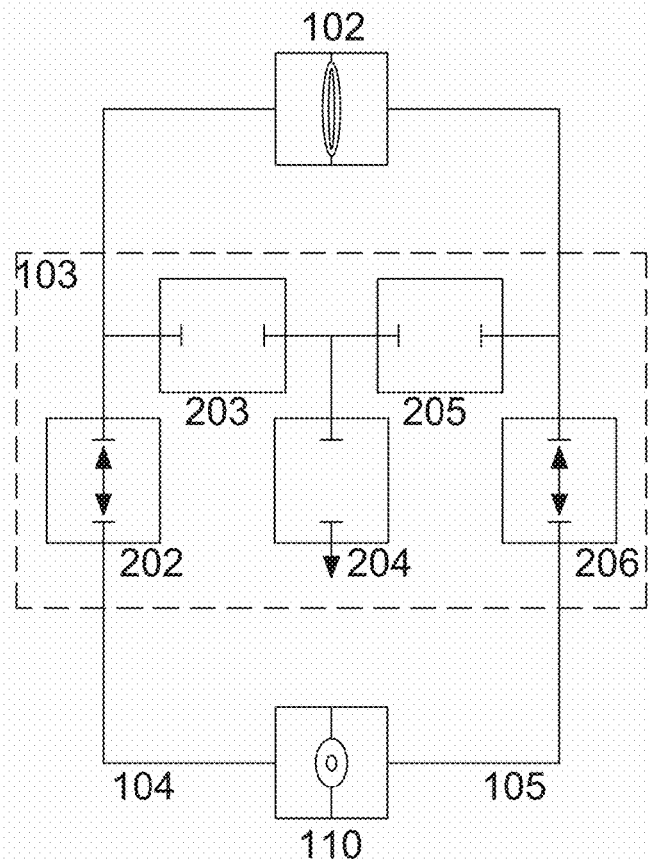

The flow chart in FIG. 2D depicts the steps involved in testing the FMD static pressure sensor. The FMD service manifold valves are opened/closed at different stages of the test procedure depending on what type of test is being performed. The following procedure describes the steps involved in testing the FMD static pressure sensor.

Figure 3B:
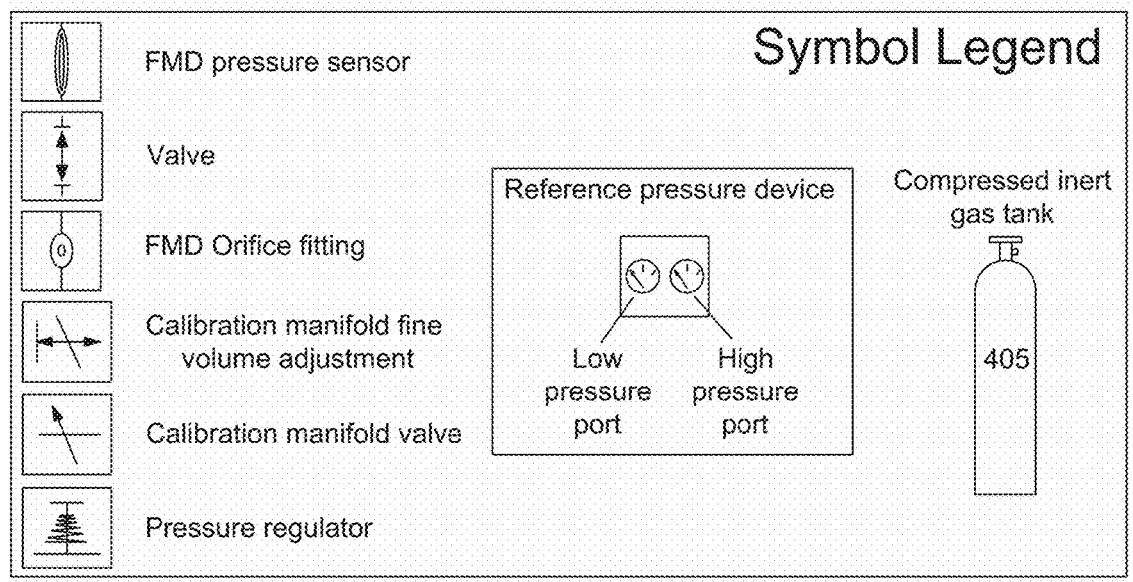
FIGS. 3B-3E depict various valve positions for various procedures.
Figure 3B:
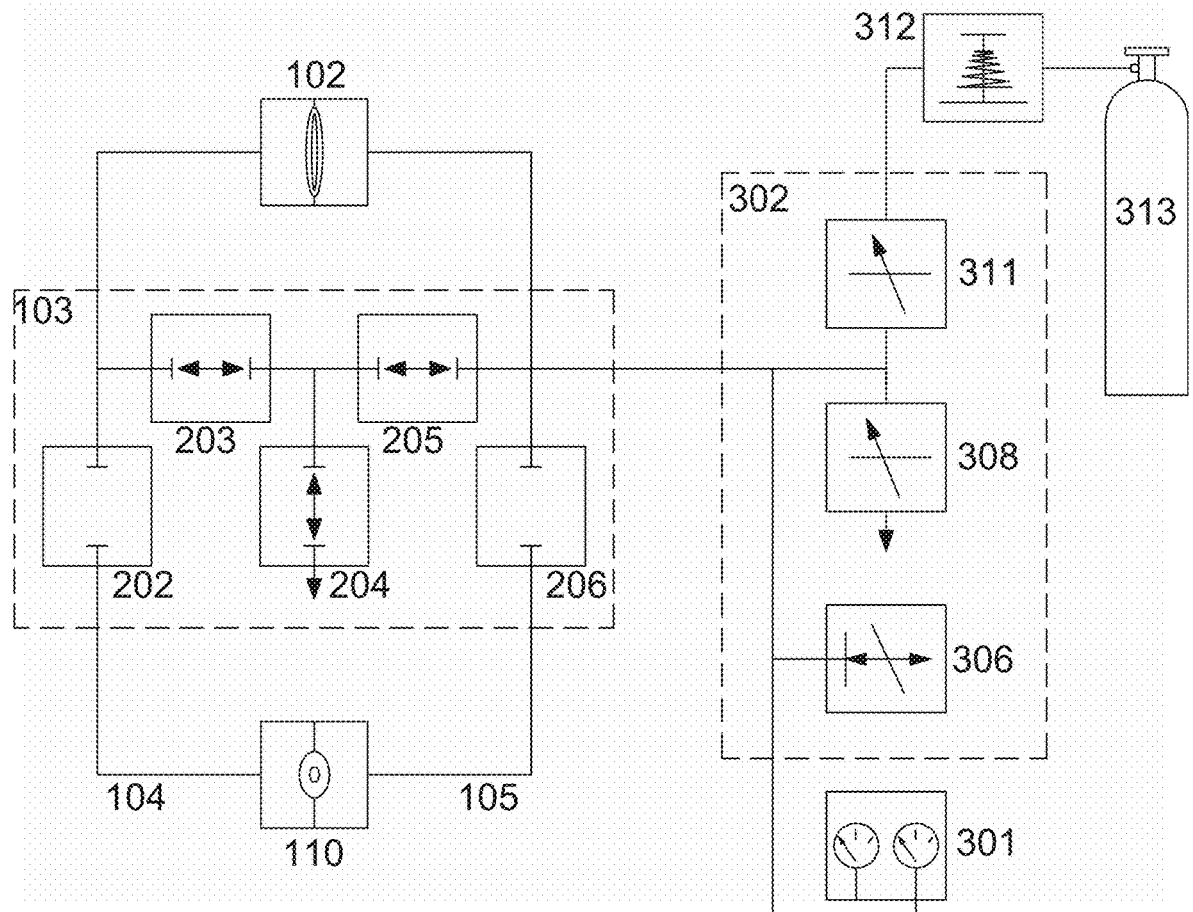

The FMD service manifold 103 valves are set to allow equal pressure to be applied to both sides of the FMD pressure sensor. This is accomplished by opening equalization valves 203 and 205. The vent valve 204 on the FMD service manifold is then opened to allow atmospheric pressure to be applied to the reference pressure device and FMD pressure sensor. At this point, the technician records the pressures displayed by the FMD static pressure sensor and the reference pressure device as well as the difference between the two. FIG. 3B details the valve positions required for this part of the procedure.

Since the reference pressure device is certified to be accurate, and more specifically, more accurate than the FMD pressure sensor, the FMD static pressure error is defined as how much it differs from the reference pressure device.

Figure 3C:
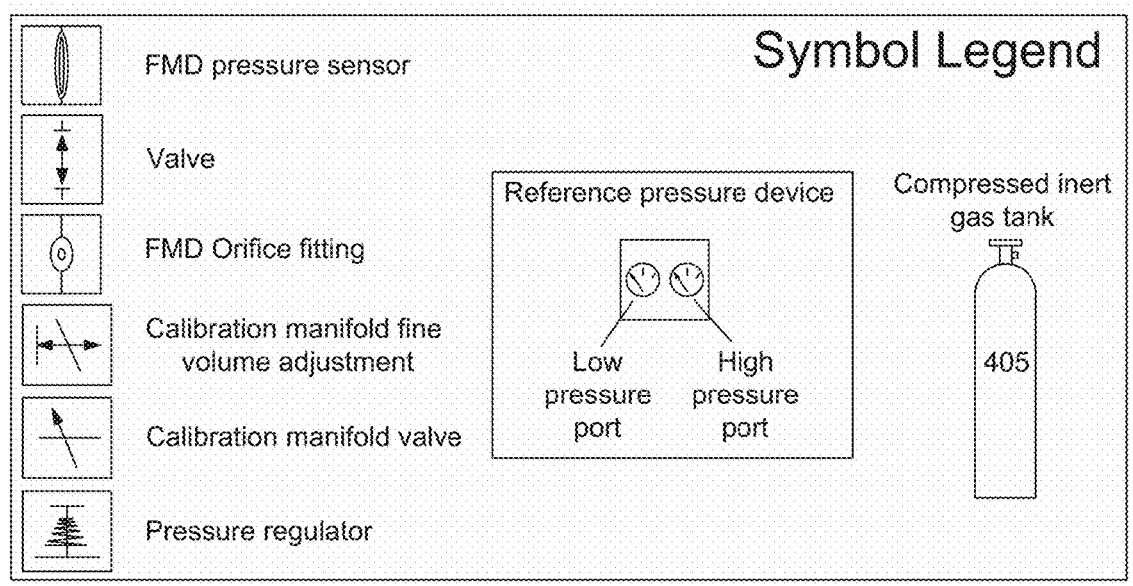
Figure 3C:
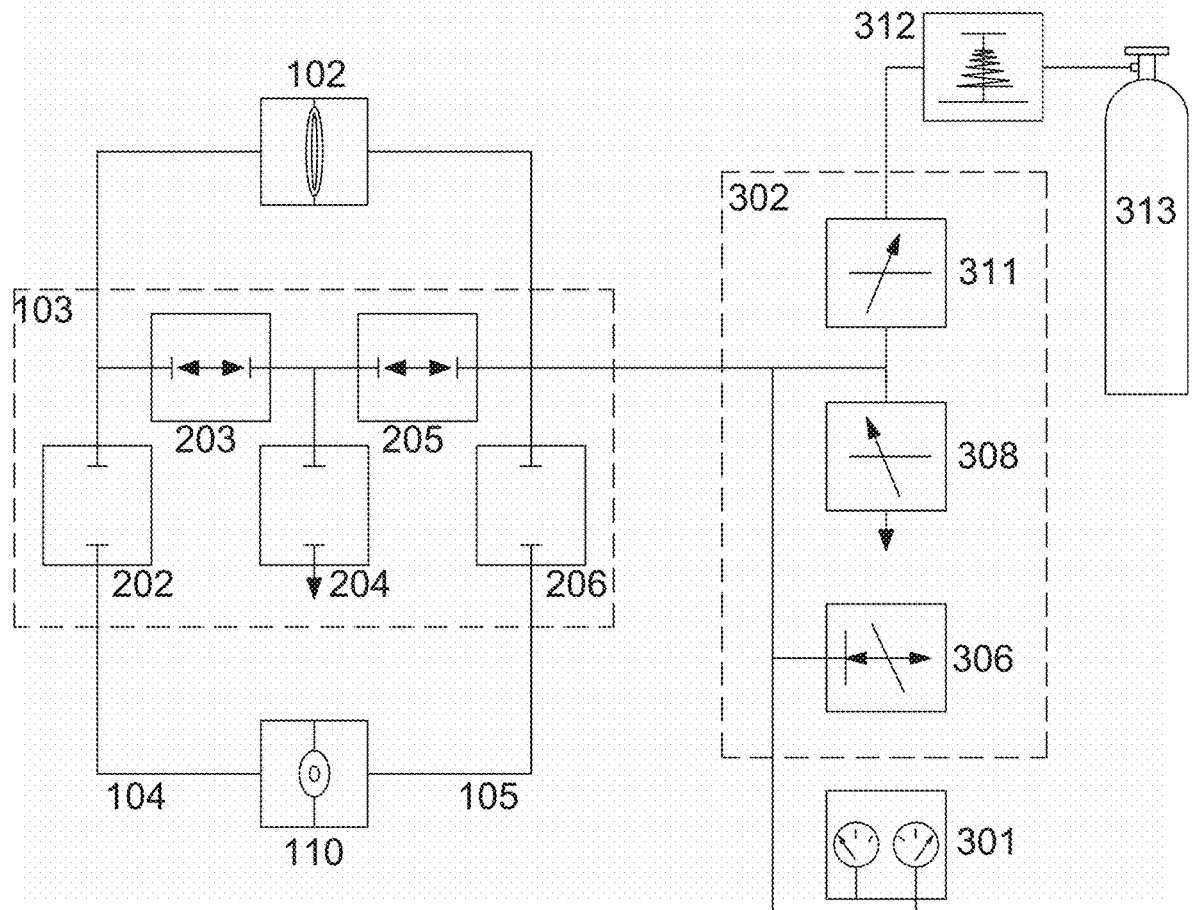

Next, the FMD service manifold vent valve 204 is closed to prepare for the next step in which the FMD static pressure sensor and reference pressure device will be exposed to pressurized inert gas. FIG. 3C details the valve positions required for this part of the procedure. To do this, the technician uses the calibration manifold 302 to control the flow of compressed inert gas to the FMD static pressure sensor and reference pressure device. The calibration manifold has an inlet valve 311, outlet valve 308 (to atmosphere), and fine adjustment valve 306 that allows precise control of compressed regulated inert gas provided by a compressed gas cylinder. The technician uses the calibration manifold to bring the inert gas to the desired test pressure on the reference pressure device and FMD static pressure sensor. At this point, the technician records the pressures displayed by the FMD and the reference pressure device as well as the difference between the two. This test procedure is performed at multiple different pressure levels. The pressures recorded as well as the error are known as "found" values. The technician must then decide if the FMD static pressure found values are within a pre-defined tolerance. If the static pressure found values are not within tolerance, the FMD is then calibrated.

To calibrate the FMD, if necessary, the same procedure as above for getting found values is followed with the exception that for each of the static pressure data points, the FMD is commanded to force its displayed pressure to be the same as that of the reference pressure device.

If calibration of the FMD static pressure sensor was done, the technician then performs the procedure to get the "left" values which is identical to the "found" values procedure. This is done to verify that the calibration of the FMD static pressure sensor is now within tolerance. If the static pressure of the FMD is still out of calibration, the calibration procedure and "left values" procedure may be performed again. This process of checking the accuracy of the FMD static pressure sensor may be performed as many times as the technician desires to attempt to correct the accuracy of the FMD static pressure sensor. If the FMD static pressure sensor fails to calibrate correctly after multiple attempts, the technician may decide that the FMD and/or FMD pressure sensor has failed.

Figure 2I:
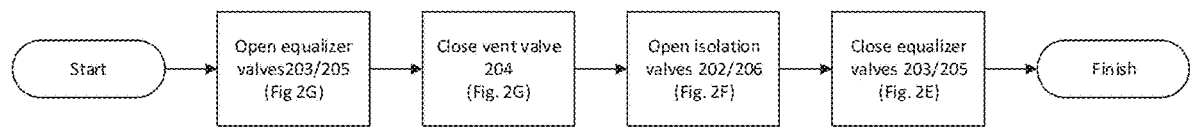
Figure 2J:
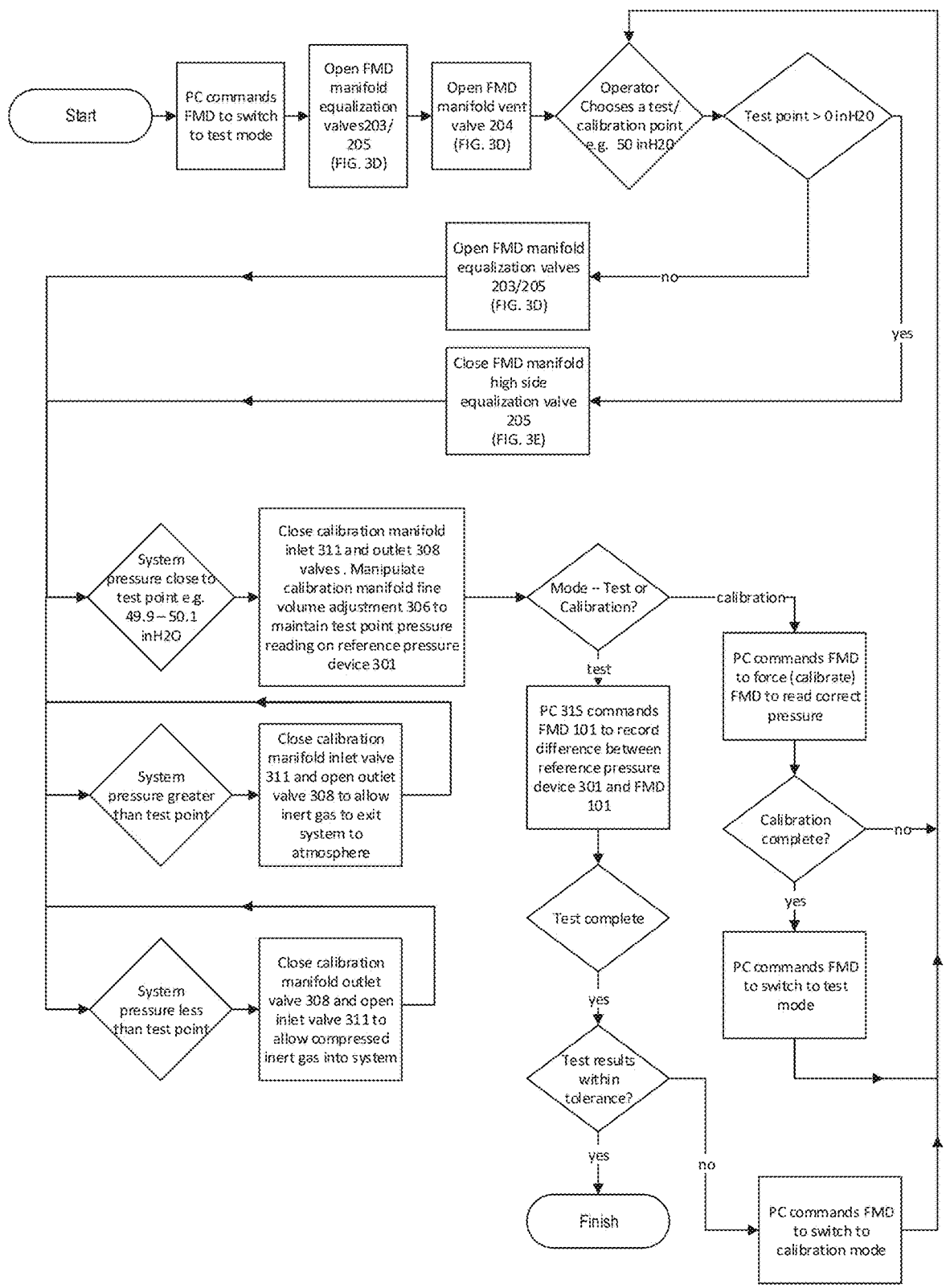
Figure 3D:
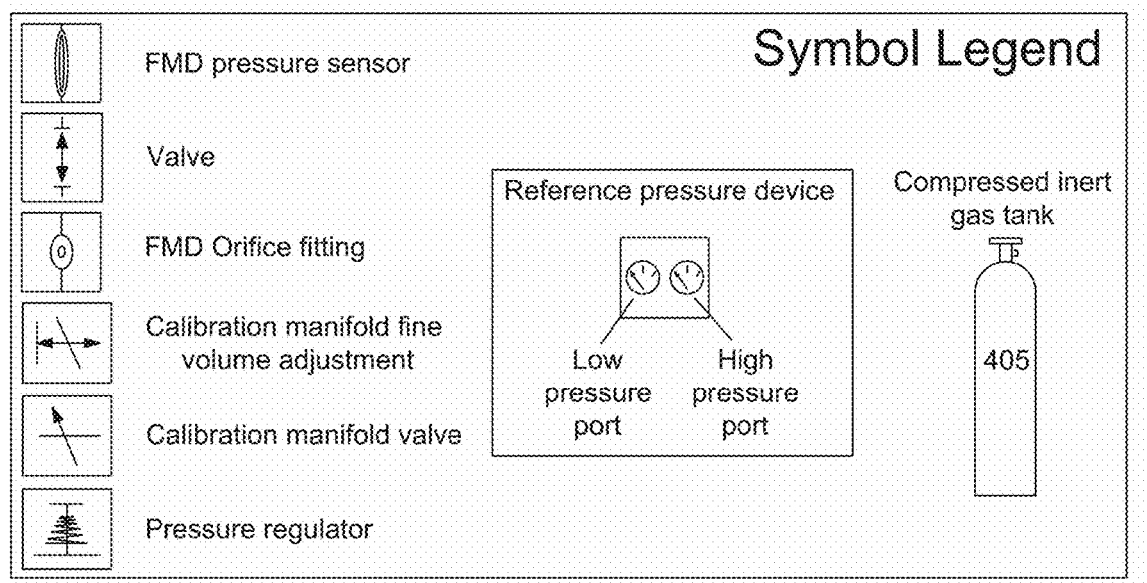
Figure 3D:
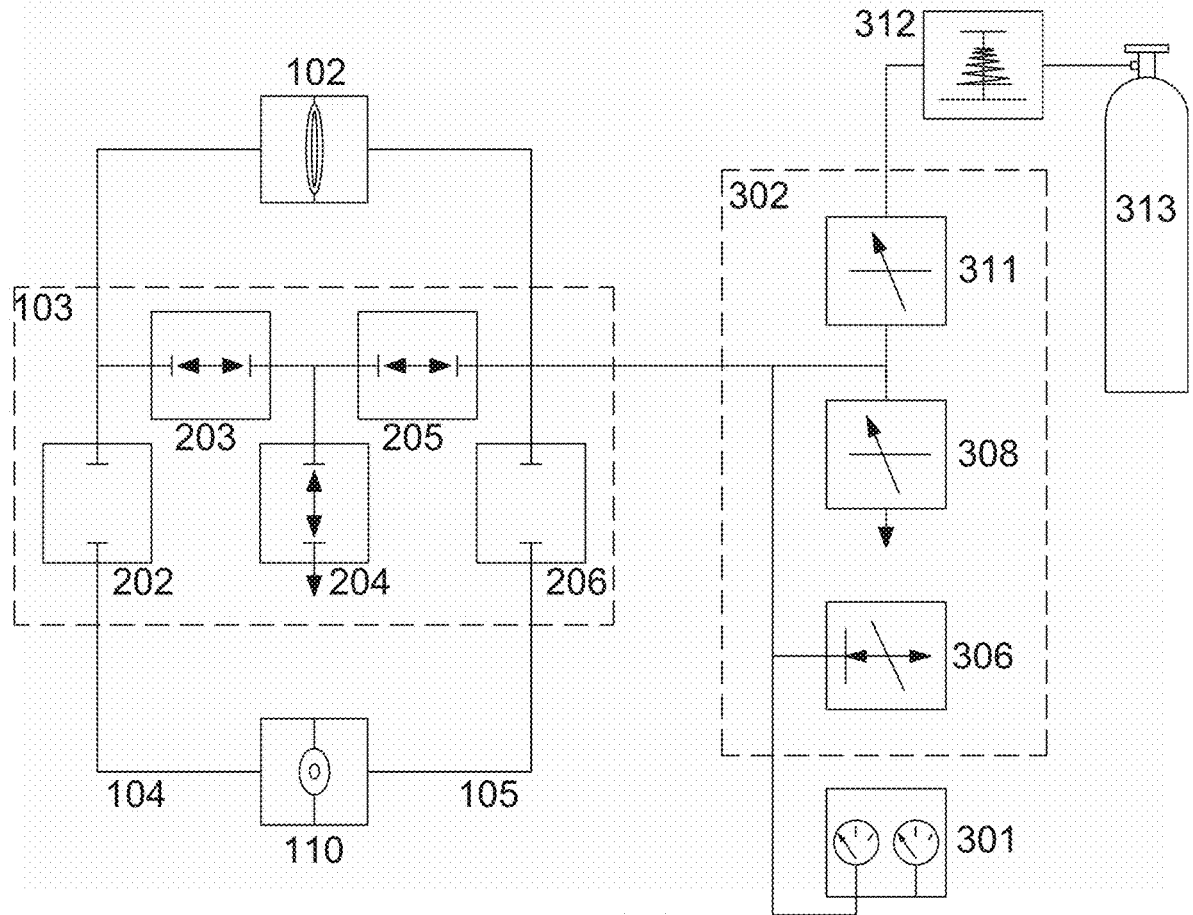

The diagram in FIG. 2J depicts the steps involved in testing the FMD differential pressure sensor. The FMD service manifold valves are set to allow equal pressure to be applied to both sides of the FMD pressure sensor. FIG. 3D details the valve positions required for this part of the procedure. This is accomplished by opening equalization valves 203 and 205. The vent valve 204 on the FMD service manifold is then opened to allow atmospheric pressure to be applied to the reference pressure device and FMD pressure sensor. At this point, the technician records the pressures displayed by the FMD differential pressure sensor and the reference pressure device as well as the difference between the two.

Since the reference pressure device is certified to be accurate, and more specifically, more accurate than the FMD pressure sensor, the FMD differential pressure error is defined as how much it differs from the reference pressure device.

Figure 3E:
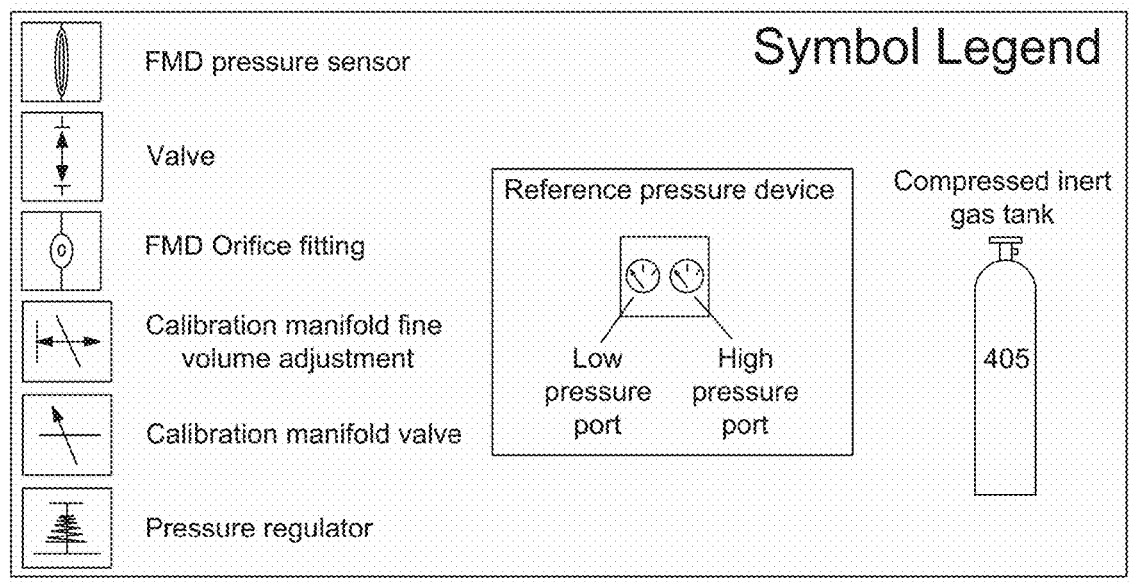
Figure 3E:
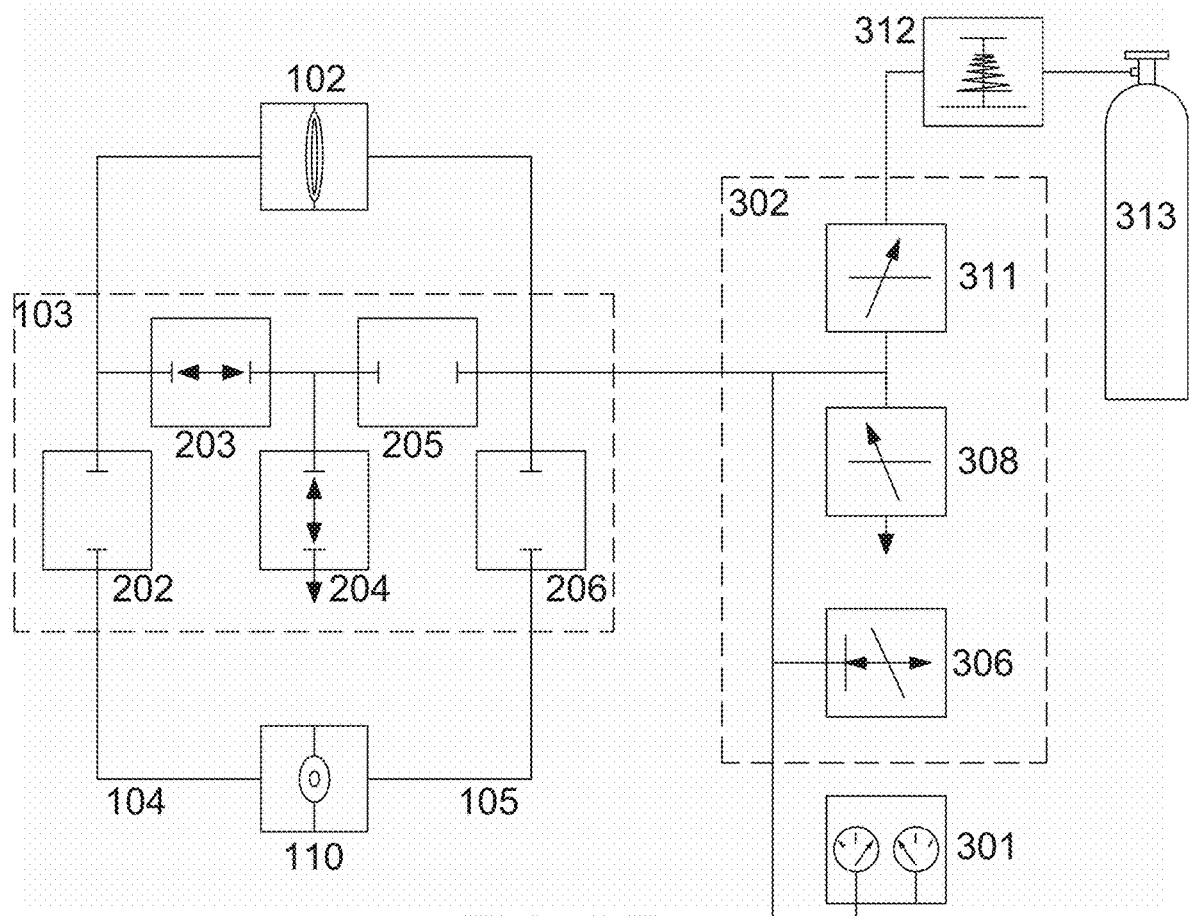

Next, the FMD service manifold high side equalization valve 205 is closed to prepare for the next step in which the FMD differential pressure sensor and reference pressure device will be exposed to pressurized inert gas. FIG. 3E details the valve positions required for this part of the procedure.

To do this, the technician uses the calibration manifold 302 to control the flow of compressed inert gas to the FMD differential pressure sensor and reference pressure device. The calibration manifold has an inlet valve 311, outlet valve 308 (to atmosphere), and fine adjustment valve 306 that allows precise control of compressed regulated inert gas provided by a compressed gas cylinder. The technician uses the calibration manifold to bring the inert gas to the desired test pressure on the reference pressure device and FMD differential pressure sensor. At this point, the technician records the pressures displayed by the FMD and the reference pressure device as well as the difference between the two. This test procedure is performed at multiple pressure levels. The pressures recorded as well as the error are known as "found" values. The technician must then decide if the FMD differential pressure found values are within a predefined tolerance. If the differential pressure found values are not within tolerance, the FMD is then calibrated.

To calibrate the FMD, if necessary, the same procedure as above for getting found values is followed with the exception that for each of the differential pressure data points, the FMD is commanded to force its displayed pressure to be the same as that of the reference pressure device.

If calibration of the FMD differential pressure sensor was done, the technician then performs the procedure to get the "left" values which is identical to the "found" values procedure. This is done to verify that the calibration of the FMD differential pressure sensor is now within tolerance. If the differential pressure of the FMD is still out of tolerance, the calibration procedure and "left values" procedure may be performed again. This process of checking the accuracy of the FMD differential pressure sensor may be performed as many times as the technician desires in order to attempt to correct the accuracy of the FMD differential pressure sensor. If the FMD differential pressure sensor fails to calibrate correctly after multiple attempts, the technician may decide that the FMD and/or FMD pressure sensor has failed.

To test/calibrate the FMD temperature sensor the reference temperature device 314 is placed in the same conditions as the FMD temperature sensor 107. Since the reference temperature device is certified to be accurate, and more specifically, more accurate than the FMD temperature sensor, the FMD temperature error is defined as how much it differs from the reference temperature device. At this point, the technician records the temperature displayed by the FMD temperature sensor and the reference temperature device as well as the difference between the two.

The temperatures recorded as well as the error are known as "found" values. The technician must then decide if the FMD temperature pressure found values are within a predefined tolerance. If the FMD temperature found values are not within tolerance, the FMD is then calibrated.

To calibrate the FMD, if necessary, the FMD is commanded to force its displayed temperature to be the same as that of the reference temperature device.

If calibration of the FMD differential temperature sensor was done, the technician then performs the procedure to get the "left" values which is identical to the "found" values procedure. This is done to verify that the calibration of the FMD temperature pressure sensor is now within tolerance. If the temperature of the FMD is still out of tolerance, the calibration procedure and "left values" procedure may be performed again. This process of checking the accuracy of the FMD temperature sensor may be performed as many times as the technician desires in order to attempt to correct the accuracy of the FMD temperature sensor. If the FMD temperature sensor fails to calibrate correctly after multiple attempts, the technician may decide that the FMD and/or FMD temperature sensor has failed.

Once all tests have been completed. The technician disconnects the reference pressure device and calibration manifold from the FMD pressure sensor. Next, the FMD pressure sensor is put back "in service". The diagram in FIG. 2I depicts the steps involved in placing the FMD pressure sensor back in service. FIGS. 2F, 2G, and 2H will assist in understanding the "in service" procedure. Once the FMD is placed back into service, the operator commands the FMD to exit "hold" mode so that the FMD will begin to read the actual flow rate of the gas in the meter tube. The operator then disconnects the laptop/pc from the FMD.

In one or more embodiments, an RCC system may utilize a single board computer (SBC) pre-loaded with software that is capable of executing the instructions associated with the RCC system. This software may incorporate a web server that provides the user a web-based graphical user interface (GUI). The GUI and the direct access to the SBC are made available locally as well as from a remote location via bi-directional communication.

In one or more embodiments, an RCC system may utilize a network connection through TCP/IP protocol to the SBC. Communication is also available between the SBC and the FMD on-site.

In one or more embodiments, an RCC system may utilize a network connection through TCP/IP protocol between the SBC and FMD as well.

In one or more embodiments, the control of the SBC and manipulation of program parameters are performed through the web-based GUI. The SBC can read many types of inputs (e.g., static pressure, differential pressure, temperature, atmospheric pressure, ambient temperature, digital inputs, etc.) and control outputs (solenoid valves, servo motors). Hereafter, the terms RCC and SBC are used interchangeably, e.g., "the RCC opens equalization solenoid 505" is equivalent to "the SBC inside the RCC enclosure opens equalization solenoid 505."

In one or more embodiments, the test/calibration procedure is carried out by the RCC at preset intervals and/or as often as is deemed necessary by the owner. Manual control of all system components is also available. FIG. 5D shows the overall process the RCC utilizes in the test procedure.

In one or more embodiments, the pressure to the RCC system may be supplied by regulated inert gas from a small on-site compressed gas cylinder. In one or more embodiments, the regulated compressed inert gas is connected to a calibration manifold that has an inlet, an outlet, and fine volume adjustment valves. In one or more embodiments, these valves are controlled by servo motors whose positions are controlled by the SBC. In one or more embodiments, pressure, relief, and containment are also controlled by solenoids controlled by the SBC. In one or more embodiments, additional solenoids controlled by the SBC are used to take the FMD out of service to allow the test/calibration procedure to ensue, and back into service so that normal flow measurement may proceed once the test is complete.

A detailed description of the components in each of the drawings associated with the RCC follows.

FIG. 1A is an overall view of a typical fixed orifice plate measurement tube, flow measurement device, and associated components. Flow Measurement Device (FMD) 101, FMD pressure sensor 102, FMD service manifold 103, tubing 104 between orifice fitting downstream flange tap and FMD service manifold, tubing 105 between orifice fitting upstream flange tap and FMD service manifold, FMD meter tube 106, FMD temperature sensor 107, orifice fitting downstream flange tap 108, orifice fitting upstream flange tap 109, orifice fitting 110.

Figure 1B:
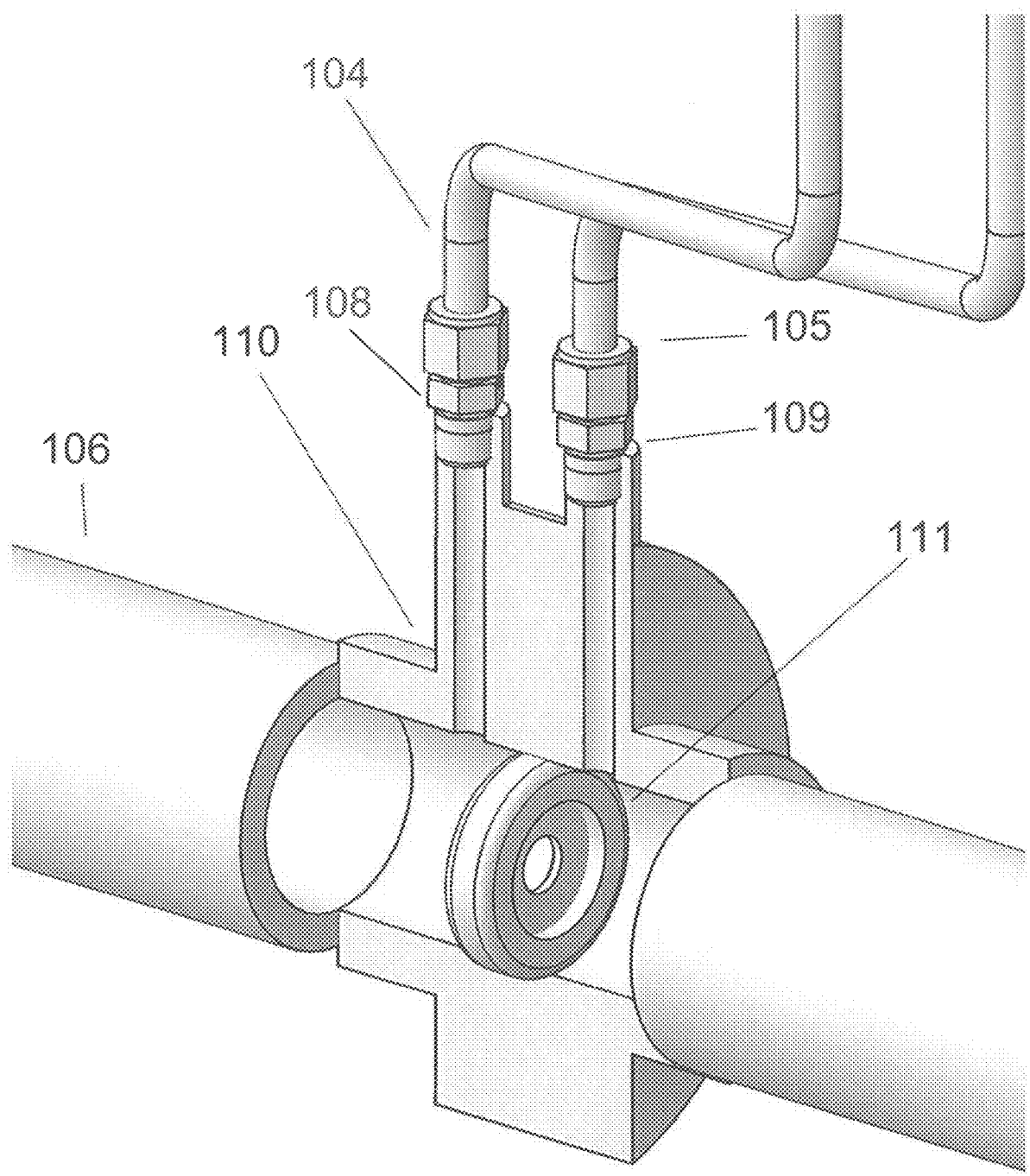
FIG. 1B depicts a cutaway view of the orifice fitting on a typical fixed orifice plate measurement tube.

FIG. 1B is a cutaway view of the orifice fitting on a typical fixed orifice plate measurement tube (e.g., orifice plate 111).

FIG. 2A is a view of an FMD pressure sensor and FMD service manifold. FMD service manifold upstream test port 201, FMD service manifold downstream isolation valve 202, FMD service manifold downstream equalization valve 203, FMD service manifold vent to atmosphere valve 204, FMD service manifold upstream equalization valve 205, FMD service manifold upstream isolation valve 206, exhaust port 207 from FMD service manifold vent to atmosphere valve.

FIG. 2F is a process diagram showing the FMD service manifold valve configuration for equalization of pressures across the FMD pressure sensor.

FIG. 2G is a process diagram showing the FMD service manifold valve configuration for isolation of the natural gas from the FMD meter tube and the FMD pressure sensor.

FIG. 2H is a process diagram showing the FMD service manifold valve configuration for venting the natural gas trapped between the FMD pressure sensor and isolation valves to the atmosphere.

FIG. 2I is a flow diagram showing the overall steps to perform an on-site FMD "back-in-service" procedure.

FIG. 2J is a flow diagram showing the overall procedure to perform an on-site FMD differential pressure test/calibration.

Figure 2K:
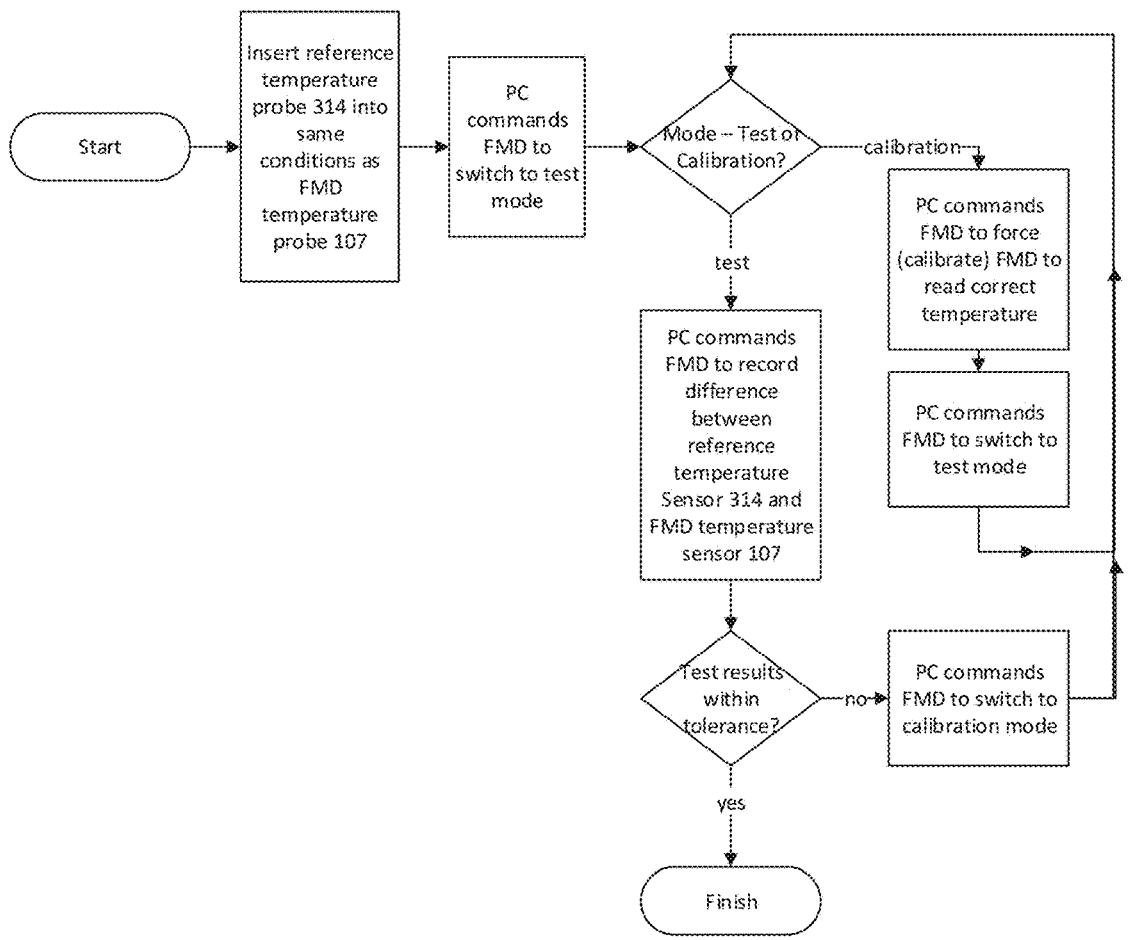

FIG. 2K is a flow diagram showing the overall procedure to perform an on-site FMD temperature test/calibration.

FIG. 3A is a drawing showing the overall components used during an on-site FMD test. Reference pressure device 301, calibration manifold 302, reference pressure device display 303, reference pressure device low pressure port 304, reference pressure device low pressure port 305, fine volume adjustment valve 306, outlet 307, outlet/vent to atmosphere valve 308, outlet 309, inlet 310 from the compressed inert gas source, inlet valve 311, compressed inert gas pressure regulator 312, compressed inert gas tank 313, reference temperature device 314, pc/laptop 315

FIG. 3B is a process diagram showing the FMD service manifold valve configuration and technician test equipment configuration for testing/calibrating FMD static pressure at atmospheric conditions.

FIG. 3C is a process diagram showing the FMD service manifold valve configuration and technician test equipment configuration for testing/calibrating FMD static pressure.

FIG. 3D is a process diagram showing the FMD service manifold valve configuration and technician test equipment configuration for testing/calibrating FMD differential pressure at zero differential.

FIG. 3E is a process diagram showing the FMD service manifold valve configuration and technician test equipment configuration for testing/calibrating FMD differential pressure.

Figure 4:
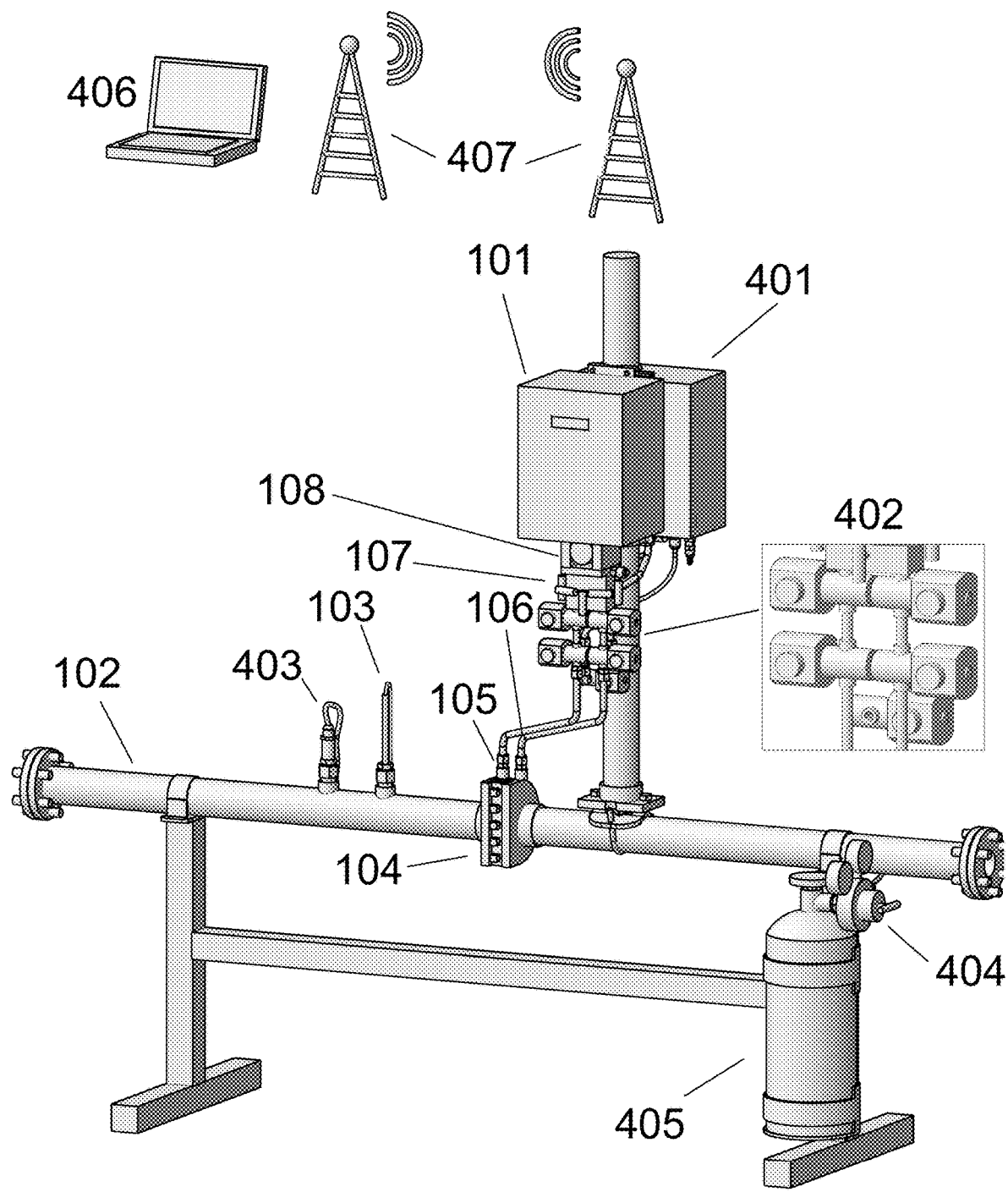
FIG. 4 depicts an illustrative schematic diagram for RCC, in accordance with one or more example embodiments of the present disclosure.

FIG. 4 is a drawing showing the overall components of the RCC. Remote calibration controller (RCC) enclosure 401, FMD solenoid manifold 402, RCC reference temperature device 403, compressed inert gas pressure regulator 404, compressed inert gas tank 405, user pc/laptop at remote location 406, remote communication equipment/communication equipment 407.

Figure 5A:
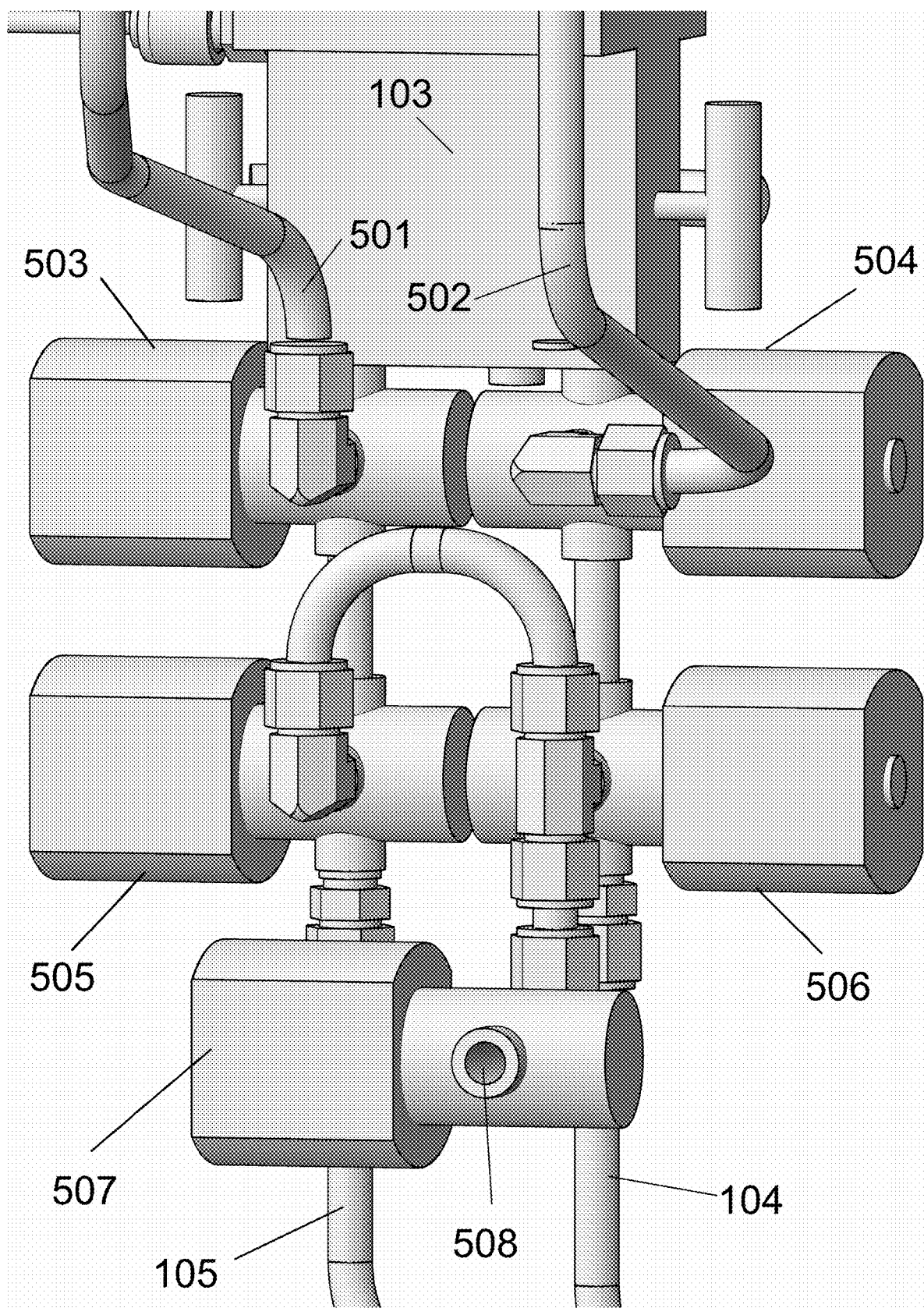
FIG. 5A depicts a drawing showing components of an FMD solenoid manifold, in accordance with one or more example embodiments of the present disclosure.

FIG. 5A is a drawing showing the components of the FMD solenoid manifold. Tubing 501 from FMD solenoid manifold upstream test valve to RCC enclosure, tubing 502 from FMD solenoid manifold downstream test valve to RCC enclosure, RCC upstream 3-way universal test solenoid valve 503, RCC downstream 3-way universal test solenoid valve 504, upstream equalization/isolation 3-way universal solenoid valve 505, downstream equalization/isolation 3-way universal solenoid valve 506, RCC 2-way universal vent/exhaust to atmosphere solenoid valve 507, exhaust port 508.

Figure 5B:
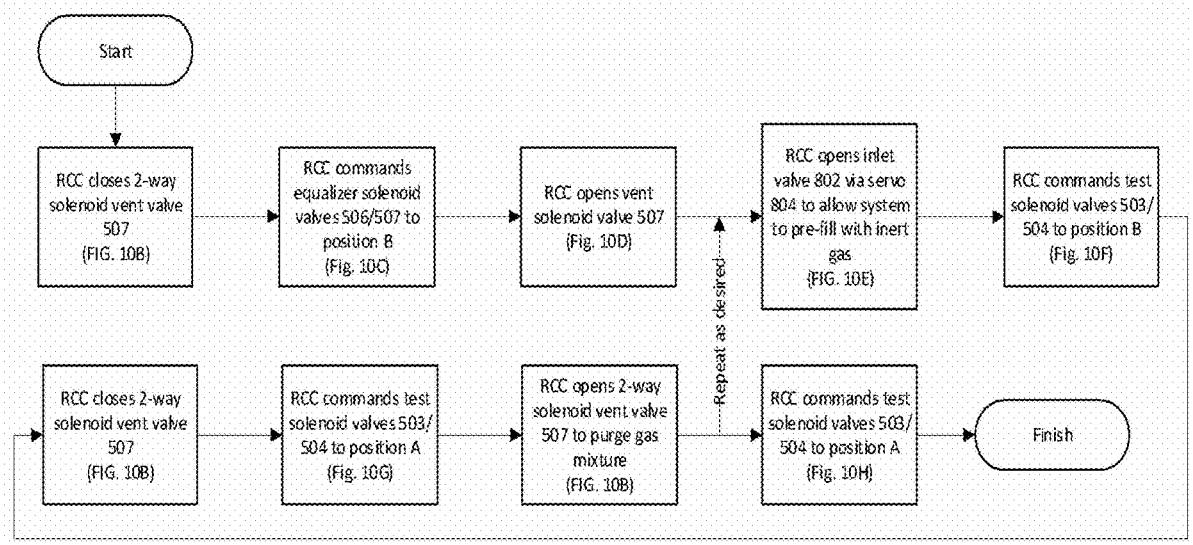
FIGS. 5B-5G depict illustrative flow diagrams for RCC, in accordance with one or more example embodiments of the present disclosure.

FIG. 5B is a flow diagram showing the overall steps the RCC follows to perform an FMD "out-of-service" procedure.

Figure 5C:
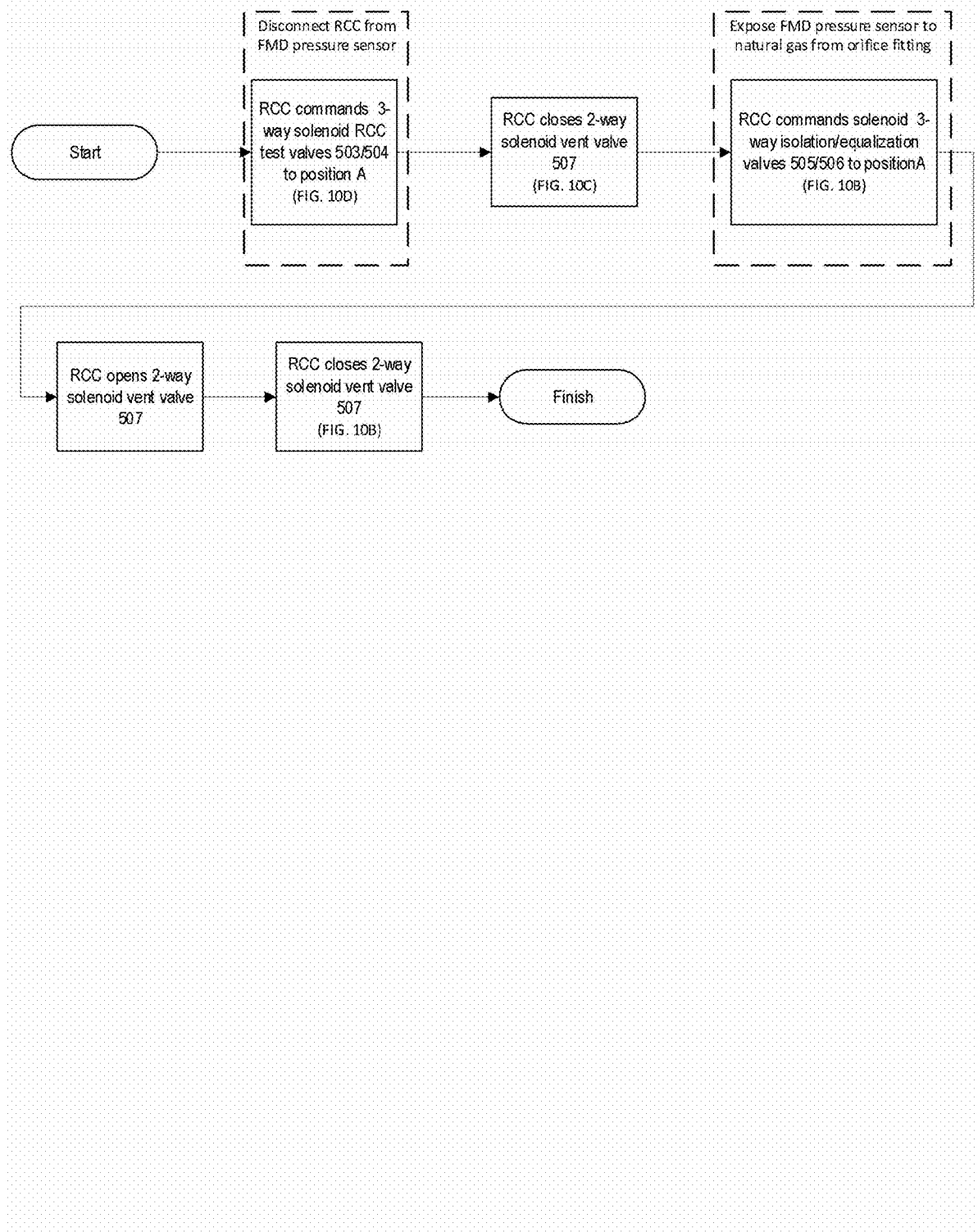
Figure 5D:
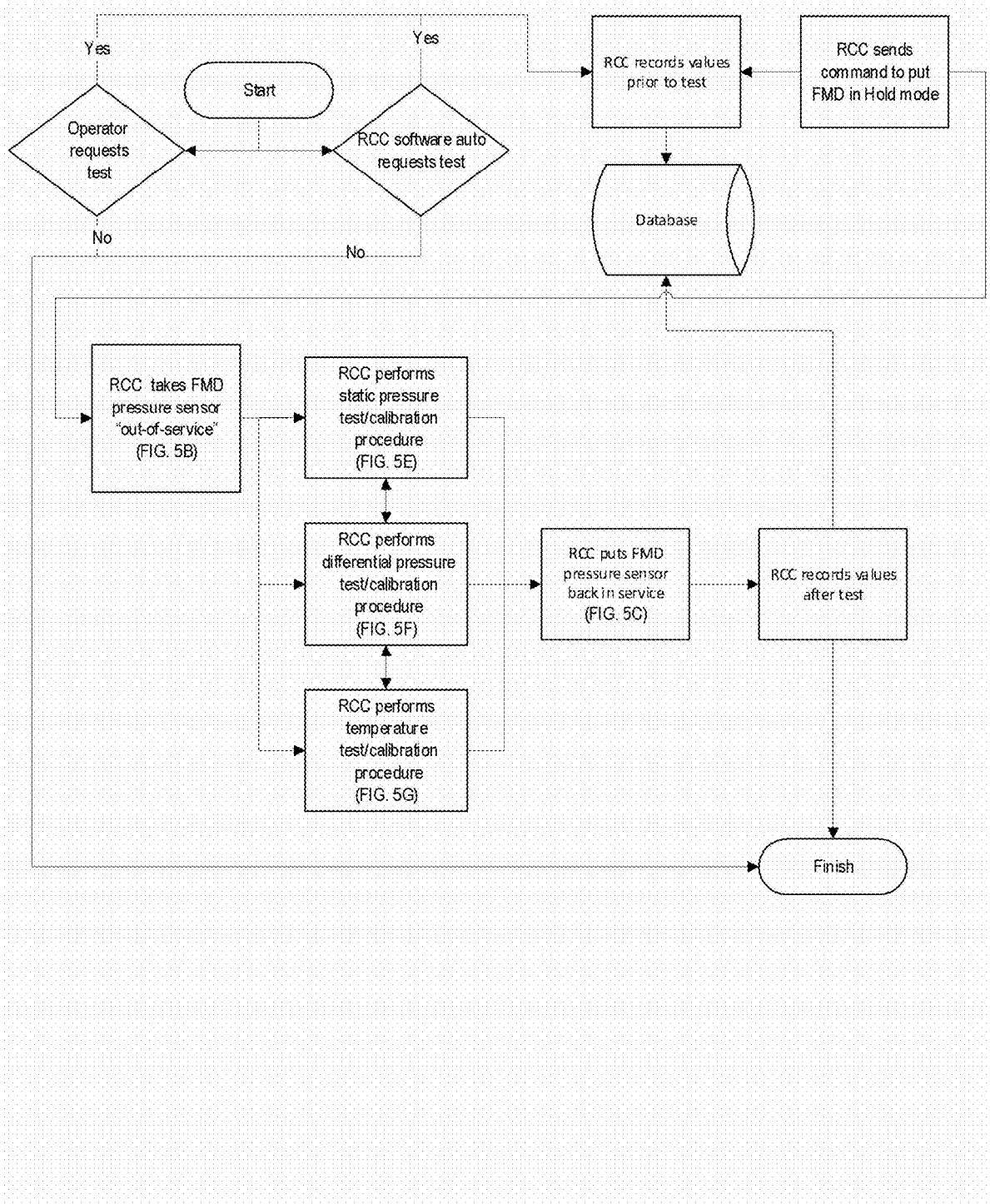

FIG. 5C is a flow diagram showing the overall steps the RCC follows to perform an FMD "in-service" procedure.

FIG. 5D is a flow diagram showing the overall procedure the RCC follows to perform the test of an FMD.

Figure 5E:
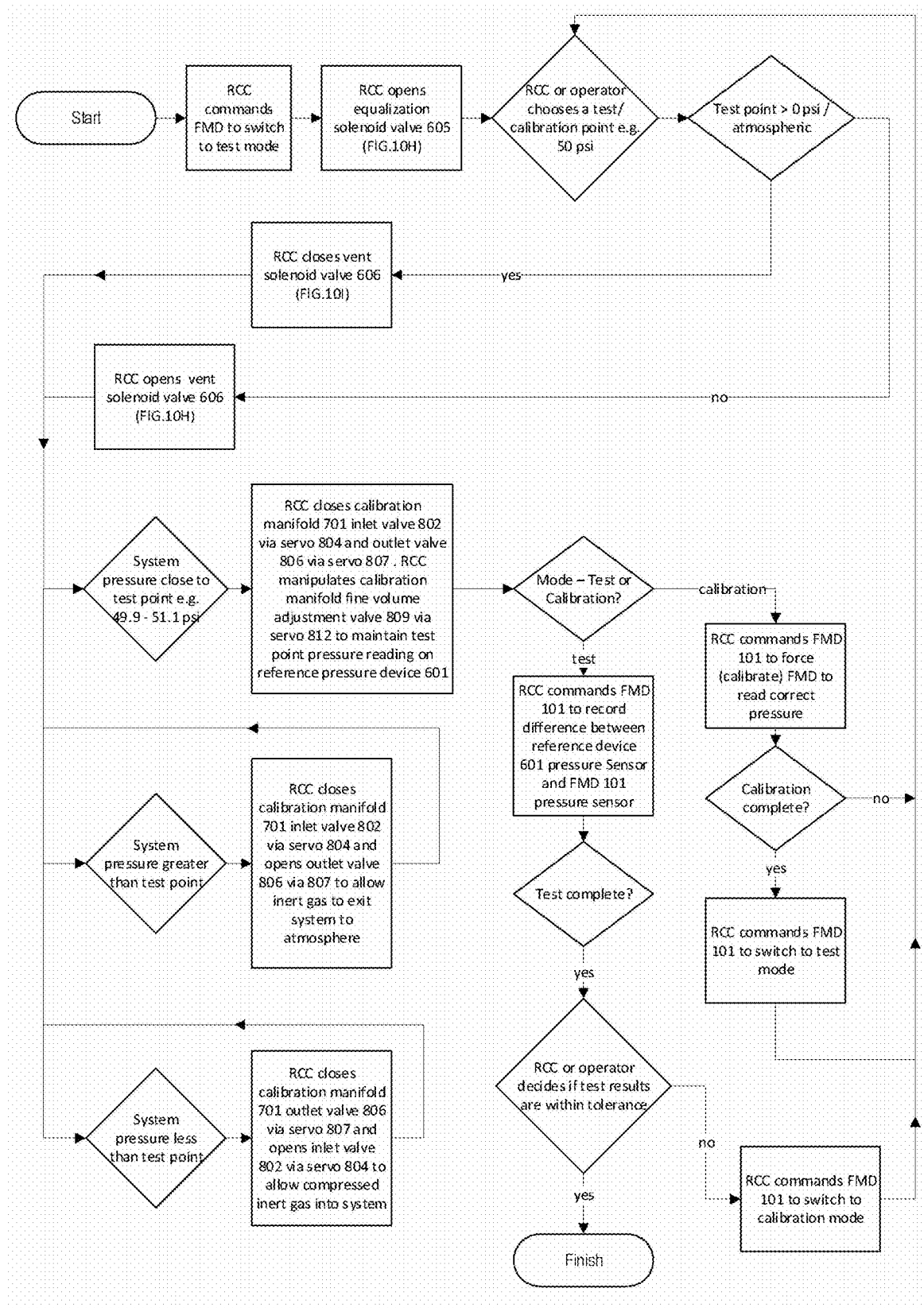

FIG. 5E is a flow diagram showing the overall procedure of the RCC FMD static pressure test/calibration.

Figure 5F:
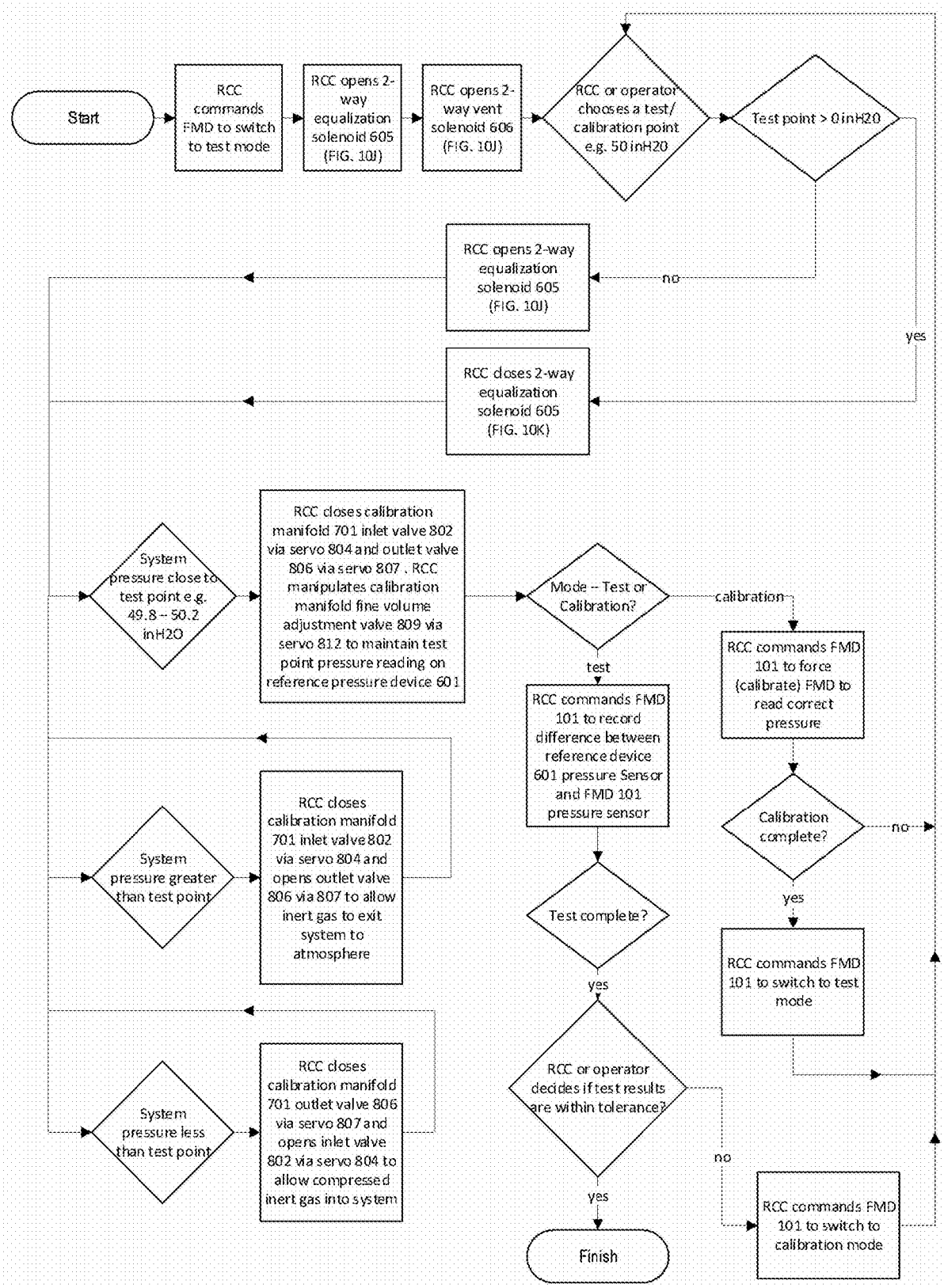

FIG. 5F is a flow diagram showing the overall procedure of the RCC FMD differential pressure test/calibration.

Figure 5G:
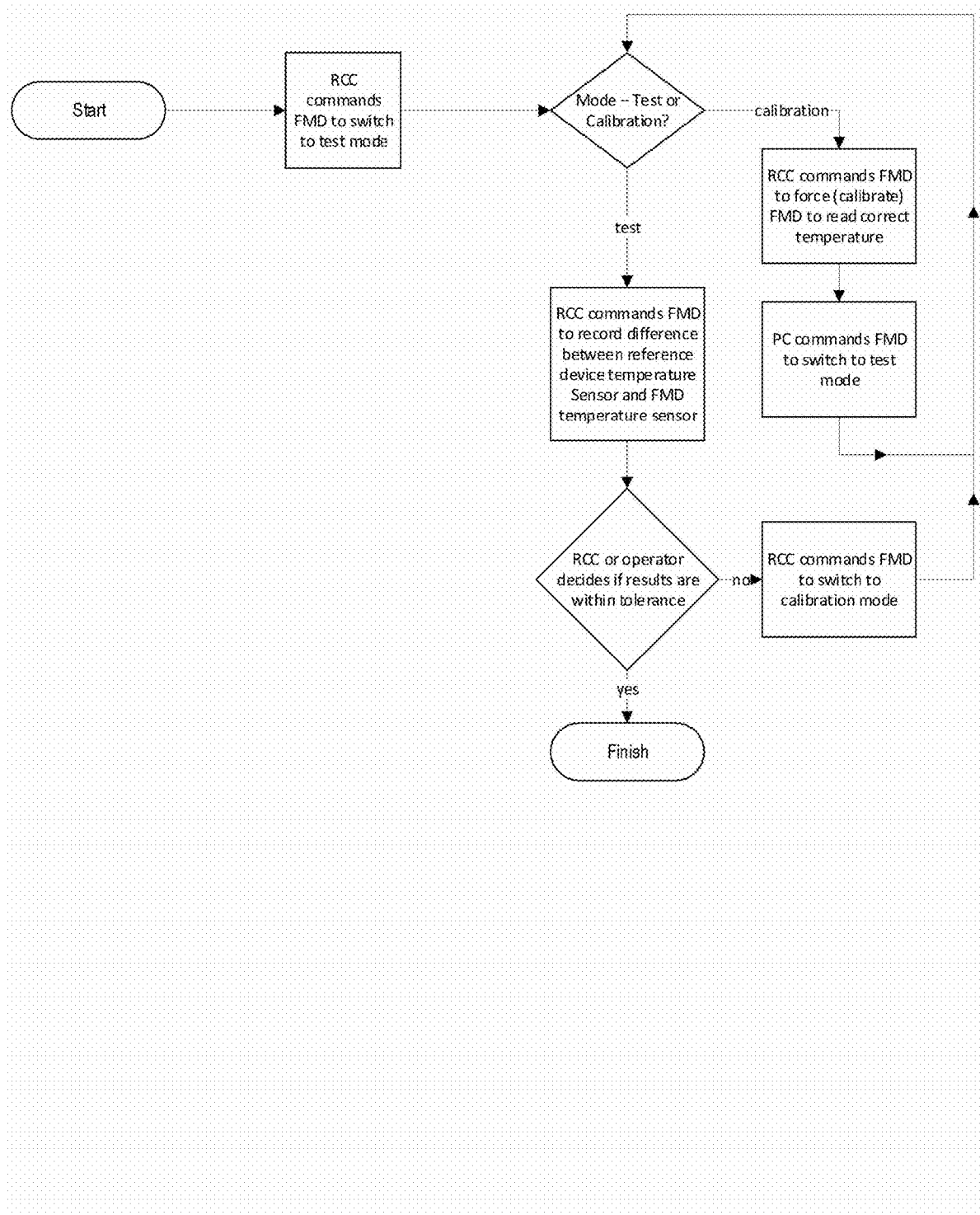

FIG. 5G is a flow diagram showing the overall procedure of the RCC FMD temperature test/calibration.

Figure 6:
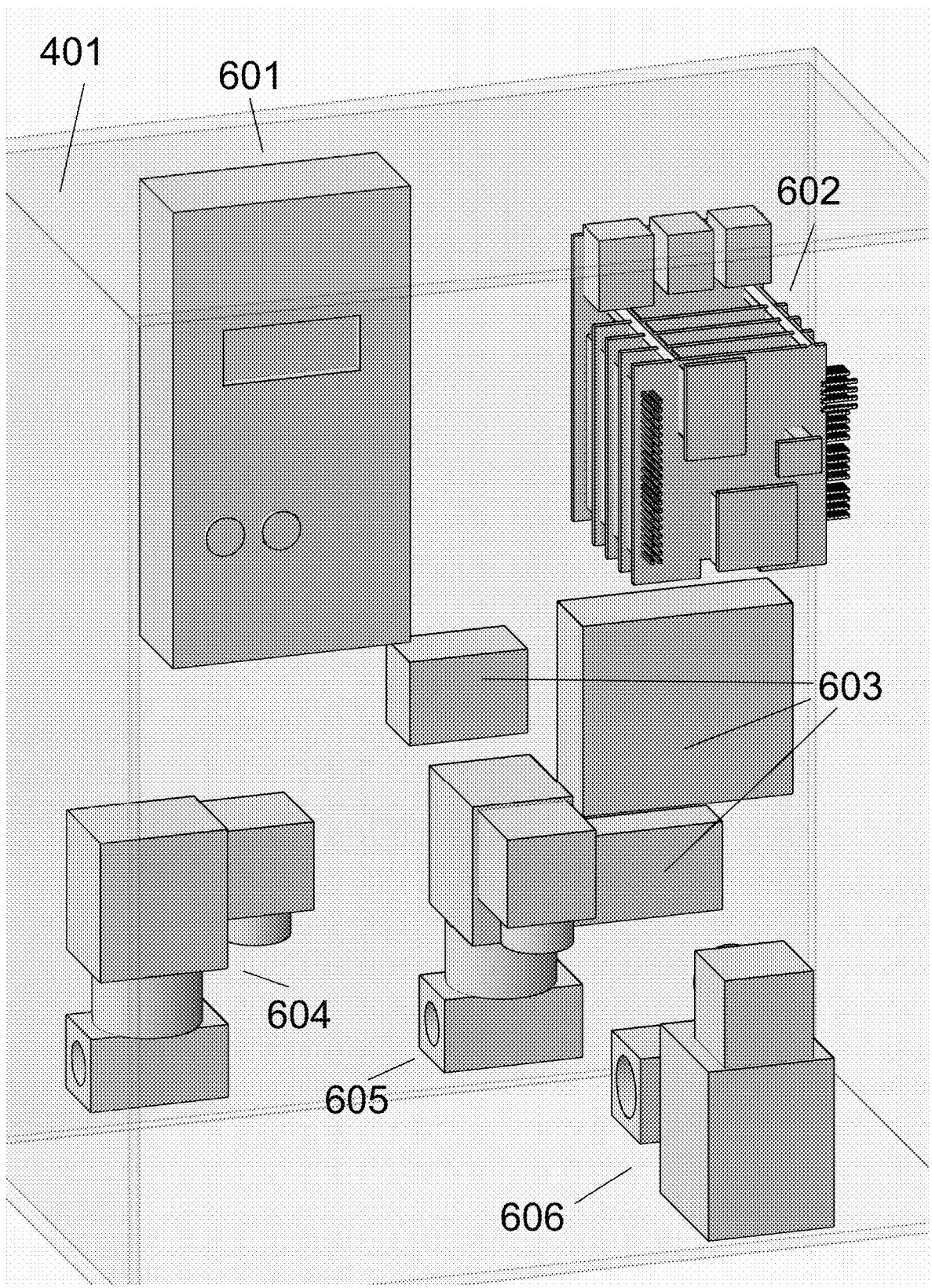
FIG. 6 depicts a drawing showing the basic internal components of the RCC, in accordance with one or more example embodiments of the present disclosure.

FIG. 6 is a drawing showing the basic internal components of the RCC. RCC reference pressure device 601, RCC control/logic circuitry/Single Board Computer (SBC) 602, various power supplies/power conditioning components 603, RCC reference pressure device low pressure port exposure 2-way universal solenoid 604, RCC equalization 2-way universal solenoid 605, RCC vent/exhaust to atmosphere 2-way universal solenoid 606.

Figure 7:
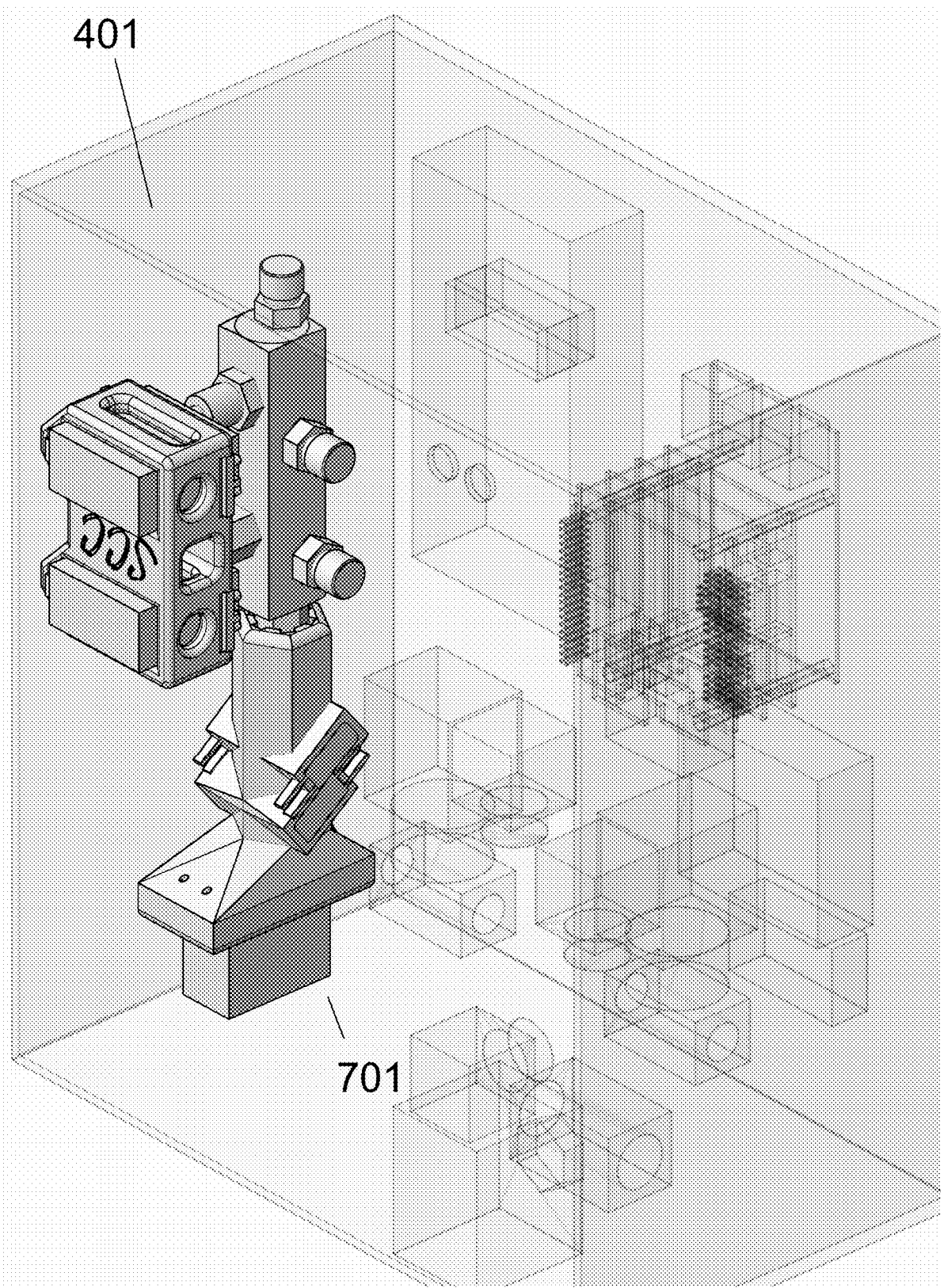
FIG. 7 depicts a drawing showing the RCC calibration manifold assembly position in the RCC enclosure, in accordance with one or more example embodiments of the present disclosure.

FIG. 7 is a drawing showing the RCC calibration manifold assembly position in the RCC enclosure. RCC calibration manifold assembly 701.

Figure 8:
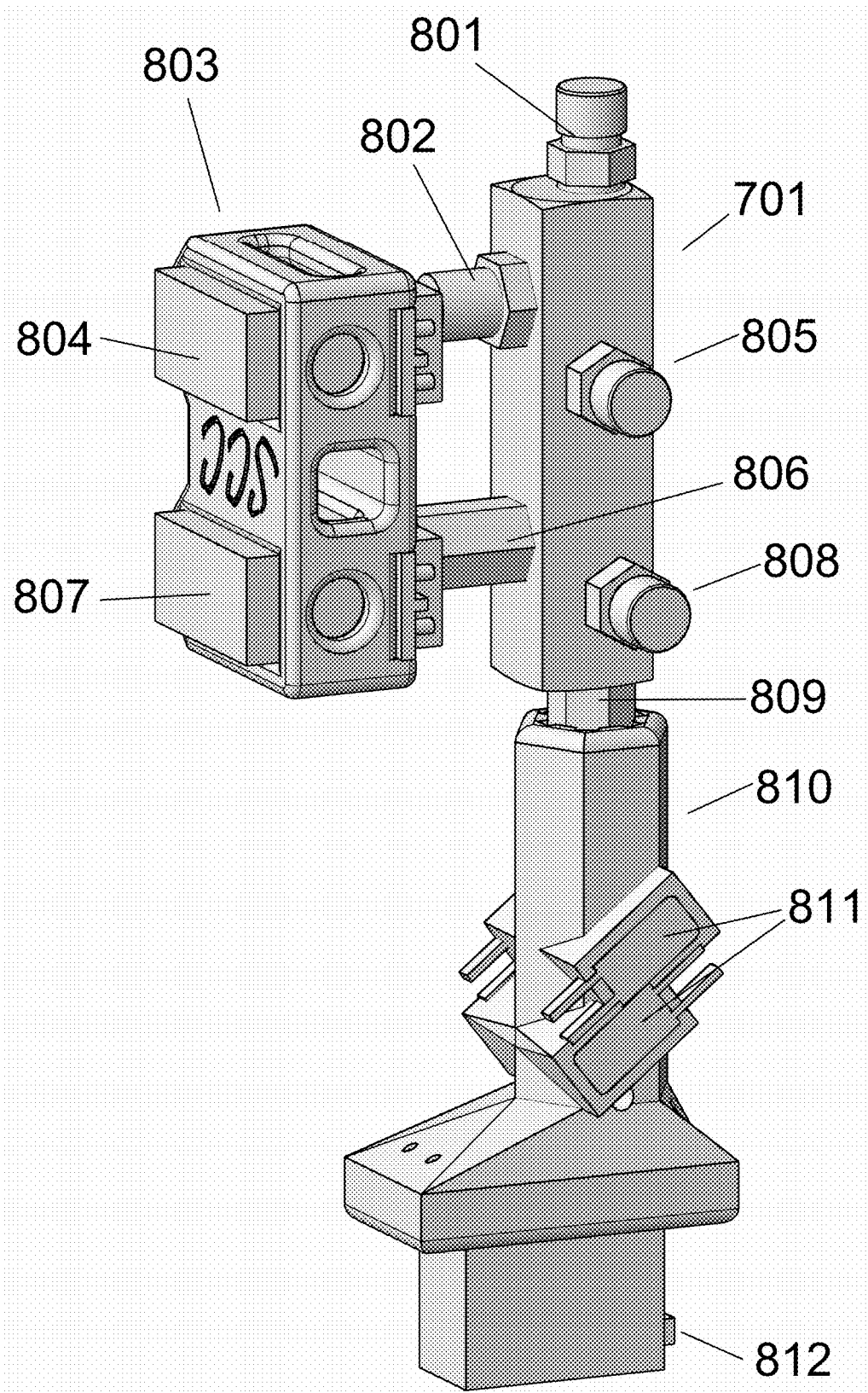
FIG. 8 depicts a drawing showing the details of the RCC calibration manifold assembly, in accordance with one or more example embodiments of the present disclosure.

FIG. 8 is a drawing showing the details of the RCC calibration manifold assembly. Inlet from compressed inert gas source 801, RCC calibration manifold inlet valve 802, RCC calibration manifold inlet/outlet servo guide/holder 803, RCC calibration manifold inlet valve servo 804, RCC calibration manifold outlet 805, RCC calibration manifold outlet valve 806, RCC calibration manifold outlet valve servo 807, RCC calibration manifold outlet 808, RCC calibration manifold fine volume adjustment valve 809, RCC calibration manifold fine volume adjustment valve guide/holder 810, RCC calibration manifold infrared break beam sensors 811, RCC calibration manifold fine volume adjustment valve servo 812.

Figure 9A:
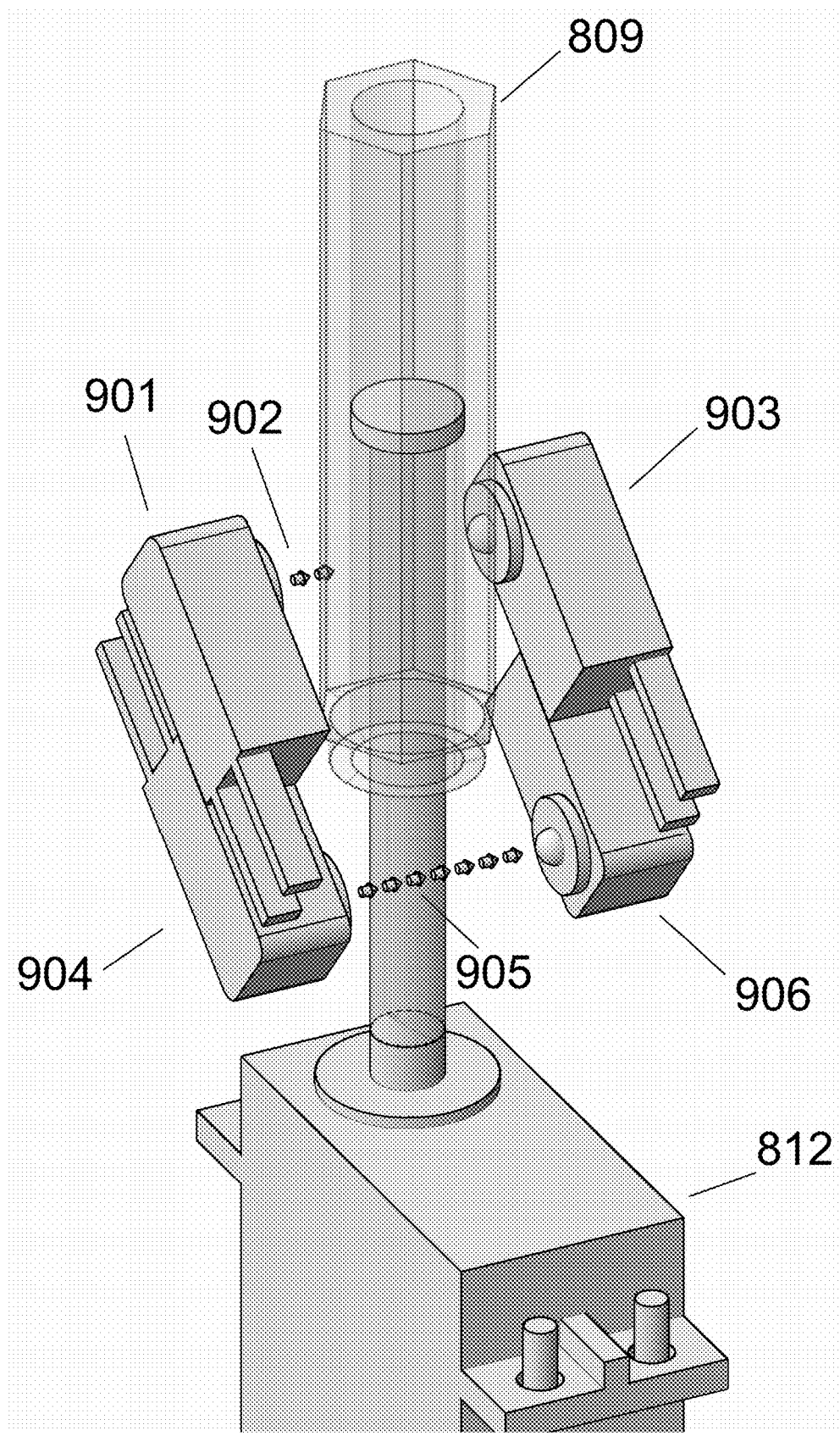
FIGS. 9A-9C depict illustrative schematic diagrams for RCC, in accordance with one or more example embodiments of the present disclosure.

FIG. 9A is a drawing of the infrared break beam sensors and their respective signals when the fine volume adjustment valve is in a neutral position. Infrared break beam transmitter 901 to detect full extended position, infrared signal 902 is "broken" when fine volume adjustment valve is in a neutral position, infrared break beam receiver 903 to detect full extended position, infrared break beam transmitter 904 to detect full retracted position, infrared signal 905 is "complete" when fine volume adjustment valve is in a neutral position, infrared break beam receiver 906 to detect full retracted position.

Figure 9B:
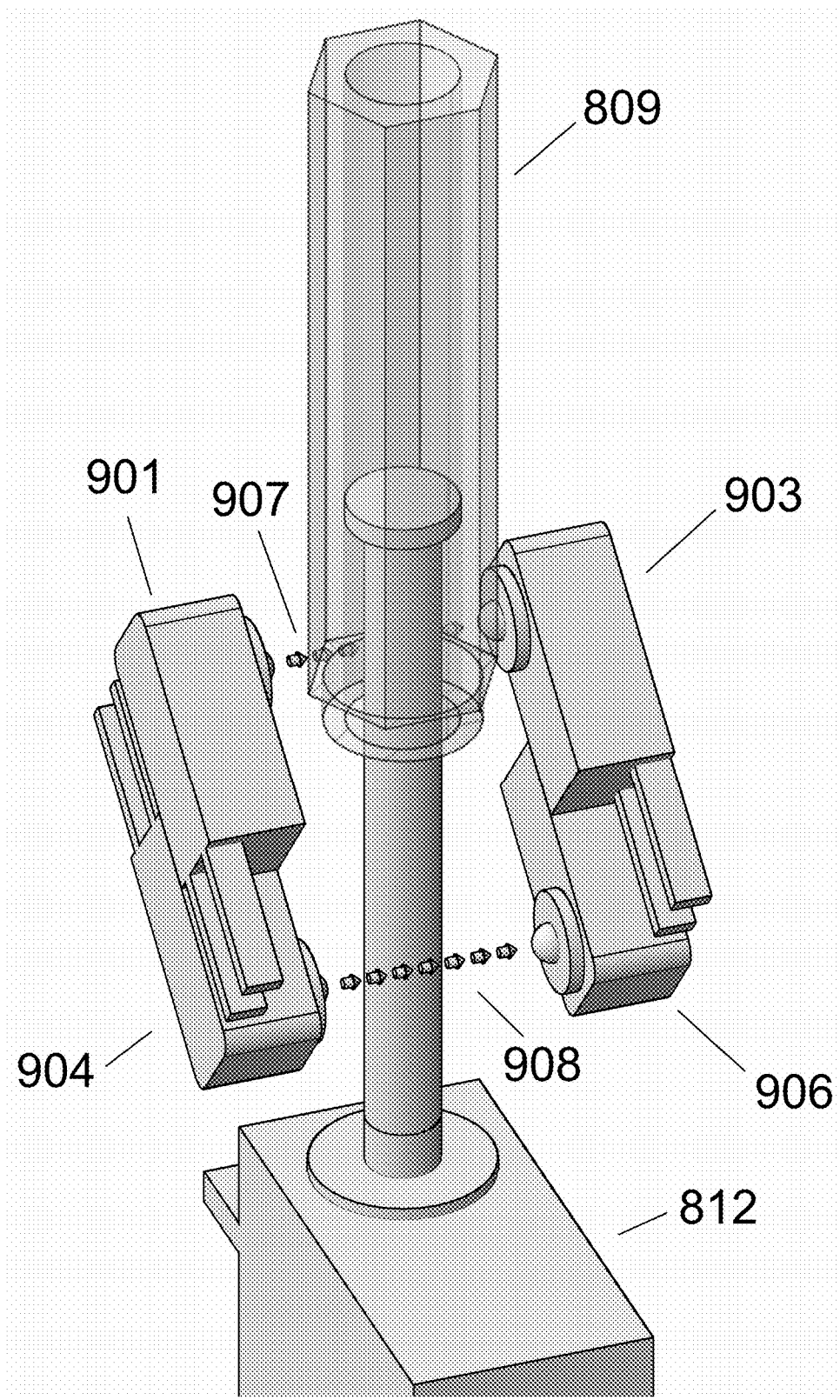

FIG. 9B is a drawing of the infrared break beam sensors and their respective signals when the fine volume adjustment valve is in a fully extended position. Infrared signal 907 is "complete" when the fine volume adjustment valve is in a full extended position, infrared signal 908 is "complete" when the fine volume adjustment valve is in a full extended position.

Figure 9C:
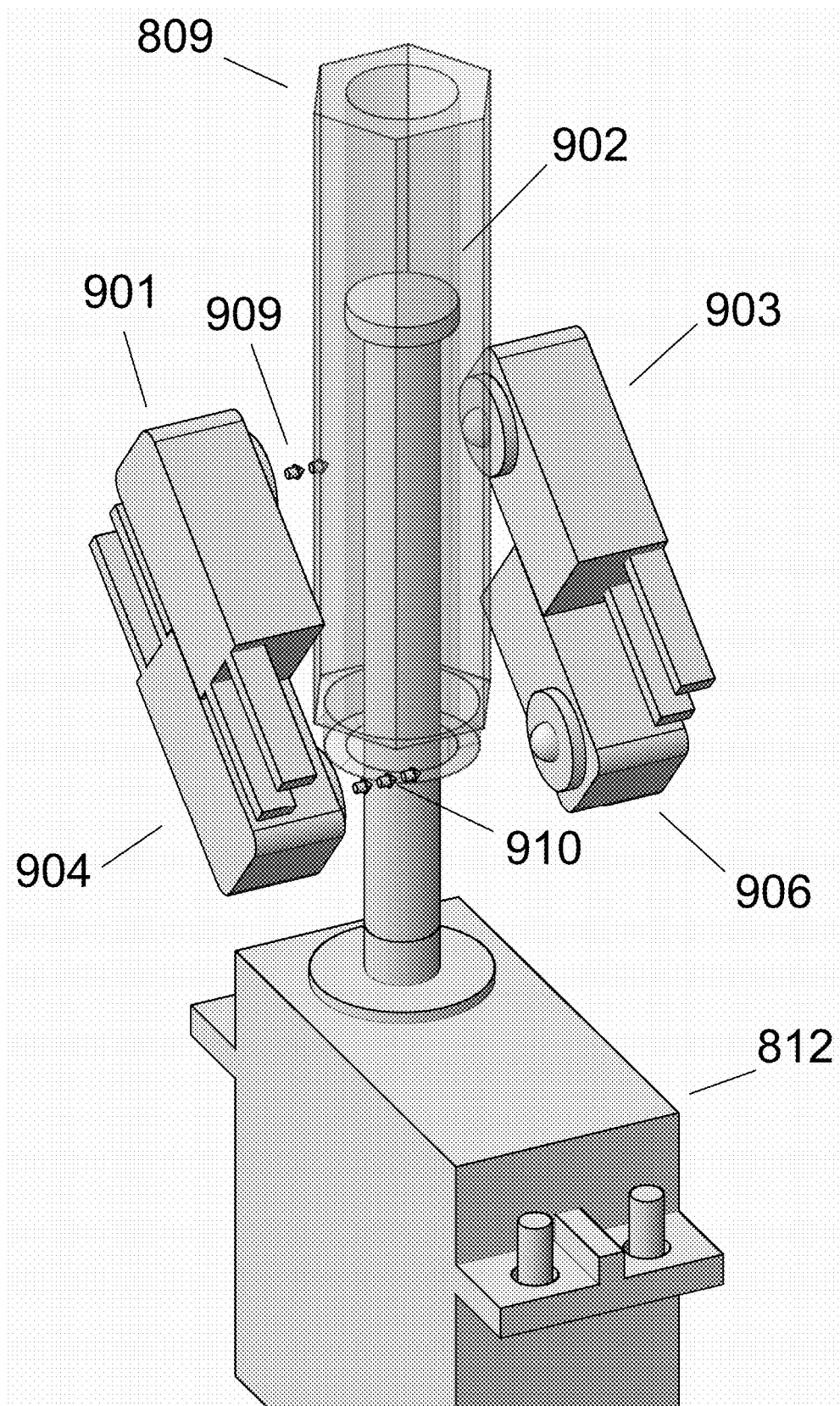

FIG. 9C is a drawing of the infrared break beam sensors and their respective signals when the fine volume adjustment valve is in a fully retracted position. Infrared signal 909 is "broken" when the fine volume adjustment valve is in a full retracted position, infrared signal 910 is "broken" when the fine volume adjustment valve is in a full retracted position.

Figure 10A:
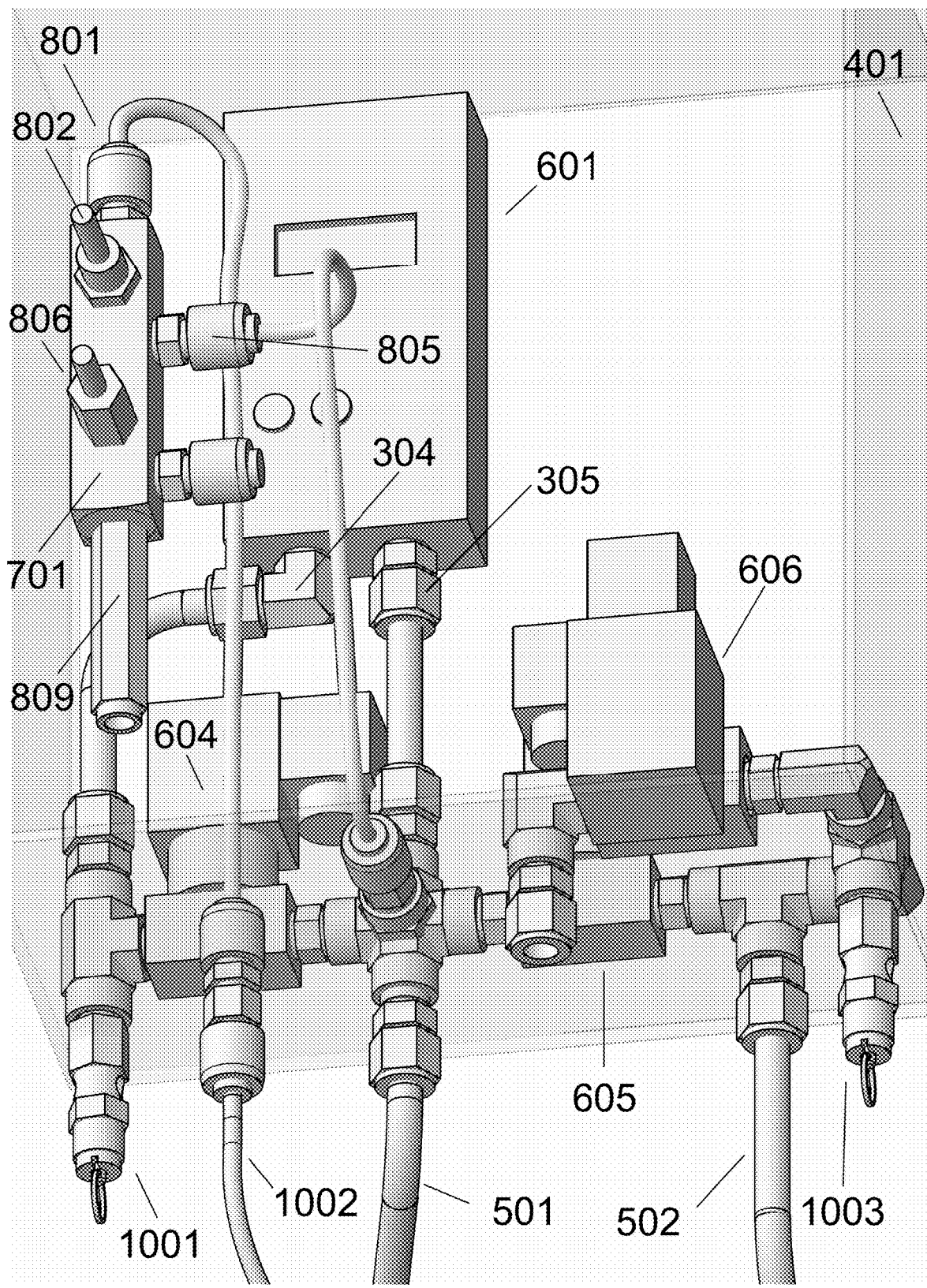

FIG. 10A is a drawing showing the pneumatic components inside the RCC enclosure. RCC low pressure over pressure protection device 1001 (vent to the atmosphere upon overpressure). RCC inlet from compressed inert gas source 1002, RCC low pressure over pressure protection device 1003 (vent to the atmosphere upon overpressure).

Figure 10B:
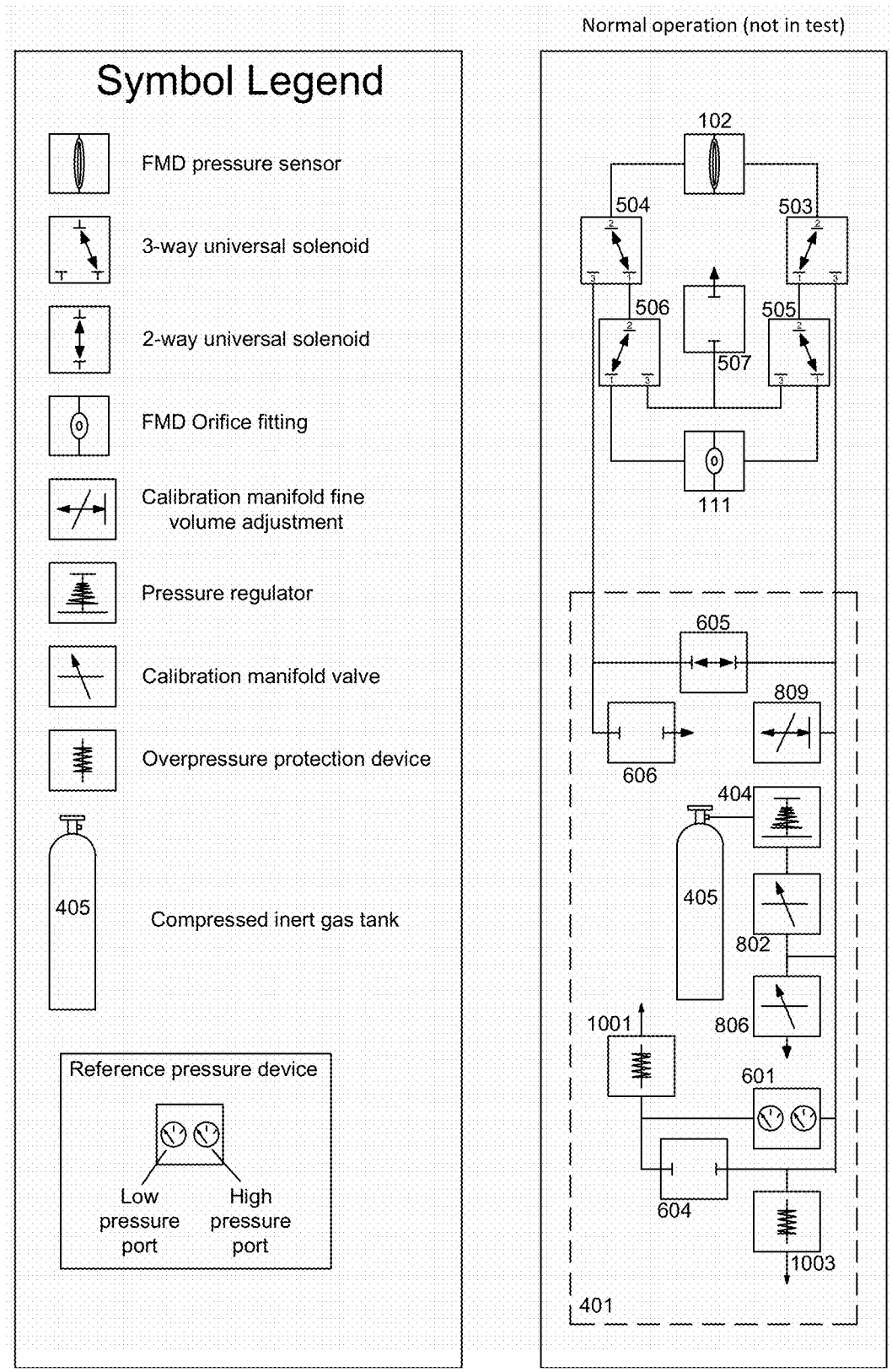

FIG. 10B is a process diagram showing the RCC component states during the normal operation of the FMD (not in test).

Figure 10C:
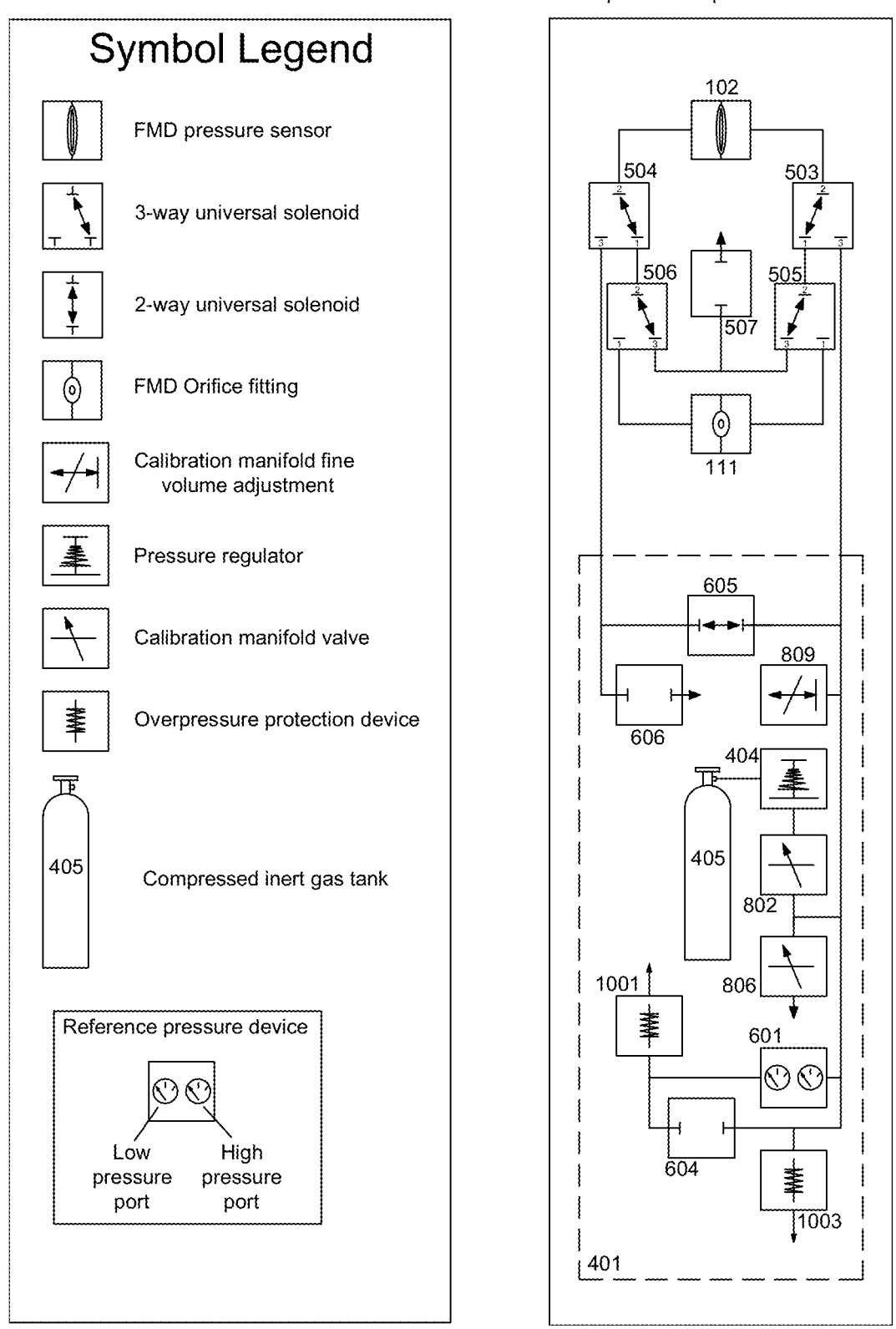

FIG. 10C is a process diagram showing the RCC component states during equalization of the FMD pressure sensor and isolation between the natural gas in the FMD meter tube and the RCC components.

Figure 10D:
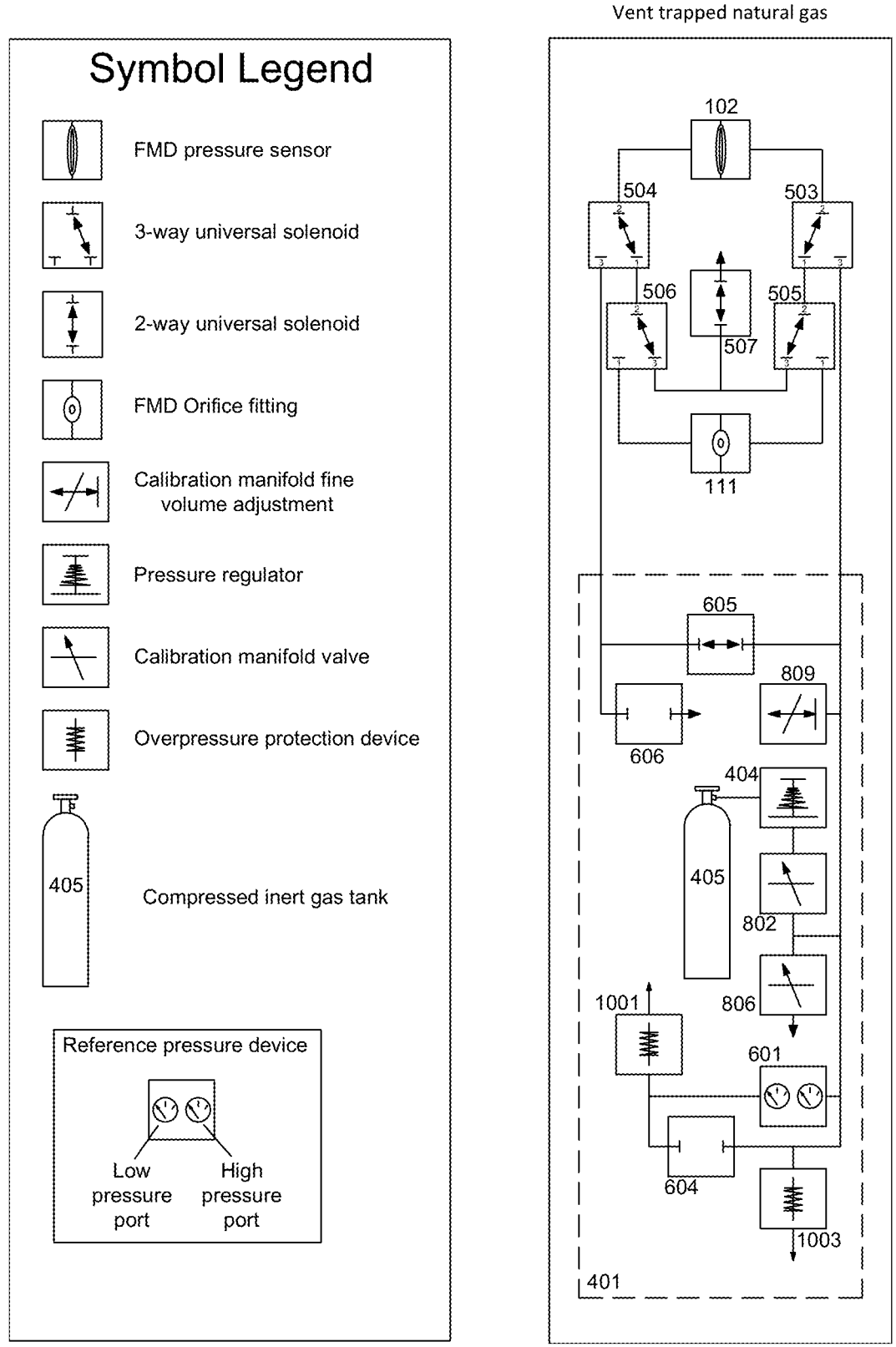

FIG. 10D is a process diagram showing the RCC component states during venting of the natural gas trapped between the FMD meter tube and the RCC components.

Figure 10E:
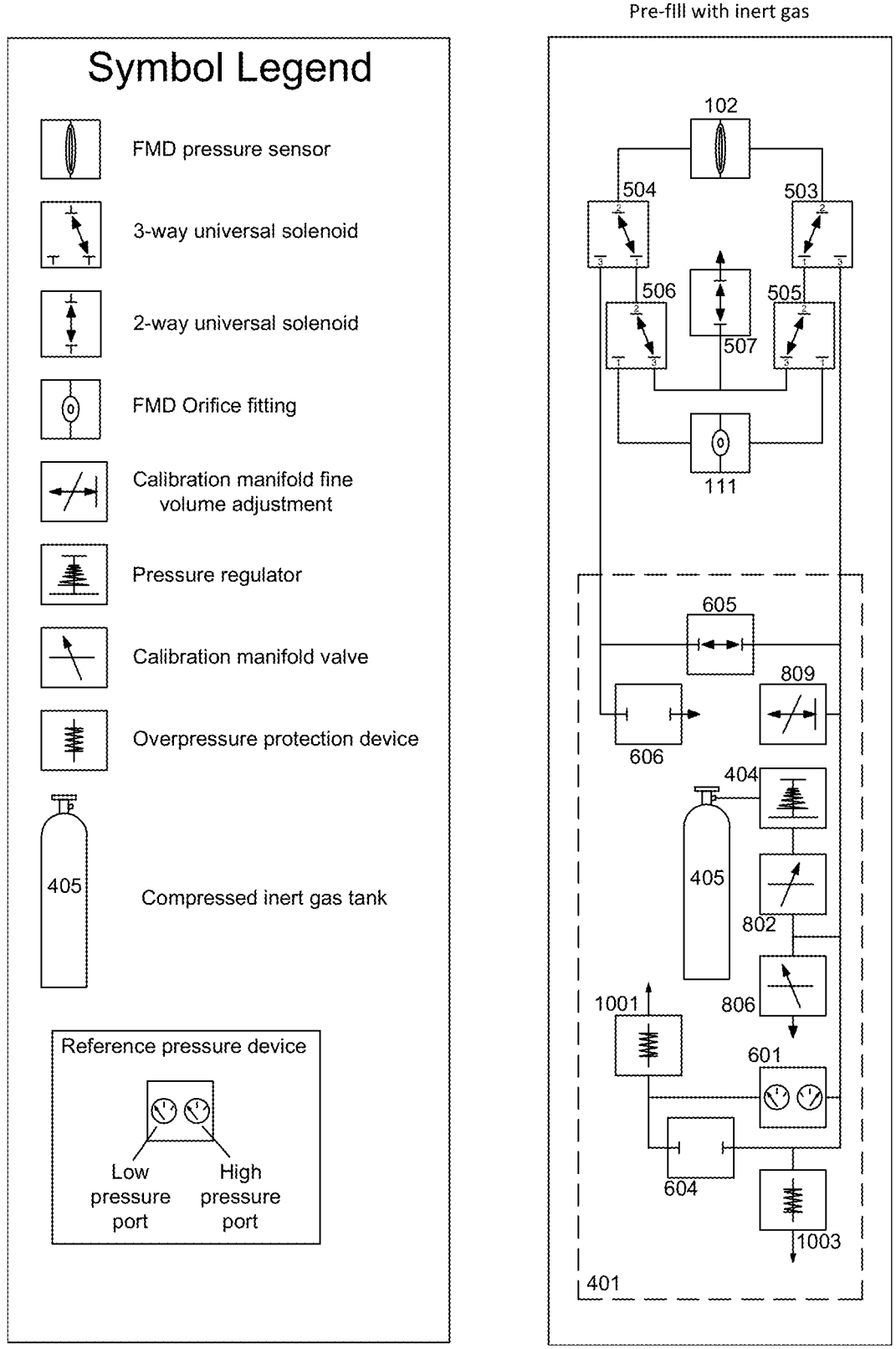

FIG. 10E is a process diagram showing the RCC component states during pre-filling the system with compressed inert gas.

Figure 10F:
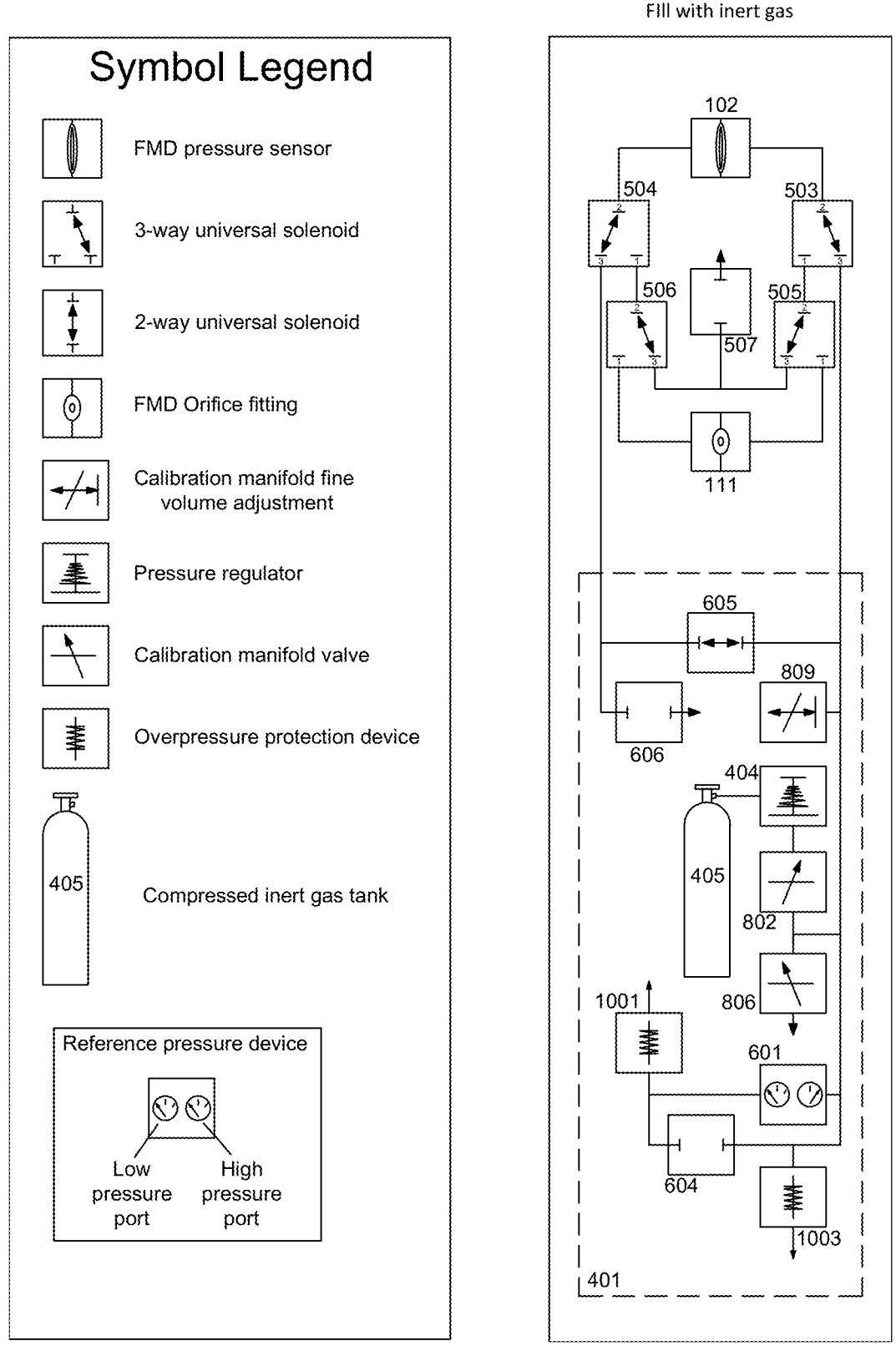

FIG. 10F is a process diagram showing the RCC component states during filling the system with compressed inert gas.

Figure 10G:
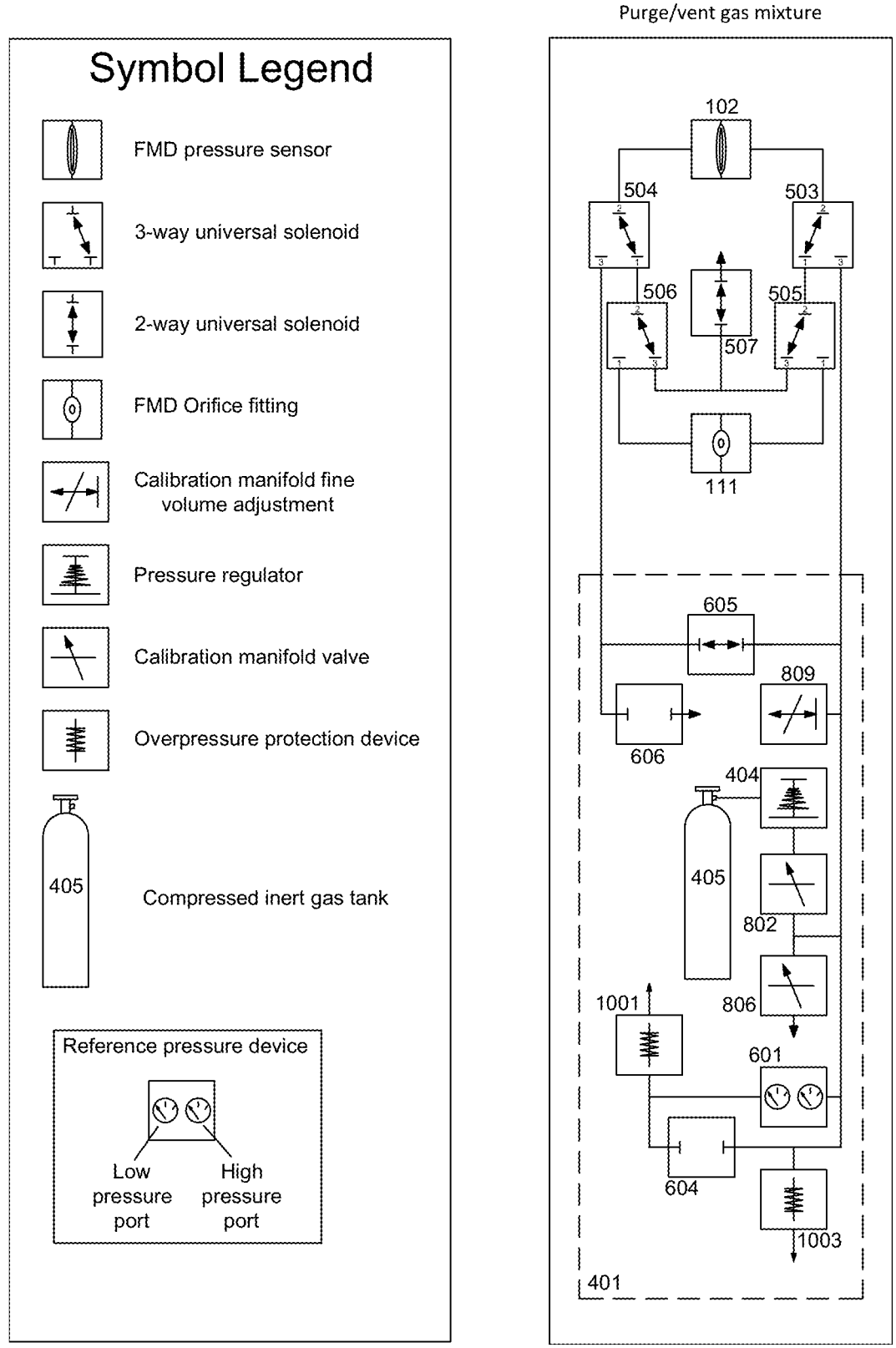

FIG. 10G is a process diagram showing the RCC component states during venting/exhausting the natural and inert gas mixture to the atmosphere.

Figure 10H:
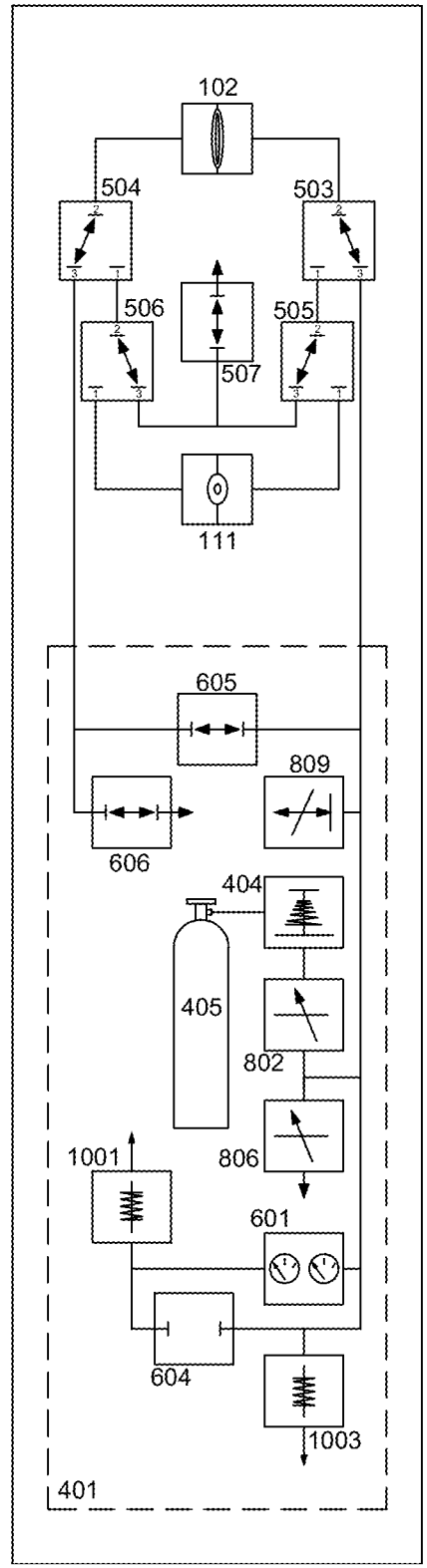

FIG. 10H is a process diagram showing the RCC component states during testing/calibration of the FMD static pressure at atmospheric conditions.

Figure 10I:
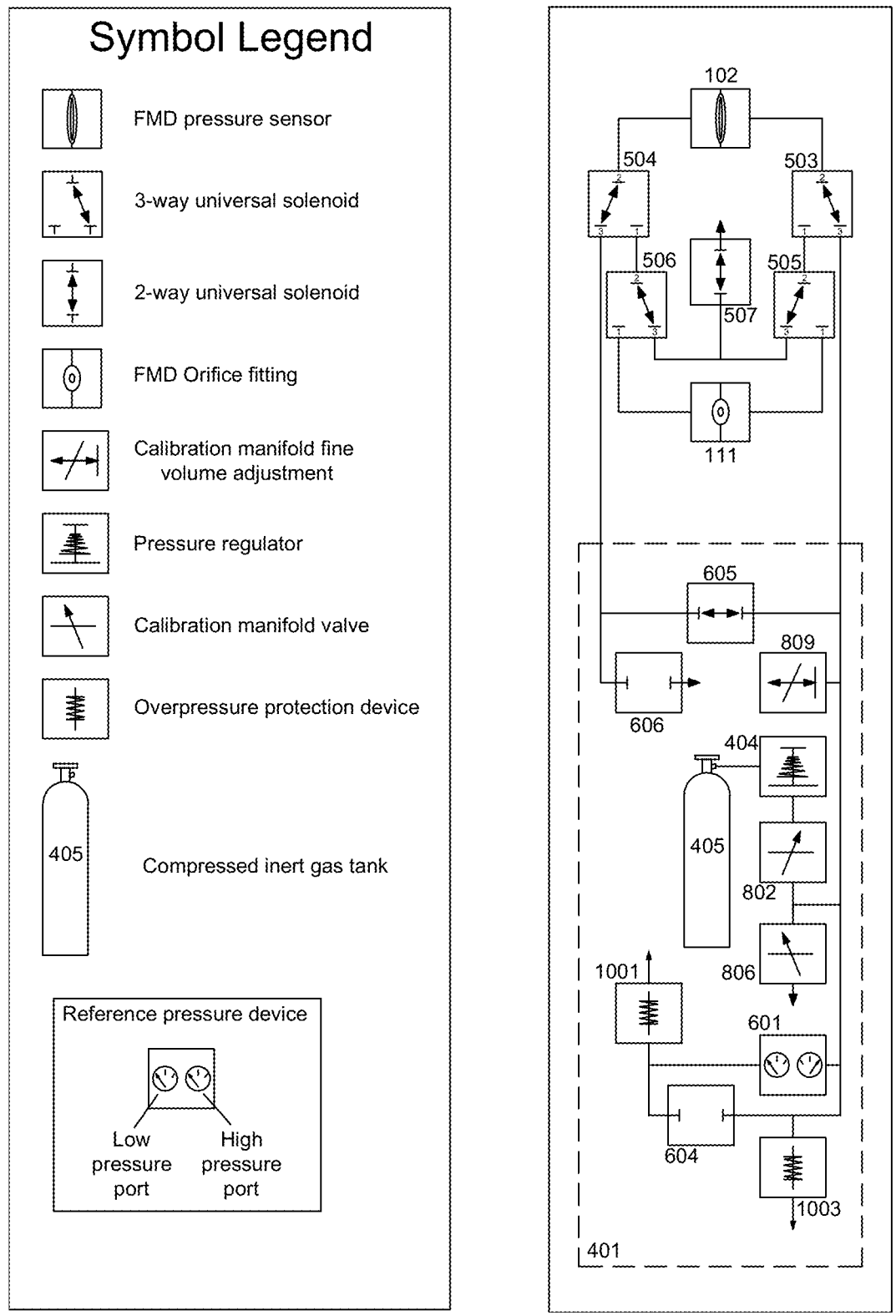

FIG. 10I is a process diagram showing the RCC component states during testing/calibration of the FMD static pressure.

Figure 10J:
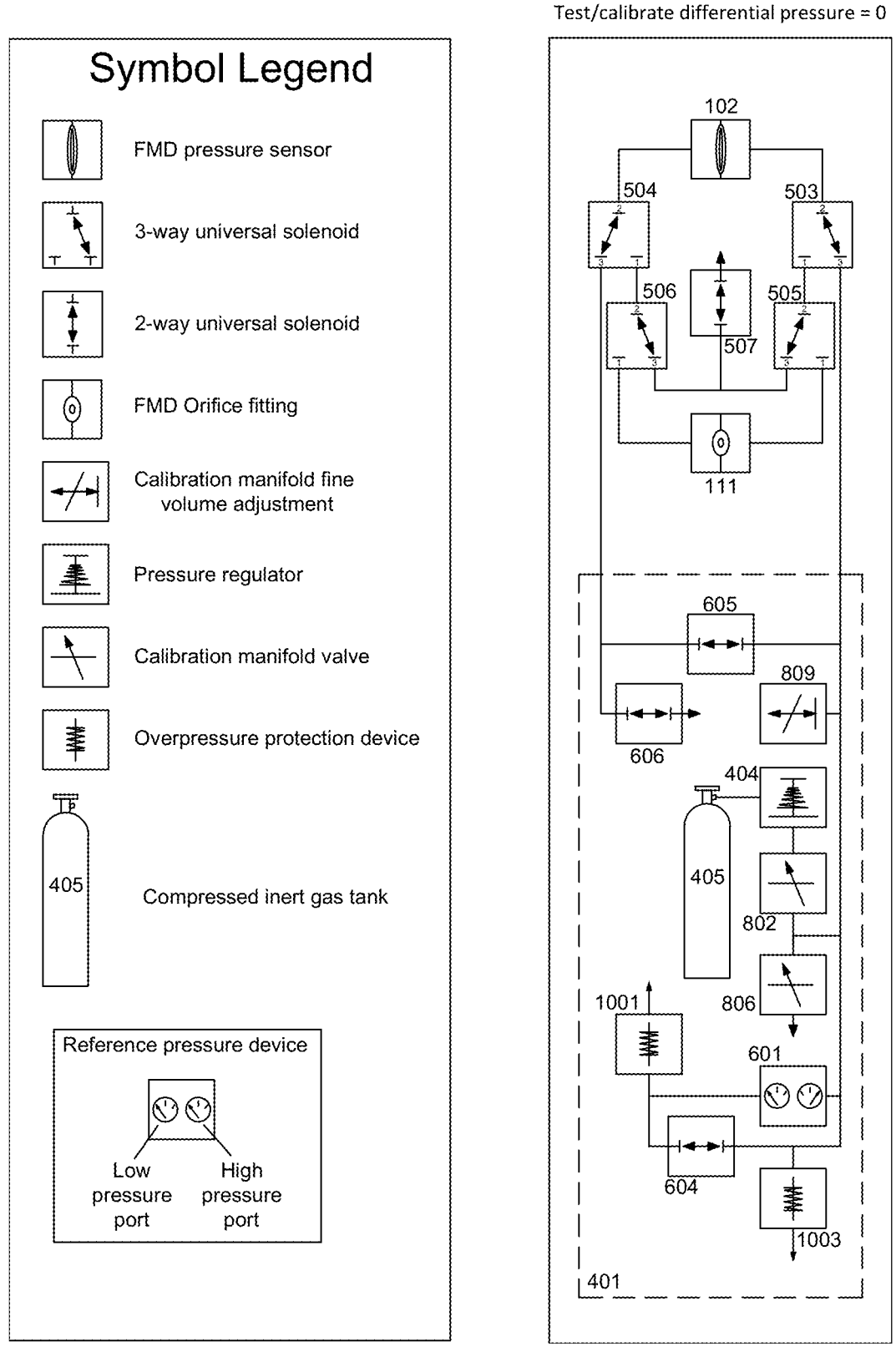

FIG. 10J is a process diagram showing the RCC component states during testing/calibration of the FMD differential pressure at zero differential.

Figure 10K:
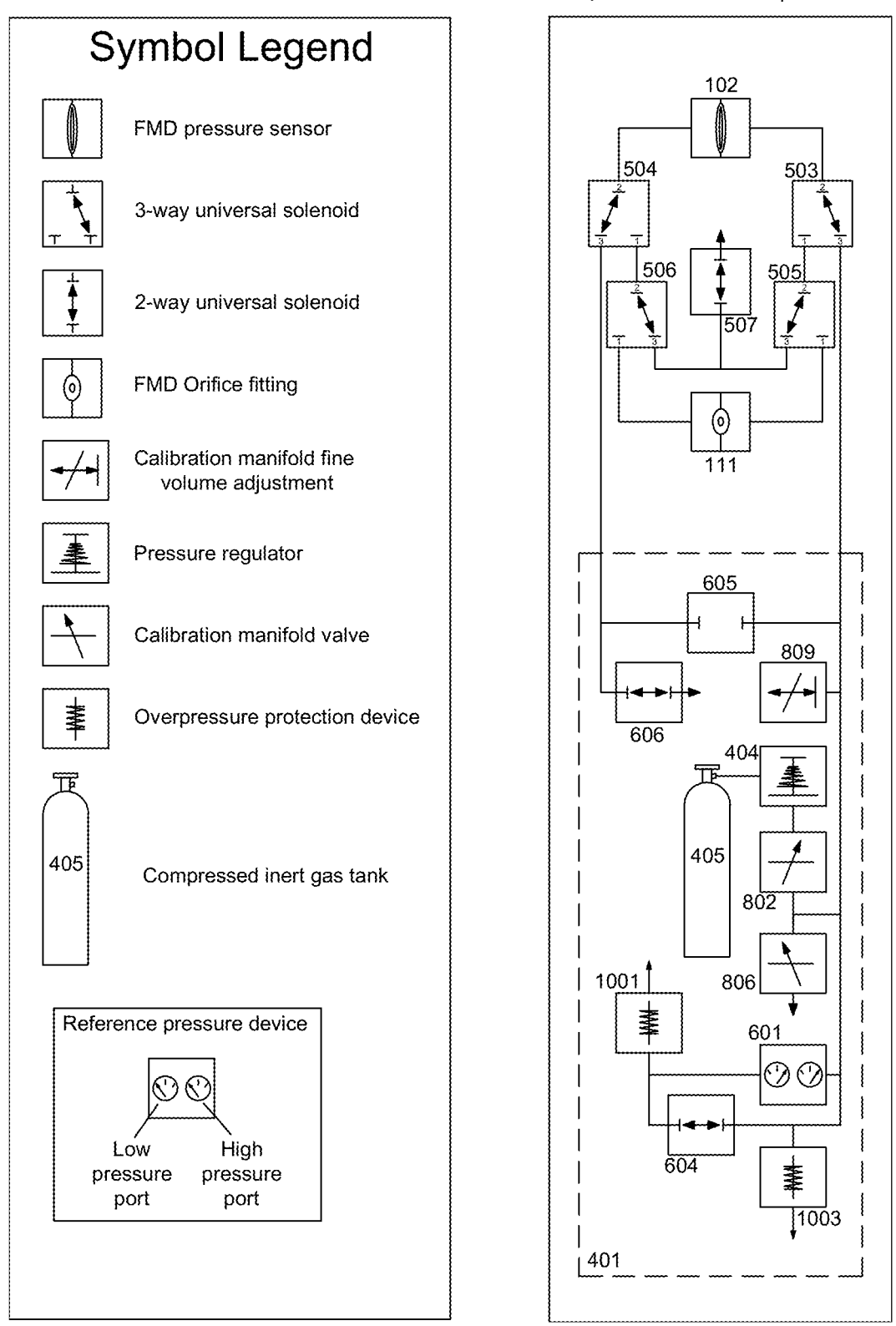

FIG. 10K is a process diagram showing the RCC component states during testing/calibration of the FMD differential pressure.

Figure 10L:
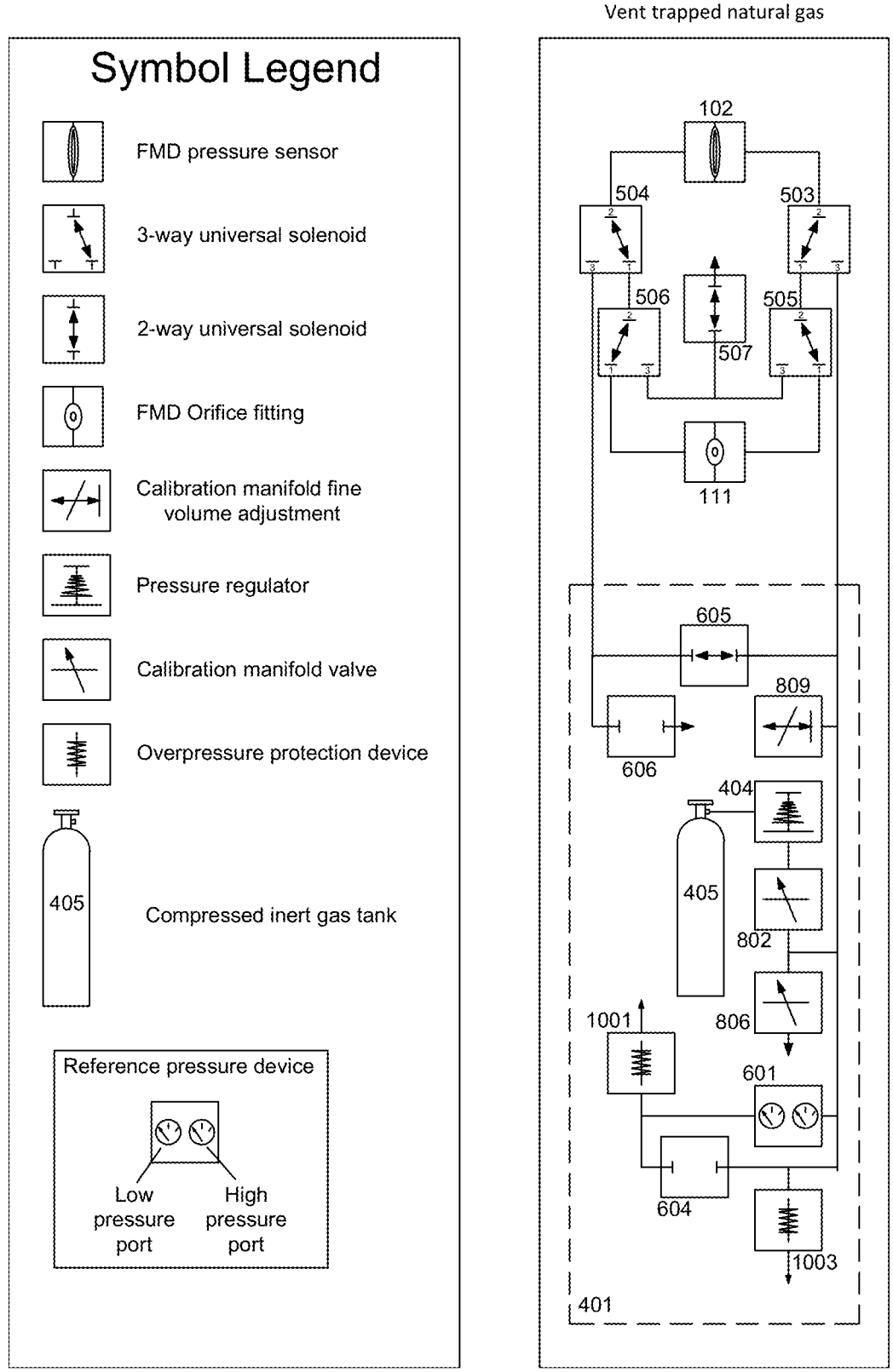

FIG. 10L is a process diagram showing the RCC component states during venting of trapped natural gas after the FMD sensor is put back in service.

FIG. 10M is a table showing the RCC solenoid states during the various stages of the FMD test/calibration procedure.

Upon receiving the command to perform the test/calibration procedure, the SBC 602 must first communicate with the FMD 101 a signal to place the FMD in hold mode. Hold mode forces the FMD to maintain the displayed pressures and temperatures that were present before conducting any manipulating of pressures or temperatures throughout the process of testing. Once the FMD is in hold mode, the SBC 602 then performs the procedure to take the pneumatic portion of the FMD "out of service". FIG. 5B details the basic steps to take the FMD out of service. FIGS. 10B, 10C, 10D, 10E, 10F, and 10G will assist in understanding this procedure. To take the FMD out of service, the SBC 602 commands 3-way universal equalization solenoid valves 505 and 506 to position B to equalize natural gas pressure across the two sides of the FMD differential pressure sensor (FIG. 10C). These solenoids also serve to disconnect both sides of the FMD pressure sensor from the natural gas coming from the meter tube orifice fitting. The natural gas then trapped between the FMD pressure sensor and the isolation solenoid valves is then vented to the atmosphere via 2-way universal solenoid 507 (FIG. 10D). The SBC 602 then commands servo 804 to open the calibration manifold inlet valve 802 to pre-fill the system with inert gas and prepare for purging the system of natural gas (FIG. 10E). 3-way universal solenoid valves 503 and 504 are then commanded to position B to allow the inert gas pre-filled/pressurized in the system to mix with the natural gas residue left in the system (FIG. 10F). The inert gas/natural gas mixture is then released to the atmosphere via 2-way universal vent solenoid 507 (FIG. 10G). The system may be filled with inert gas and purged as many times as desired. 3-way universal solenoid valves 503 and 504 are then commanded to position B to allow connection between the RCC pneumatic components and the FMD pressure sensor and also provide additional isolation between the RCC and natural gas (FIG. 10H). The system is now ready for the test/calibration procedure.

The test/calibration procedure consists of comparing pressure and temperature readings at multiple data points from the FMD with those of reference devices connected to the SBC 602. FIG. 5D is a flow diagram detailing the steps involved in performing the test/calibration procedure. FIGS. 10H, 10I, 10J, and 10K will assist in understanding this procedure. Pressure testing requires manipulating multiple valves and solenoids. FIG. 10A shows the internal components of the RCC utilized in manipulating pressure. Depending on the type of pressure test being done, the solenoids will be in different states. FIG. 10M is a table showing the states of the RCC system solenoids during various stages that will assist in understanding the various solenoid states. FIGS. 5E, 5F, and 5G show the steps the RCC takes to test/calibrate static pressure, differential pressure, and temperature respectively. To control the pressure on the system the SBC 602 manipulates the inlet 802, outlet 806, and fine volume adjustment valve 809 on the calibration manifold 802 by controlling the position of their relative electrical servo motors 804, 807, and 812 respectively. Once the correct pressure is held constant, a command is then sent to tell the FMD to record the difference between actual pressure from the RCC reference pressure device, and the current pressure reading from the FMD pressure sensor. This procedure is performed at multiple pressure levels for static and differential pressure. For temperature, a command is sent to the FMD to record the difference between the actual temperature from the RCC reference temperature device and the current temperature reading from the FMD temperature sensor. User out of tolerance preference dictates if the FMD pressure and/or temperature should then be calibrated. If calibration of the FMD sensor is warranted by the user, the RCC then performs the calibration procedure on the sensor. Following calibration, the RCC then performs additional tests to verify the success of the calibration procedure. Relevant data is then collected and archived for the user.

The static pressure test/calibration procedure will now be explained. To perform the static pressure test, the FMD sensor must be "out of service" and the FMD in "hold" mode as described above in paragraph 0032. FIG. 5B details the basic steps to take the FMD out of service. FIGS. 10B, 10C, 10D, 10E, 10F, and 10G will assist in understanding this procedure. FIG. 5E is a flow diagram showing the overall procedure of the RCC FMD static pressure test/calibration.

The static pressure is first checked at atmospheric conditions. This means the FMD static pressure sensor 102 and RCC reference pressure device 601 high pressure sensor 305 will both be exposed to the atmosphere. FIG. 10H is a pneumatic diagram showing the states of the system devices during the atmospheric static pressure test. During the static pressure test, RCC equalization 2-way universal solenoid 605 is commanded open to allow equal pressure on both sides of FMD pressure sensor 102. Vent/exhaust to atmosphere 2-way universal solenoid 606 is commanded open to allow atmospheric pressure to be exerted on the FMD pressure sensor 102 as well as the RCC reference pressure device 601 high pressure sensor 305. At this point the SBC 602 sends a command to the FMD 101 to record the pressures displayed by the FMD static pressure sensor and the reference pressure device as well as the difference between the two. The SBC also records the same data.

Since the reference pressure device is certified to be accurate, and more specifically, more accurate than the FMD pressure sensor, the FMD atmospheric static pressure error is defined as how much it differs from the reference pressure device.

The RCC must then prepare the system for checking static pressure at pressures greater than atmospheric pressure. FIG. 10I is a pneumatic diagram showing the states of the system devices during the static pressure test at pressure above atmospheric pressure. To perform static pressure tests at pressures greater than atmospheric, RCC equalization 2-way universal solenoid 605 is commanded open to allow equal pressure on both sides of FMD pressure sensor 102, and vent/exhaust to atmosphere 2-way universal solenoid 606 is commanded closed to allow pressure buildup in the system to be exerted on the FMD pressure sensor 102 as well as the RCC reference pressure device 601 high pressure sensor 305. The SBC then utilizes RCC calibration manifold 701 to control compressed regulated inert gas entry and exit into the system. To raise pressure in the system the SBC utilizes servo 804 to open inlet valve 802 allowing compressed inert gas into the system. To lower pressure in the system the SBC utilizes servo 807 to open outlet valve 806 allowing compressed inert gas to exit the system. The RCC chooses what pressure point to test at based on pre-determined values given by the user or by automatic determination. Once pressure on the system (exerted on both the FMD pressure sensor 102 as well as the RCC reference pressure device 601 high pressure sensor 305) is close to the desired pressure point, the SBC manipulates RCC calibration manifold 701 fine volume adjustment valve 809 by controlling servo 812 to hold the pressure steady. This valve controls pressure by either adding or subtracting volume from the system by use of a plunger, thus raising or lowering system pressure.

Once the system pressure is held steady, the SBC 602 sends a command to the FMD 101 to record the pressures displayed by the FMD static pressure sensor and the reference pressure device as well as the difference between the two. The SBC also records the same data.

Since the reference pressure device is certified to be accurate, and more specifically, more accurate than the FMD pressure sensor, the FMD static pressure error is defined as how much it differs from the reference pressure device.

The SBC performs the static pressure test procedure described in paragraphs 0098 and 0099 at multiple different pressure points as pre-determined by the RCC software algorithm. The error of the FMD reading is recorded at all the different pressure points, and the RCC then makes a decision as to whether the FMD static pressure sensor should be calibrated.

If the RCC determines that calibration of the FMD static pressure sensor is required, the RCC commences the calibration procedure. To perform the calibration procedure, the SBC sends a command to the FMD to put the FMD in calibration made. The RCC then performs the same steps detailed in paragraphs 0096 through 0099 to calibrate the FMD static pressure sensor at multiple pressure points. Once each corresponding pressure point is reached and held steady, instead of recording the difference between the FMD static pressure sensor and the reference pressure device, the RCC sends a command to the FMD to calibrate that pressure point in the FMD. The calibration forces the FMD to read the correct pressure as defined by the reference pressure device.

After calibration of the multiple pressure points is complete, the RCC sends a command to the FMD to place the FMD back in test mode. The RCC then performs the test procedure described in paragraphs 0096 through 0101 again to verify that the calibration attempt was successful.

If it is found that the FMD static pressure is still not within tolerance as determined by the RCC, the RCC may perform the calibration and calibration check procedure detailed in paragraphs 0101 and 0102 again. This process of calibrating and then checking the accuracy of the FMD static pressure sensor may be performed as many times as necessary to correct the accuracy of the FMD static pressure sensor. If the FMD static pressure sensor fails to calibrate correctly after multiple attempts, the RCC may decide that the FMD and/or FMD pressure sensor has failed.

The differential pressure test/calibration procedure will now be explained. To perform the differential pressure test, the FMD sensor must be "out of service" and the FMD in "hold" mode as described above in paragraph 0032. FIG. 5B details the basic steps to take the FMD out of service. FIGS. 10B, 10C, 10D, 10E, 10F, and 10G will assist in understanding this procedure. FIG. 5F is a flow diagram showing the overall procedure of the RCC FMD static pressure test/calibration.

The differential pressure is first checked at zero differential pressure conditions. This means that both sides of the FMD differential pressure sensor 102 and RCC reference pressure device 601 low pressure sensor 304 will both be exposed to the atmosphere. FIG. 10J is a pneumatic diagram showing the states of the system devices during the zero differential pressure test. During the zero differential pressure test, RCC reference pressure device low pressure port exposure 2-way universal solenoid 604 is commanded open to expose the reference pressure device 601 low pressure port 304 to the system, RCC equalization 2-way universal solenoid 605 is commanded open to allow equal pressure on both sides of FMD pressure sensor 102. Vent/exhaust to atmosphere 2-way universal solenoid 606 is commanded open to allow zero atmospheric pressure to be exerted on the FMD pressure sensor 102 as well as the RCC reference pressure device 601 low pressure sensor 304. At this point the SBC 602 sends a command to the FMD 101 to record the pressures displayed by the FMD differential pressure sensor and the reference pressure device as well as the difference between the two. The SBC also records the same data.

Since the reference pressure device is certified to be accurate, and more specifically, more accurate than the FMD pressure sensor, the FMD zero differential pressure error is defined as how much it differs from the reference pressure device.

The RCC must then prepare the system for checking differential pressure at pressures greater than zero differential pressure. FIG. 10K is a pneumatic diagram showing the states of the system devices during the differential pressure test at pressure above zero differential pressure. To perform differential pressure tests at pressures greater than zero differential, RCC equalization 2-way universal solenoid 605 is commanded closed to allow pressure to be applied to the upstream side of the FMD pressure sensor 102 as well as the RCC reference pressure device 601 low pressure sensor 304. Vent/exhaust to atmosphere 2-way universal solenoid 606 is commanded open to allow atmospheric pressure to be applied to the downstream side of the FMD pressure sensor 102. In this way, as compressed inert gas is introduced into the system there is a differential pressure created between the two sides of the FMD pressure sensor i.e., the upstream side of the FMD pressure sensor is exposed to a pressure greater than the atmosphere while the downstream side is exposed to the atmosphere. The reference pressure device 601 low pressure sensor 304 is exposed to pressure as well and gives a reading of the difference in pressure between the pressure present at the low-pressure sensor and the atmospheric pressure. The SBC then utilizes RCC calibration manifold 701 to control compressed regulated inert gas entry and exit into the system. To raise pressure in the system the SBC utilizes servo 804 to open inlet valve 802 allowing compressed inert gas into the system. To lower pressure in the system the SBC utilizes servo 807 to open outlet valve 806 allowing compressed inert gas to exit the system. The RCC chooses what pressure point to test at based on pre-determined values given by the user or by automatic determination. Once pressure on the system (exerted on both the FMD pressure sensor 102 upstream side as well as the RCC reference pressure device 601 low pressure sensor 304) is close to the desired pressure point, the SBC manipulates RCC calibration manifold 701 fine volume adjustment valve 809 by controlling servo 812 to hold the pressure steady. This valve controls pressure by either adding or subtracting volume from the system by use of a plunger, thus raising or lowering system pressure.

Once the system pressure is held steady, the SBC 602 sends a command to the FMD 101 to record the pressures displayed by the FMD differential pressure sensor and the reference pressure device as well as the difference between the two. The SBC also records the same data.

Since the reference pressure device is certified to be accurate, and more specifically, more accurate than the FMD pressure sensor, the FMD differential pressure error is defined as how much it differs from the reference pressure device.

The SBC performs the differential pressure test procedure described in paragraphs 0108 through 0110 at multiple different pressure points as pre-determined by the RCC software algorithm. The error of the FMD reading is recorded at all the different pressure points, and the RCC then makes a decision as to whether the FMD differential pressure sensor should be calibrated.

If the RCC determines that calibration of the FMD differential pressure sensor is required, the RCC commences the calibration procedure. To perform the calibration procedure, the SBC sends a command to the FMD to put the FMD in calibration made. The RCC then performs the same steps detailed in paragraphs 0106 through 0110 to calibrate the FMD differential pressure sensor at multiple pressure points. Once each corresponding pressure point is reached and held steady, instead of recording the difference between the FMD differential pressure sensor and the reference pressure device, the RCC sends a command to the FMD to calibrate that pressure point in the FMD. The calibration forces the FMD to read the correct pressure as defined by the reference pressure device.

After calibration of the multiple pressure points is complete, the RCC sends a command to the FMD to place the FMD back in test mode. The RCC then performs the test procedure described in paragraphs 0106 through 0111 again to verify that the calibration attempt was successful.

If it is found that the FMD differential pressure is still not within tolerance as determined by the RCC, the RCC may perform the calibration and calibration check procedure detailed in paragraph 0112 again. This process of calibrating and then checking the accuracy of the FMD differential pressure sensor may be performed as many times as necessary to correct the accuracy of the FMD differential pressure sensor. If the FMD differential pressure sensor fails to calibrate correctly after multiple attempts, the RCC may decide that the FMD and/or FMD pressure sensor has failed.

The temperature test/calibration procedure will now be explained. The RCC reference temperature device 403 is placed within close proximity to the FMD temperature device 107. Bot the RCC reference temperature device 403 and the FMD temperature device 107 are placed in such a way as to get an accurate reading of the temperature of the natural gas whose flow rate is being measured by the FMD under normal conditions. This typically means that each device is placed inside a thermowell that is exposed to the gas stream in the FMD meter tube 106.

To test the FMD temperature sensor, the RCC sends a command to the FMD to place the FMD is test mode. SBC 602 then sends a command to the FMD 101 to record the temperatures displayed by the FMD temperature sensor and the reference temperature device as well as the difference between the two. The SBC also records the same data.

Since the reference temperature device is certified to be accurate, and more specifically, more accurate than the FMD temperature sensor, the FMD temperature error is defined as how much it differs from the reference temperature device.

If the RCC determines that calibration of the FMD temperature sensor is required, the RCC commences the calibration procedure. To perform the calibration procedure, the SBC sends a command to the FMD to put the FMD in calibration made. Instead of recording the difference between the FMD temperature sensor and the reference temperature device, the RCC sends a command to the FMD to calibrate the temperature in the FMD. The calibration forces the FMD to read the correct temperature as defined by the reference temperature device.

After calibration of the FMD temperature sensor is complete, the RCC sends a command to the FMD to place the FMD back in test mode. The RCC then performs the test procedure described in paragraphs 0116 through 0117 again to verify that the calibration attempt was successful.

If it is found that the FMD temperature sensor is still not within tolerance as determined by the RCC, the RCC may perform the calibration and calibration check procedure detailed in paragraph 0118 again. This process of calibrating and then checking the accuracy of the FMD temperature sensor may be performed as many times as necessary to correct the accuracy of the FMD temperature sensor. If the FMD temperature sensor fails to calibrate correctly after multiple attempts, the RCC may decide that the FMD and/or FMD temperature sensor has failed.

Once the test/calibration procedures on the FMD static pressure sensor, FMD differential pressure sensor, and FMD temperature sensor have been completed, the RCC must then perform the procedure to place the FMD pressure sensor back in service. FIG. 5C is a flow diagram showing the steps involved in putting the FMD pressure sensor back in service. FIGS. 10B, 10D, 10C, and 10L will assist in understanding this procedure. FIG. 10M shows the states of the RCC system solenoids during the various stages of this procedure. The RCC commands 3-way universal RCC test solenoids 503 and 504 to position A (FIG. 10D). The RCC then commands 2-way universal vent solenoid 507 closed and 3-way universal equalization/isolation solenoids 505 and 506 to position A to allow natural gas from the orifice fitting to be introduced back to the FMD pressure sensor (FIG. 10B). The RCC then commands 2-way universal vent solenoid 507 open to allow trapped natural gas to exhaust to atmosphere (FIG. 10L). The RCC then commands 2-way universal vent solenoid 507 closed to prevent outside contamination of the system (FIG. 10B).

Figure 11:
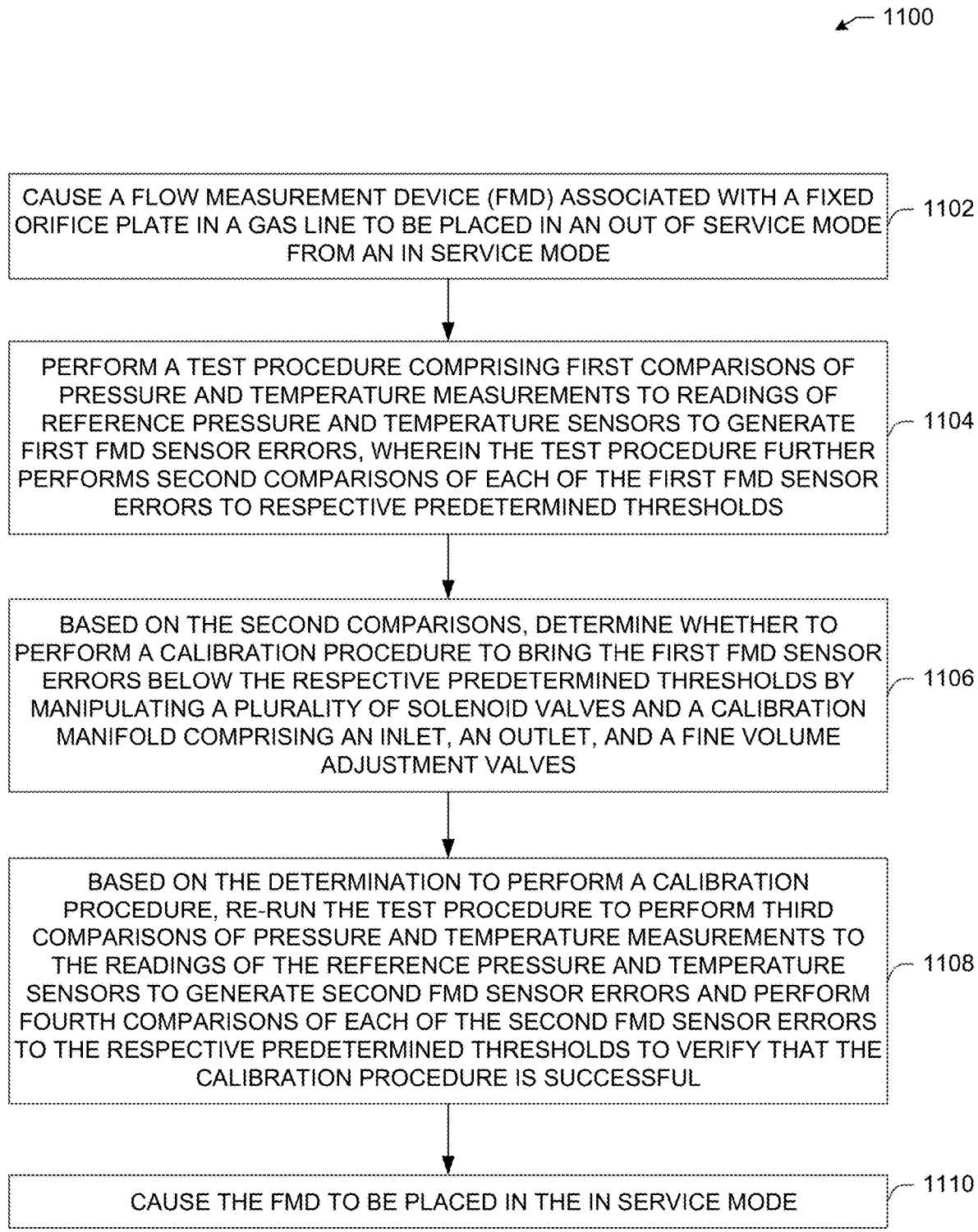
FIG. 11 depicts a flow diagram of a process for an illustrative RCC system, in accordance with one or more example embodiments of the present disclosure.

FIG. 11 illustrates a flow diagram of illustrative process 1100 for an RCC system, in accordance with one or more example embodiments of the present disclosure.

At block 1102, a device (e.g., the RCC) may cause a flow measurement device (FMD) associated with a fixed orifice plate in a gas line to be placed in an out of service mode from an in service mode.

At block 1104, the device may perform a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds.

At block 1106, the device may, based on the second comparisons, determine whether to perform a calibration procedure to bring the first FMD sensor errors below the respective predetermined thresholds by manipulating a plurality of solenoid valves and a calibration manifold comprising an inlet, an outlet, and a fine volume adjustment valves.

At block 1108, the device may, based on the determination to perform a calibration procedure, re-run the test procedure to perform third comparisons of pressure and temperature measurements to the readings of the reference pressure and temperature sensors to generate second FMD sensor errors and perform fourth comparisons of each of the second FMD sensor errors to the respective predetermined thresholds to verify that the calibration procedure is successful.

At block 1110, the device may cause the fixed orifice plate to be placed in the in service mode.

It is understood that the above descriptions are for purposes of illustration and are not meant to be limiting.

Figure 12:
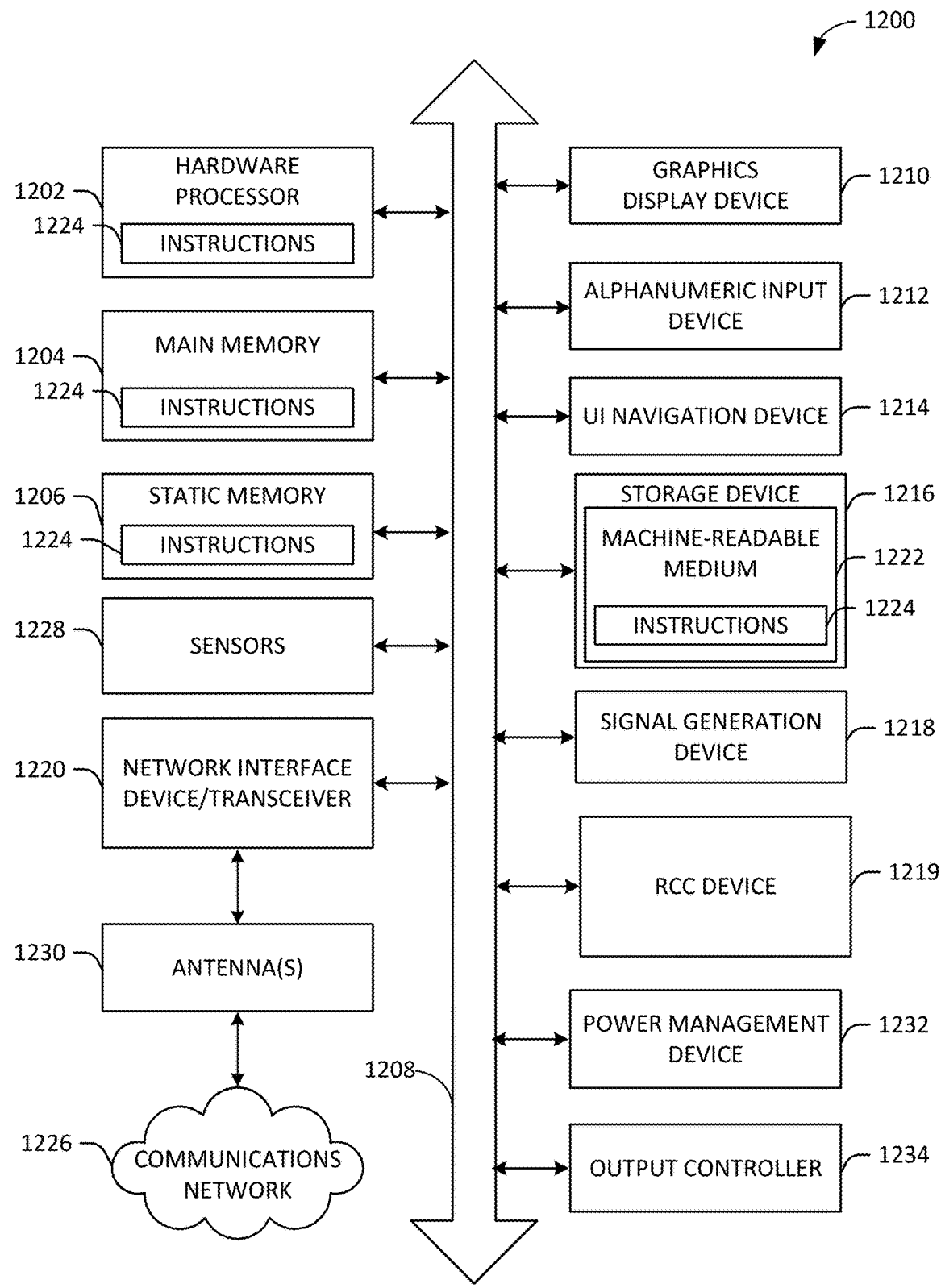
FIG. 12 depicts a block diagram of an example machine upon which any of one or more techniques (e.g., methods) may be performed, in accordance with one or more example embodiments of the present disclosure.

FIG. 12 illustrates a block diagram of an example of a machine 1200 or system upon which any one or more of the techniques (e.g., methodologies) discussed herein may be performed. In other embodiments, the machine 1200 may operate as a stand-alone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environments. The machine 1200 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Certain embodiments may be implemented in one or a combination of hardware, firmware, and software. Other embodiments may also be implemented as program code or instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the machine 1200 may include one or more processors and may be configured with program code instructions stored on a computer-readable storage device memory. Program code and/or executable instructions embodied on a computer-readable medium may be transmitted using any appropriate medium including, but not limited to, wireless, wireline, optical fiber cable, RF, etc., or any suitable combination of the foregoing. Program code and/or executable instructions for carrying out operations for aspects of the disclosure may be written in any combination of one or more programming languages, including an object-oriented programming language such as Java, Smalltalk, C++ or the like, and conventional procedural programming languages, such as the "C" programming language or similar programming languages. The program code and/or executable instructions may execute entirely on a device, partly on the device, as a stand-alone software package, partly on the device and partly on a remote device or entirely on the remote device or server.

The machine 1200 may include at least one hardware processor 1202 (e.g., a central processing unit (CPU), a graphics processing unit (GPU), a hardware processor core, or any combination thereof), a main memory 1204, and a static memory 1206. The machine 1200 may include drive circuitry 1218. The machine 1200 may further include an inertial measurement device 1232, a graphics display device 1210, an alphanumeric input device 1212 (e.g., a keyboard), and a user interface (UI) navigation device 1214 (e.g., a mouse). In an example, the graphics display device 1210, the alphanumeric input device 1212, and the UI navigation device 1214 may be a touch screen display. The machine 1200 may additionally include a storage device 1216, a programming and motion control device 1219, a network interface device/transceiver 1220 coupled to antenna(s) 1230, and one or more sensors 1228. The machine 1200 may include an output controller 1234, such as a serial (e.g., universal serial bus (USB), parallel, or other wired or wireless (e.g., infrared (IR), near field communication (NFC), etc.) connection to communicate with or control one or more peripheral devices. These components may couple and may communicate with each other through an interlink (e.g., bus) 1208. Further, the machine 1200 may include a power supply device that is capable of supplying power to the various components of the machine 1200.

The storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

The antenna(s) 1230 may include one or more directional or omnidirectional antennas, including, for example, dipole antennas, monopole antennas, patch antennas, loop antennas, microstrip antennas, or other types of antennas suitable for the transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

The RCC device 1219 may carry out or perform any of the operations and processes (e.g., Process 1100) described and shown above.

It is understood that the above are only a subset of what the RCC device 1219 may be configured to perform and that other functions included throughout this disclosure may also be performed by the programming and motion control device 1219.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random-access memory (RAM), magnetic disk storage media; optical storage media' a flash memory, etc.

The term "machine-readable medium" may include any medium that is capable of storing, encoding, or carrying instructions for execution by the machine 1200 and that cause the machine 1200 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device/transceiver 1220 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, and peer-to-peer (P2P) networks, among others. In an example, the network interface device/transceiver 1220 may include one or more physical jacks (e.g., Ethernet, coaxial, or phone jacks) or one or more antennas (e.g., antennas 1230) to connect to the communications network 1226. In an example, the network interface device/transceiver 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1200 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a single input single output (SISO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations. Certain aspects of the disclosure may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system."

The computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

The Following Examples Pertain to Further Embodiments

Example 1 may include a device comprising processing circuitry coupled to storage, the processing circuitry configured to: cause a flow measurement device (FMD) associated with a fixed orifice plate in a gas line to be placed in an out of service mode from an in service mode; perform a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds; based on the second comparisons, determine whether to perform a calibration procedure to bring the first FMD sensor errors below the respective predetermined thresholds by manipulating a plurality of solenoid valves and a calibration manifold comprising an inlet, an outlet, and a fine volume adjustment valves; based on the determination to perform a calibration procedure, re-run the test procedure to perform third comparisons of pressure and temperature measurements to the readings of the reference pressure and temperature sensors to generate second FMD sensor errors and perform fourth comparisons of each of the second FMD sensor errors to the respective predetermined thresholds to verify that the calibration procedure may be successful; and cause the FMD to be placed in the in service mode.

Example 2 may include the device of example 1 and/or some other example herein, wherein a first outlet line receives gas before passing through the fixed orifice plate associated with the FMD and a second outlet line receives gas after passing through the fixed orifice plate associated with the FMD.

Example 3 may include the device of example 1 and/or some other example herein, wherein the out of service, the in service, the test procedure, and the calibration procedure are initiated remotely or locally.

Example 4 may include the device of example 1 and/or some other example herein, wherein the out of service, the in service, the test procedure, and the calibration procedure are automated through an on-site controller.

Example 5 may include the device of example 4 and/or some other example herein, wherein the out of service, the in service, the test procedure, and the calibration procedure are initiated based on a pre-determined schedule or as determined necessary by the on-site controller.

Example 6 may include the device of example 4 and/or some other example herein, wherein the on-site controller comprises electronic circuitry capable of receiving signals from reference pressure devices and reference temperature devices.

Example 7 may include the device of example 4 and/or some other example herein, wherein the on-site controller controls electro-pneumatic devices for manipulation of pressure.

Example 8 may include the device of example 4 and/or some other example herein, wherein the on-site controller communicates bi-directionally with a flow measurement device.

Example 9 may include the device of example 4 and/or some other example herein, wherein the on-site controller communicates wirelessly or wired bi-directionally with a user interface at a remote location.

Example 10 may include a method comprising: causing, by one or more processors, a flow measurement device (FMD) associated with a fixed orifice plate in a gas line to be placed in an out of service mode from an in service mode; performing a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds; based on the second comparisons, determining whether to perform a calibration procedure to bring the first FMD sensor errors below the respective predetermined thresholds by manipulating a plurality of solenoid valves and a calibration manifold comprising an inlet, an outlet, and a fine volume adjustment valves; based on the determination to perform a calibration procedure, re-running the test procedure to perform third comparisons of pressure and temperature measurements to the readings of the reference pressure and temperature sensors to generate second FMD sensor errors and perform fourth comparisons of each of the second FMD sensor errors to the respective predetermined thresholds to verify that the calibration procedure may be successful; and causing the FMD to be placed in the in service mode.

Example 11 may include the method of example 10 and/or some other example herein, wherein a first outlet line receives gas before passing through the fixed orifice plate associated with the FMD and a second outlet line receives gas after passing through the fixed orifice plate associated with the FMD.

Example 12 may include the method of example 10 and/or some other example herein, wherein the out of service, the in service, the test procedure, and the calibration procedure are initiated remotely or locally.

Example 13 may include the method of example 10 and/or some other example herein, wherein the out of service, the in service, the test procedure, and the calibration procedure are automated through an on-site controller.

Example 14 may include the method of example 13 and/or some other example herein, wherein the out of service, the in service, the test procedure, and the calibration procedure are initiated based on a pre-determined schedule or as determined necessary by the on-site controller.

Example 15 may include the method of example 13 and/or some other example herein, wherein the on-site controller comprises electronic circuitry capable of receiving signals from reference pressure devices and reference temperature devices.

Example 16 may include the method of example 13 and/or some other example herein, wherein the on-site controller controls electro-pneumatic devices for manipulation of pressure.

Example 17 may include the method of example 13 and/or some other example herein, wherein the on-site controller communicates bi-directionally with a flow measurement device.

Example 18 may include the method of example 13 and/or some other example herein, wherein the on-site controller communicates wirelessly or wired bi-directionally with a user interface at a remote location.

Example 19 may include a non-transitory computer-readable medium storing computer-executable instructions which when executed by one or more processors result in performing operations comprising: causing a flow measurement device (FMD) associated with a fixed orifice plate in a gas line to be placed in an out of service mode from an in service mode; performing a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds; based on the second comparisons, determining will whether to perform a calibration procedure to bring the first FMD sensor errors below the respective predetermined thresholds by manipulating a plurality of solenoid valves and a calibration manifold comprising an inlet, an outlet, and a fine volume adjustment valves; based on the determination to perform a calibration procedure, re-running the test procedure to perform third comparisons of pressure and temperature measurements to the readings of the reference pressure and temperature sensors to generate second FMD sensor errors and perform fourth comparisons of each of the second FMD sensor errors to the respective predetermined thresholds to verify that the calibration procedure may be successful; and causing the FMD to be placed in the in service mode.

Example 20 may include the non-transitory computer-readable medium of example 19 and/or some other example herein, wherein a first outlet line receives gas before passing through the fixed orifice plate associated with the FMD and a second outlet line receives gas after passing through the fixed orifice plate associated with the FMD.

Example 21 may include the non-transitory computer-readable medium of example 19 and/or some other example herein, wherein the out of service, the in service, the test procedure, and the calibration procedure are initiated remotely or locally.

Example 22 may include the non-transitory computer-readable medium of example 19 and/or some other example herein, wherein the out of service, the in service, the test procedure, and the calibration procedure are automated through an on-site controller.

Example 23 may include the non-transitory computer-readable medium of example 22 and/or some other example herein, wherein the out of service, the in service, the test procedure, and the calibration procedure are initiated based on a pre-determined schedule or as determined necessary by the on-site controller.

Example 24 may include the non-transitory computer-readable medium of example 22 and/or some other example herein, wherein the on-site controller comprises electronic circuitry capable of receiving signals from reference pressure devices and reference temperature devices.

Example 25 may include the non-transitory computer-readable medium of example 22 and/or some other example herein, wherein the on-site controller controls electro-pneumatic devices for manipulation of pressure.

Example 26 may include the non-transitory computer-readable medium of example 22 and/or some other example herein, wherein the on-site controller communicates bi-directionally with a flow measurement device.

Example 27 may include the non-transitory computer-readable medium of example 22 and/or some other example herein, wherein the on-site controller communicates wirelessly or wired bi-directionally with a user interface at a remote location.

Example 28 may include an apparatus comprising means for: causing a flow measurement device (FMD) associated with a fixed orifice plate in a gas line to be placed in an out of service mode from an in service mode; performing a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds; based on the second comparisons, determining whether to perform a calibration procedure to bring the first FMD sensor errors below the respective predetermined thresholds by manipulating a plurality of solenoid valves and a calibration manifold comprising an inlet, an outlet, and a fine volume adjustment valves; based on the determination to perform a calibration procedure, re-running the test procedure to perform third comparisons of pressure and temperature measurements to the readings of the reference pressure and temperature sensors to generate second FMD sensor errors and perform fourth comparisons of each of the second FMD sensor errors to the respective predetermined thresholds to verify that the calibration procedure may be successful; and causing the FMD to be placed in the in service mode.

Example 29 may include the apparatus of example 28 and/or some other example herein, wherein a first outlet line receives gas before passing through the fixed orifice plate associated with the FMD and a second outlet line receives gas after passing through the fixed orifice plate associated with the FMD.

Example 30 may include the apparatus of example 28 and/or some other example herein, wherein the out of service, the in service, the test procedure, and the calibration procedure are initiated remotely or locally.

Example 31 may include the apparatus of example 28 and/or some other example herein, wherein the out of service, the in service, the test procedure, and the calibration procedure are automated through an on-site controller.

Example 32 may include the apparatus of example 31 and/or some other example herein, wherein the out of service, the in service, the test procedure, and the calibration procedure are initiated based on a pre-determined schedule or as determined necessary by the on-site controller.

Example 33 may include the apparatus of example 31 and/or some other example herein, wherein the on-site controller comprises electronic circuitry capable of receiving signals from reference pressure devices and reference temperature devices.

Example 34 may include the apparatus of example 31 and/or some other example herein, wherein the on-site controller controls electro-pneumatic devices for manipulation of pressure.

Example 35 may include the apparatus of example 31 and/or some other example herein, wherein the on-site controller communicates bi-directionally with a flow measurement device.

Example 36 may include the apparatus of example 31 and/or some other example herein, wherein the on-site controller communicates wirelessly or wired bi-directionally with a user interface at a remote location.

Example 37 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 38 may include an apparatus comprising logic, modules, and/or circuitry to perform one or more elements of a method described in or related to any of examples 1-36, or any other method or process described herein.

Example 39 may include a method, technique, or process as described in or related to any of examples 1-36, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-36, or portions thereof.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising: at least one memory that stores computer-executable instructions; and at least one processor configured to access the at least one memory and execute the computer-executable instructions to:

cause a flow measurement device (FMD) associated with a fixed orifice plate in a gas line to be placed in an out of service mode from an in service mode;

perform a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds;

based on the second comparisons, determine whether to perform a calibration procedure to bring the first FMD sensor errors below the respective predetermined thresholds by manipulating a plurality of solenoid valves and a calibration manifold comprising an inlet, an outlet, and a fine volume adjustment valve;

based on the determination to perform a calibration procedure, re-run the test procedure to perform third comparisons of additional pressure and temperature measurements to additional readings of the reference pressure and temperature sensors to generate second FMD sensor errors and perform fourth comparisons of each of the second FMD sensor errors to the respective predetermined thresholds to verify that the calibration procedure is successful; and cause the FMD to be placed in the in service mode.

2. The system of claim 1, wherein a first outlet line receives gas before passing through the fixed orifice plate associated with the FMD and a second outlet line receives gas after passing through the fixed orifice plate associated with the FMD.

3. The system of claim 1, wherein the out of service mode, the in service mode, the test procedure, and the calibration procedure are initiated remotely or locally.

4. The system of claim 1, wherein the out of service mode, the in service mode, the test procedure, and the calibration procedure are automated through an on-site controller.

5. The system of claim 4, wherein the out of service mode, the in service mode, the test procedure, and the calibration procedure are initiated based on a pre-determined schedule or as determined necessary by the on-site controller.

6. The system of claim 4, wherein the on-site controller comprises electronic circuitry capable of receiving signals from reference pressure devices and reference temperature devices.

7. The system of claim 4, wherein the on-site controller controls electro-pneumatic devices for manipulation of pressure.

8. The system of claim 4, wherein the on-site controller communicates bi-directionally with a flow measurement device.

9. The system of claim 4, wherein the on-site controller communicates wirelessly or wired bi-directionally with a user interface at a remote location.

10. A method comprising:

causing, by one or more processors, a flow measurement device (FMD) associated with a fixed orifice plate in a gas line to be placed in an out of service mode from an in service mode;

performing a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds;

based on the second comparisons, determining whether to perform a calibration procedure to bring the first FMD sensor errors below the respective predetermined thresholds by manipulating a plurality of solenoid valves and a calibration manifold comprising an inlet, an outlet, and a fine volume adjustment valve;

based on the determination to perform a calibration procedure, re-running the test procedure to perform third comparisons of additional pressure and temperature measurements to additional readings of the reference pressure and temperature sensors to generate second FMD sensor errors and perform fourth comparisons of each of the second FMD sensor errors to the respective predetermined thresholds to verify that the calibration procedure is successful;

causing the FMD to be placed in the in service mode; and wherein the out of service mode, the in service mode, the test procedure, and the calibration procedure are automated through an on-site controller.

11. The method of claim 10, wherein a first outlet line receives gas before passing through the fixed orifice plate associated with the FMD and a second outlet line receives gas after passing through the fixed orifice plate associated with the FMD.

12. The method of claim 10, wherein the out of service mode, the in service mode, the test procedure, and the calibration procedure are initiated remotely or locally.

13. The method of claim 12, wherein the out of service mode, the in service mode, the test procedure mode, and the calibration procedure are initiated based on a pre-determined schedule or as determined necessary by the on-site controller.

14. The method of claim 12, wherein the on-site controller comprises electronic circuitry capable of receiving signals from reference pressure devices and reference temperature devices.

15. The method of claim 12, wherein the on-site controller controls electro-pneumatic devices for manipulation of pressure.

16. The method of claim 12, wherein the on-site controller communicates bi-directionally with a flow measurement device.

17. The method of claim 12, wherein the on-site controller communicates wirelessly or wired bi-directionally with a user interface at a remote location.

18. A non-transitory computer-readable medium storing computer-executable instructions which when executed by one or more processors result in performing operations comprising:

causing a flow measurement device (FMD) associated with a fixed orifice plate in a gas line to be placed in an out of service mode from an in service mode;

performing a test procedure comprising first comparisons of pressure and temperature measurements to readings of reference pressure and temperature sensors to generate first FMD sensor errors, wherein the test procedure further performs second comparisons of each of the first FMD sensor errors to respective predetermined thresholds;

based on the second comparisons, determining will whether to perform a calibration procedure to bring the first FMD sensor errors below the respective predetermined thresholds by manipulating a plurality of solenoid valves and a calibration manifold comprising an inlet, an outlet, and a fine volume adjustment valves;

based on the determination to perform a calibration procedure, re-running the test procedure to perform third comparisons of additional pressure and temperature measurements to additional readings of the reference pressure and temperature sensors to generate second FMD sensor errors and perform fourth comparisons of each of the second FMD sensor errors to the respective predetermined thresholds to verify that the calibration procedure is successful; and causing the FMD to be placed in the in service mode.

19. The non-transitory computer-readable medium of claim 18, wherein a first outlet line receives gas before passing through the fixed orifice plate associated with the FMD and a second outlet line receives gas after passing through the fixed orifice plate associated with the FMD.

* * * * *